United States Patent
Kitahara et al.

(10) Patent No.: US 6,328,395 B1
(45) Date of Patent: Dec. 11, 2001

(54) INK JET PRINTER AND INK JET PRINTING METHOD

(75) Inventors: Tsuyoshi Kitahara; Noboru Tamura; Hironori Endo, all of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 08/925,727

(22) Filed: Sep. 9, 1997

(30) Foreign Application Priority Data

| Sep. 9, 1996 | (JP) | 8-237655 |
| Sep. 9, 1996 | (JP) | 8-237656 |
| Sep. 9, 1996 | (JP) | 8-237657 |
| Oct. 3, 1996 | (JP) | 8-263395 |

(51) Int. Cl.⁷ .............................. B41J 2/205; B41J 29/38
(52) U.S. Cl. ........................................... 347/9; 347/15
(58) Field of Search ........................ 347/9, 10, 15, 347/11, 14, 23

(56) References Cited

U.S. PATENT DOCUMENTS

| 4,562,445 | * 12/1985 | Rich | 347/9 |
| 4,673,951 | 6/1987 | Mutoh et al. | 346/75 |
| 4,897,667 | * 1/1990 | Uchiyama et al. | 347/10 |
| 5,285,215 | 2/1994 | Liker | 346/1.1 |

FOREIGN PATENT DOCUMENTS

| 115180 | 8/1984 | (EP) . | |
| 194852 | 9/1986 | (EP) . | |
| 375147 | 6/1990 | (EP) . | |
| 422870 | 4/1991 | (EP) . | |
| 738598 | 10/1996 | (EP) . | |
| 55-17589 | 2/1980 | (JP) | B41J/3/04 |
| 4-15735 | 3/1992 | (JP) | B41J/2/205 |
| 54367 | 1/1993 | (JP) | B41J/2/355 |
| 9426522 | 11/1994 | (WO) . | |

* cited by examiner

*Primary Examiner*—John Barlow
*Assistant Examiner*—Charles W. Stewart, Jr.
(74) *Attorney, Agent, or Firm*—Sughrue, Mion, Zinn, Macpeak & Seas, PLLC

(57) ABSTRACT

Drive signal generating means generates a drive signal including a plural number of drive pulses during one period. Print data generating means generates print data to input one or a plural number of the drive pulses to each pressure generating element during one print period. The pressure generating means expands and contracts in accordance with the drive pulses input thereto, to thereby cause the ejection of an ink droplet or droplets.

37 Claims, 48 Drawing Sheets

FIG. 6

INK JET PRINTER AND INK JET PRINTING METHOD

BACKGROUND OF THE INVENTION

1. Field of the Invention

The present invention relates to an ink jet printer capable of generating different ink droplets for one print period and an ink jet printing method for generating different ink droplets for one print period.

2. Discussion of the Related Art

Generally, the ink jet printer is provided with a print head having a number of nozzles arrayed in the slow scan (vertical) direction. To print on a printing material, e.g., a sheet of paper, the printer drives a carriage mechanism to move the print head in the main scan (horizontal) direction and feeds the paper in the horizontal direction, and repeats the operations. At the same time, the printer causes the print head to eject ink droplets from the nozzles at predetermined timings in accordance with dot pattern data generated by developing print data received from a host computer. The ejected ink droplets land on the paper to print an image represented by the print data on the paper. To print, a control as to whether the ink droplet is ejected or not, viz., a print dot is put in an on or off state, is merely carried out in the ink jet printer. The expression of the halftone, e.g., gray, is impossible only using such a function.

There is an approach to expressing the halftone with one pixel comprising a dot matrix, e.g., a 4×4 or 8×8 dot matrix. The 4×4 dot matrix can express a density or optical intensity of an image using 16 levels on the gray scale (17 levels if pure white is included). If the resolution of pixels is increased, the tone is more finely expressed. If the number of gray scale levels is increased while the dot diameter is left unchanged, the resolution is substantially reduced. If the dot diameter is large on the paper, the grains are conspicuous in a region of low optical intensities. For this reason, it is necessary to reduce the weight of the ink droplet and the dot size.

There is known an ink ejecting method in which a pressure generating chamber containing ink is expanded, and then compressed to eject ink droplets (as described in Japanese Patent Application Laid-open No. Sho. 55-17589). This method is called a "draw-and-eject" method. The method enables the weight of ink droplet and the dot diameter to be reduced.

Where the dot diameter is reduced, the grains are not conspicuous in the low optical intensity region, viz., the print quality is improved. In this case, the printing speed is low, however. If the dot diameter, is halved, the printing time is increased to be four times as long as that of the printer using the usual dot diameter. The problem of the printing time elongation can theoretically be solved by increasing the drive frequency for droplet ejection or the number of nozzles four times.

A technique to realize a tone storage by ejecting ink droplets of different weights from one and the same nozzle is also proposed (as disclosed in Japanese Patent Publication No. Hei. 4-15735 and U.S. Pat. No. 5,285,215). In this technique, a plural number of pulses are applied to the print head which in turn fires a plural number of fine ink droplets. Those fine ink droplets are merged into a single large ink droplet before it lands on the paper.

The technique of the publication can eject fine and large ink droplets. However, it is technically difficult to merge the ink droplets into a single ink droplet before its landing. Because of the process of merging the fine ink droplets, a range within which the dot diameter may be varied is also narrow.

Accordingly, an object of the present invention is to provide an ink jet printer capable of ejecting a plural number of ink droplets of different weights from one and the same nozzle without reducing the printing speed, and an ink jet printing method having the same function as of the ink jet printer.

Another object of the present invention is to provide an ink jet printer capable of ejecting a plural number of ink droplets during one print period, and an ink jet printing method having the same function as of the ink jet printer.

Yet another object of the present invention is to provide an ink jet printer capable of ejecting a plural number of ink droplets during one print period while reducing data transmission time, and an ink jet printing method having the same function as of the ink jet printer.

Other objects of the present invention will be apparent from the following detailed description.

SUMMARY OF THE INVENTION

In one of the preferred embodiments, the present invention takes the form of an ink jet printer having a print head having a plural number of nozzles associated with pressure generating elements, and a print controller for driving the print head and controlling the ink ejecting operation of the print head, the ink jet printer comprising, in combination: drive signal generating means for generating a drive signal including, during one period, a plural number of drive pulses for driving the print head to eject ink droplets from each of the nozzles; print data generating means for generating print data to input one or a plural number of the drive pulses to each pressure generating element during one print period; and switching means for inputting the drive signal to each pressure generating element in accordance with the print data.

BRIEF DESCRIPTION OF THE DRAWINGS

FIG. 6 shows a behavior of the ink at the nozzle hole when the 2nd pulse is applied to the piezoelectric element;

FIG. 8 is a timing diagram showing the drive pulses of a drive signal, the transferring timings of print data, and the like;

FIG. 10 is a timing diagram showing the drive pulses of a drive signal used in a second embodiment, the transferring timings of print data, and the like;

FIG. 12 is a timing diagram showing the drive pulses of a drive signal used in a third embodiment, the transferring timings of print data, and the like;

FIG. 14 is an explanatory diagram showing a drive signal used in a fourth embodiment, gray tone values, and the like;

FIG. 17 is a timing diagram showing the drive pulses of a drive signal, the transferring timings of print data, and the like;

FIG. 18 is a timing diagram showing a drive signal used in a fifth embodiment, print data, and the like;

FIG. 21 is a timing diagram showing a drive signal used in a sixth embodiment, print data, and the like;

FIG. 24 is a timing diagram showing a drive signal used in a seventh embodiment, print data, and the like;

FIG. 26 is a timing diagram showing a drive signal used in an eighth embodiment, print data, and the like;

FIG. 28 is a timing diagram showing a drive signal used in a ninth embodiment, print data, and the like;

FIG. 31 is a timing diagram showing a drive signal used in a tenth embodiment, print data, and the like;

FIG. 35 is a timing diagram showing a drive signal, the transferring timings of print data, and the like;

FIG. 38 is a timing diagram showing a drive signal, the transferring timings of print data, and the like;

DESCRIPTION OF THE PREFERRED EMBODIMENTS

<First Embodiment>

Figure 1:
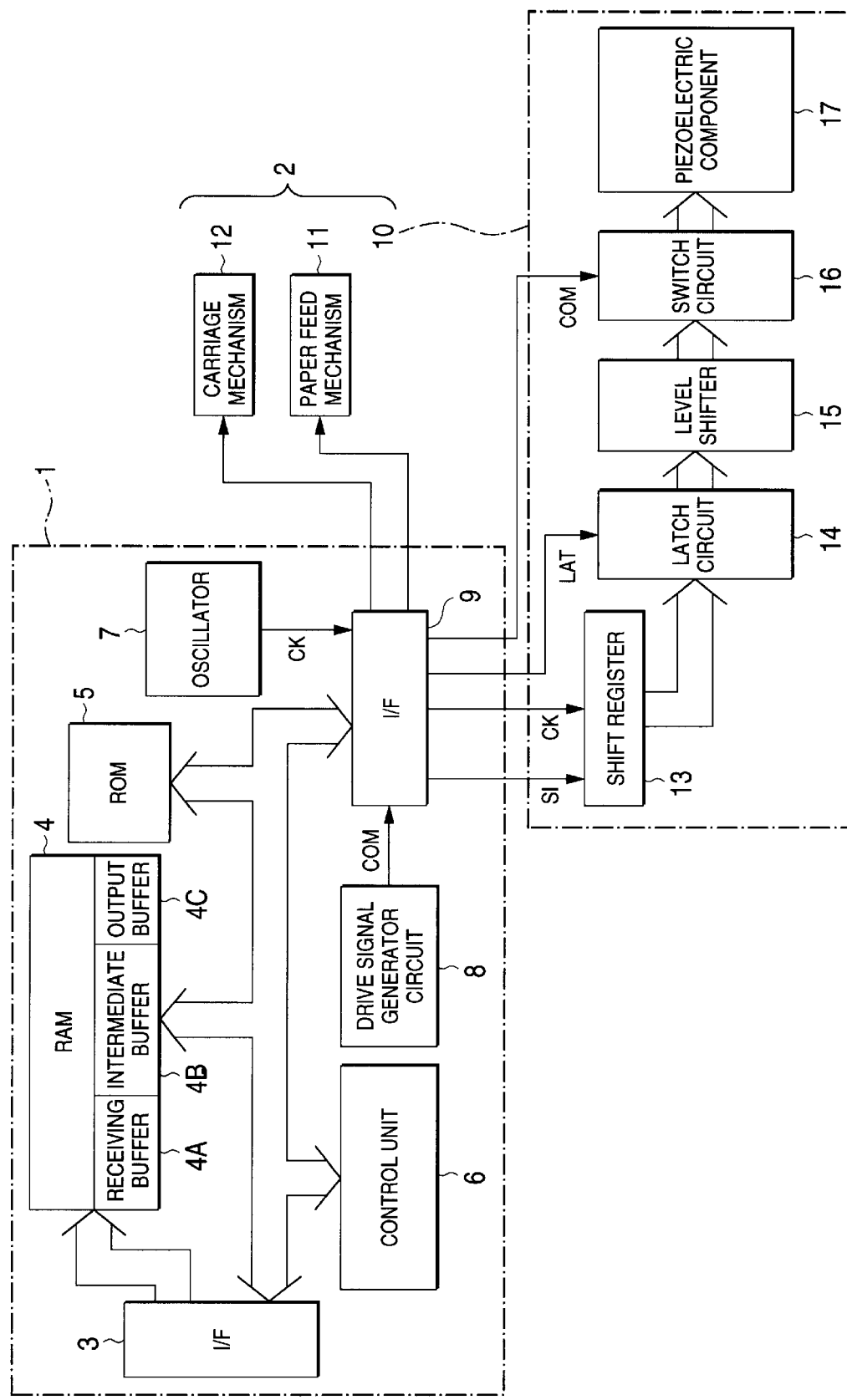
FIG. 1 is a block diagram showing an ink jet printer according to a first embodiment of the present invention.

FIG. 1 is a block diagram showing an ink jet printer according to a first embodiment of the present invention.

As shown, the ink jet printer generally includes a printer controller 1 and a print engine 2. The printer controller 1 is made up of an interface (I/F) 3 which receives print data and the like from a host computer, not shown, and sends various signals on the controls by the controller to the host computer, a RAM 4 for storing various data, a ROM 5 for storing various programs, e.g., routine programs, for various data processing, a control unit 6 including a CPU, for example, an oscillator 7, a drive signal generator circuit 8 (drive signal generating means) for generating signals for transmission to a print head 10 to be given later, and another I/F 9 which transfers print data and drive signals to the print engine 2.

The I/F 3 receives, from the host computer, one of character codes, graphic functions, image data or print data comprising plural items of data, and sends a busy signal, acknowledge signal, and the like to the host computer.

The RAM 4 has the functions of a receiving buffer 4A, an intermediate buffer 4B, an output buffer 4C, a work memory (not shown), and the like. The receiving buffer 4A temporarily stores print data received from the host computer. The intermediate buffer 4B stores intermediate code data from the control unit 6. The print data is converted into the intermediate code data by the control unit 6. The output buffer 4C stores dot pattern data in a developed form. As will be described, tone data is decoded into the dot pattern data. The ROM 5 stores various control routines to be executed by the control unit 6, font data, graphic functions, and various procedures, and the like.

The control unit 6 reads out print data from the receiving buffer 4A and converts it into intermediate data, and stores the intermediate data into the intermediate buffer 4B. The control unit 6 analyzes the intermediate data received from the intermediate buffer 4B, and develops it into dot pattern data while referring to the font data, graphic function, and the like, which are stored in the ROM 5. The developed dot pattern data is processed for beautification and stored into the output buffer 4C.

When dot pattern data corresponding to one line of the print head 10 is formed, the dot pattern data of one line is serially transferred to the print head 10, through the I/F 9. After the dot pattern data of one line is output from the output buffer 4C, the contents of the intermediate buffer 4B are erased, and the next intermediate code is formed, viz, the print data is read out of the receiving buffer 4A and converted into the intermediate code. The print data, which now takes the form of the dot pattern data, comprising four (4)

bits (or 3 bits) as tone data for each nozzle, as will be described later.

The print engine 2 is made up of the print head 10, a paper feed mechanism 11, and a carriage mechanism 12. The paper feed mechanism 11 includes a paper feed motor, a paper feed roller, both not shown, and the like. The mechanism 11 successively feeds a printing material, e.g., a sheet of paper, in the vertical direction, viz., it carries out a sub-scanning operation. The carriage mechanism 12 includes a carriage, which caries the print head 10 thereon in the horizontal direction, or the main scan direction, a carriage motor, coupled with the carriage by a timing belt, for example, for driving the carriage to move in the above direction. The carriage and motor are both not shown. Thus, the carriage mechanism 12 moves the print head 10 in the main scan direction.

The print head 10 has a number of nozzles, e.g., 64 nozzles, arrayed in the sub-scanning direction. At predetermined timings, the print head 10 ejects ink droplets through the nozzles. The print data, now taking the form of dot pattern data, is serially transferred from the I/F 9 to a shift register 13 of the print head 10, in synchronism with a clock signal (CK) derived from the oscillator 7. The print data (SI) thus serially transferred is latched in a latch circuit 14 of the print head 10. The print data or print data signal is output from the latch circuit 14, and its voltage is increased up to a predetermined voltage, e.g., several tens of V, which is high enough to drive a switch circuit 16 also contained in the print head 10, by a level shifter 15. In the figure, "SI" indicates information being serially transferred. The print data signal at the predetermined voltage is applied to the switch circuit 16 (switching means). The switch circuit 16 receives at the input terminal a drive signal (COM) from the drive signal generator circuit 8 of the printer controller 1, and is connected at the output terminal to a piezoelectric component 17 (pressure generating means).

The print data controls the operation of the switch circuit 16. When the print data applied to the switch circuit 16 is logically "1", a drive signal is allowed to go to the piezoelectric component 17. In response to the drive signal, the piezoelectric component 17 is driven to expand and contract. When the print data applied to the switch circuit 16 is logically "0", a drive signal is prohibited from going to the piezoelectric component 17.

Figure 2:
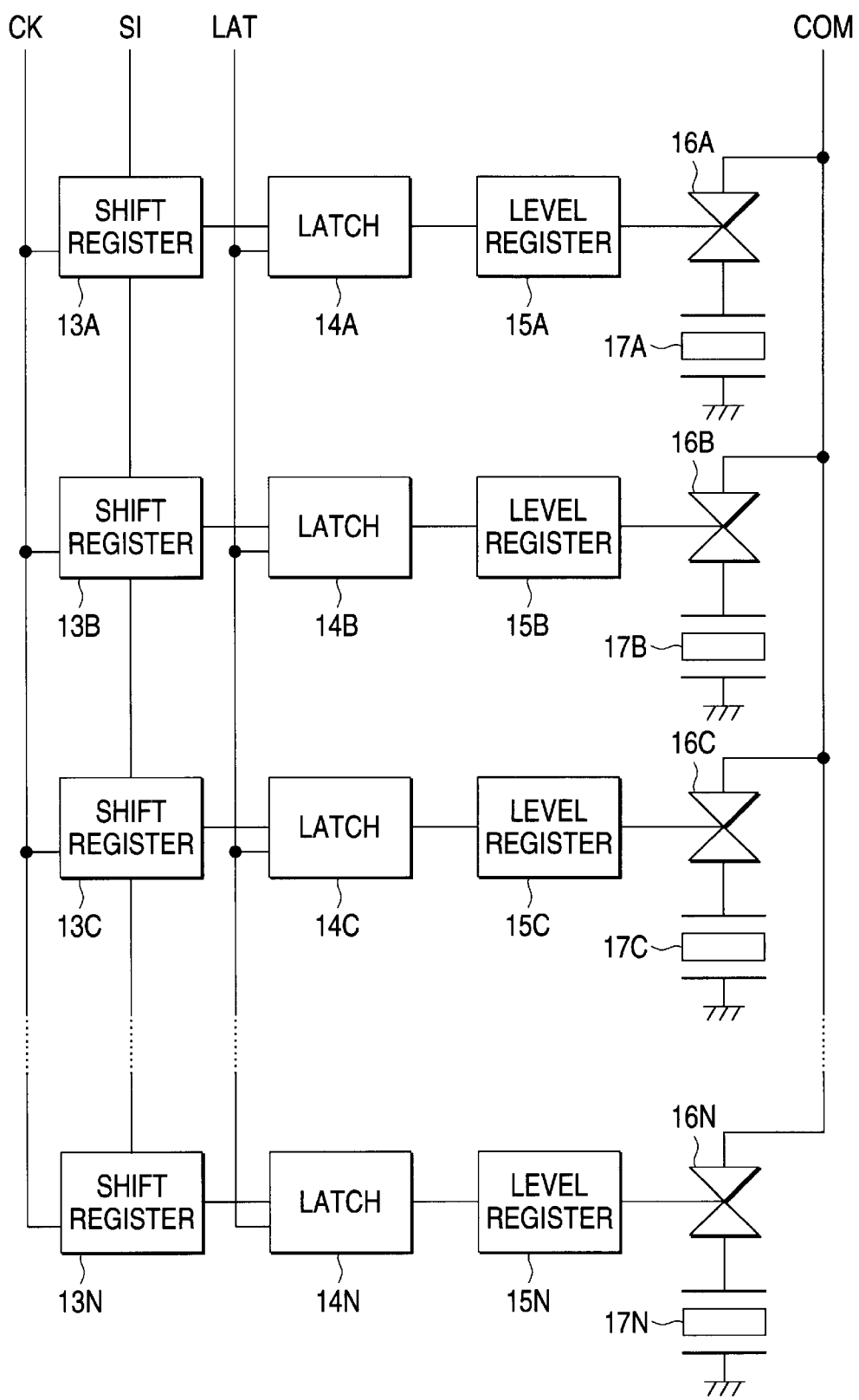
FIG. 2 is a circuit diagram showing a key portion of a print head drive circuit in the ink jet printer of FIG. 1.

FIG. 2 shows an electrical arrangement print of the print head 10. As shown, in the present embodiment, the shift register 13 (FIG. 1) comprises shift registers 13A to 13N corresponding in number to the nozzles. Similarly, the latch circuit 14 includes latch elements 14A to 14N; the level shifter 15, level shifters 15A to 15N; the switch circuit 16, switch elements 16A to 16N; and the piezoelectric component 17, piezoelectric elements 17A to 17N. The print data comprises four (4) bits, for each nozzle, ranging from the most significant bit (MSB) 3 to the least significant bit (LSB) 0. The print data is expressed as "1010", "0100", and the like. The print data of 4 bits is input to the shift registers 13A to 13N of all the nozzles during one print period. The drive signal contains four drive pulses for one print period. The bits of the print data correspond respectively to the drive pulses contained in the drive signal during one print period. If the print data is "0100", only the 2nd drive pulse is applied to the corresponding nozzle during the print period, and in response to the drive pulse, the nozzle ejects an ink droplet to the print paper.

More specifically, data of the MSB 3 for all the nozzles are serially transferred to the shift registers 13A to 13N. Then, these shift registers output respectively the received data to the latch elements 14A to 14N where the data are latched. Then, data of the bit 2 for all the nozzles are serially transferred to the shift registers 13A to 13N. Then, these shift registers output respectively the received data to the latch elements 14A to 14N where the data are latched. Subsequently, the data of bit 1 and bit 0 are serially transferred to the shift registers and latched in the latch elements in a similar way.

If the bit data applied to the switch elements 16A to 16N as analog switches is logically "1", the switch elements allow the drive signal to go to the piezoelectric elements 17A to 17N. In turn, the piezoelectric elements 17A to 17N are deformed in accordance with a waveform of the drive signal. If the bit data applied to the switch elements 16A to 16N as analog switches is logically "0", the switch elements inhibit the drive signal to go to the piezoelectric elements 17A to 17N. Those elements retain the amount of charge as it is.

Figure 3:
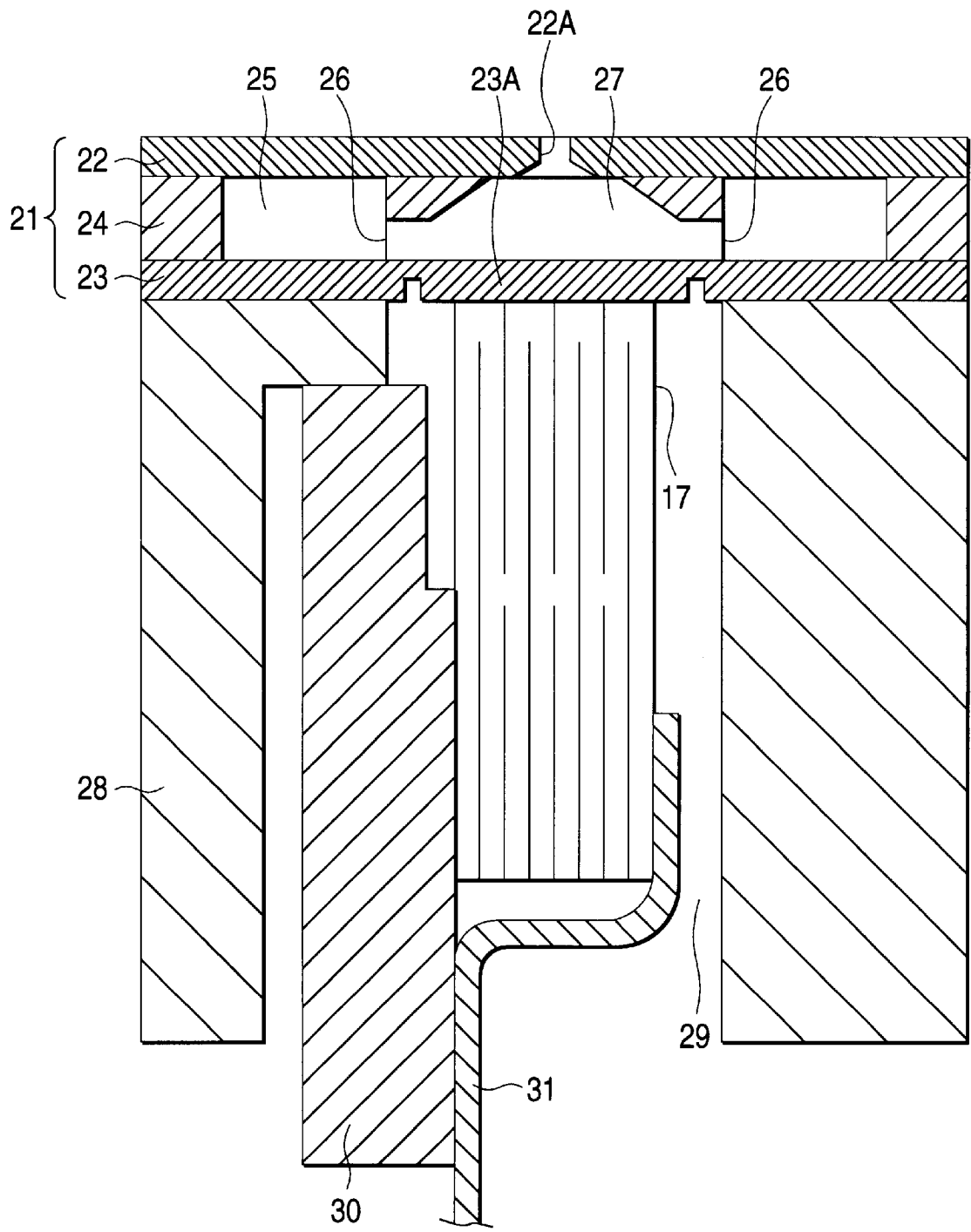
FIG. 3 is a sectional view exemplarily showing a mechanical structure of the print head.

FIG. 3 is a sectional view exemplarily showing a mechanical structure of the print head. As shown, a substrate unit 21 is formed with a nozzle plate 22 with a nozzle hole 22A, a vibrating plate 23 with an island 23A and a fluid passage forming plate 24 inserted between the nozzle plate 22 and the vibrating plate 23. The fluid passage forming plate 24 defines an ink chamber 25, an ink supply port 26, and a pressure generating chamber 27, in cooperation with the nozzle plate 22 and the vibrating plate 23. A base 28 defines a housing 29 in which any of the piezoelectric elements 17A to 17N) is placed. The piezoelectric element, generally represented by numeral 17, is fixed on a fixing plate 30 in a state in which its tip is brought into contact with the island 23A. The piezoelectric element 17 may be a PZT of the longitudinal vibration/lateral effect type. When charged, it contracts, and when discharged, it expands. A drive signal is applied to the piezoelectric element 17 by way of a lead wire 31.

If required, the piezoelectric element 17 may be a PZT of the deflection vibration type. When this type of the PZT is charged, it expands, and when discharged, it contracts. Any other suitable element than the PZT, for example, a magnetostrictor, may be used for the piezoelectric element, as a matter of course. Further, a construction, based on another principle, in which ink is heated by a heater, for example, to generate vapor bubbles therein, and the bubbles change a pressure in the pressure generating chamber, may be used. Thus, any means may be used for the same purpose if it is capable of changing a pressure in the pressure generating chamber in response to an electrical signal applied thereto.

In operation, the piezoelectric element 17 is electrically charged and physically contracts. Then, the pressure generating chamber 27 expands and a pressure in the pressure generating chamber 27 decreases. Ink flows into the pressure generating chamber 27. In turn, the piezoelectric element 17 is electrically discharged and physically expands. The pressure generating chamber 27 is compressed to increase the pressure therein. Consequently, ink is ejected from the pressure generating chamber 27 through the nozzle hole 22A. The relationship between a variation of the volume (pressure variation) of the pressure generating chamber 27 and the ejection of ink will be described later.

A print head, disclosed in U.S. patent application Ser. No. 08/708,675, entitled "Ink Jet Recording Head and Method of Manufacturing the Same", filed Sep. 5, 1966, invented by Usui et al., and assigned to the present assignee, is available for the present invention.

Figure 4:
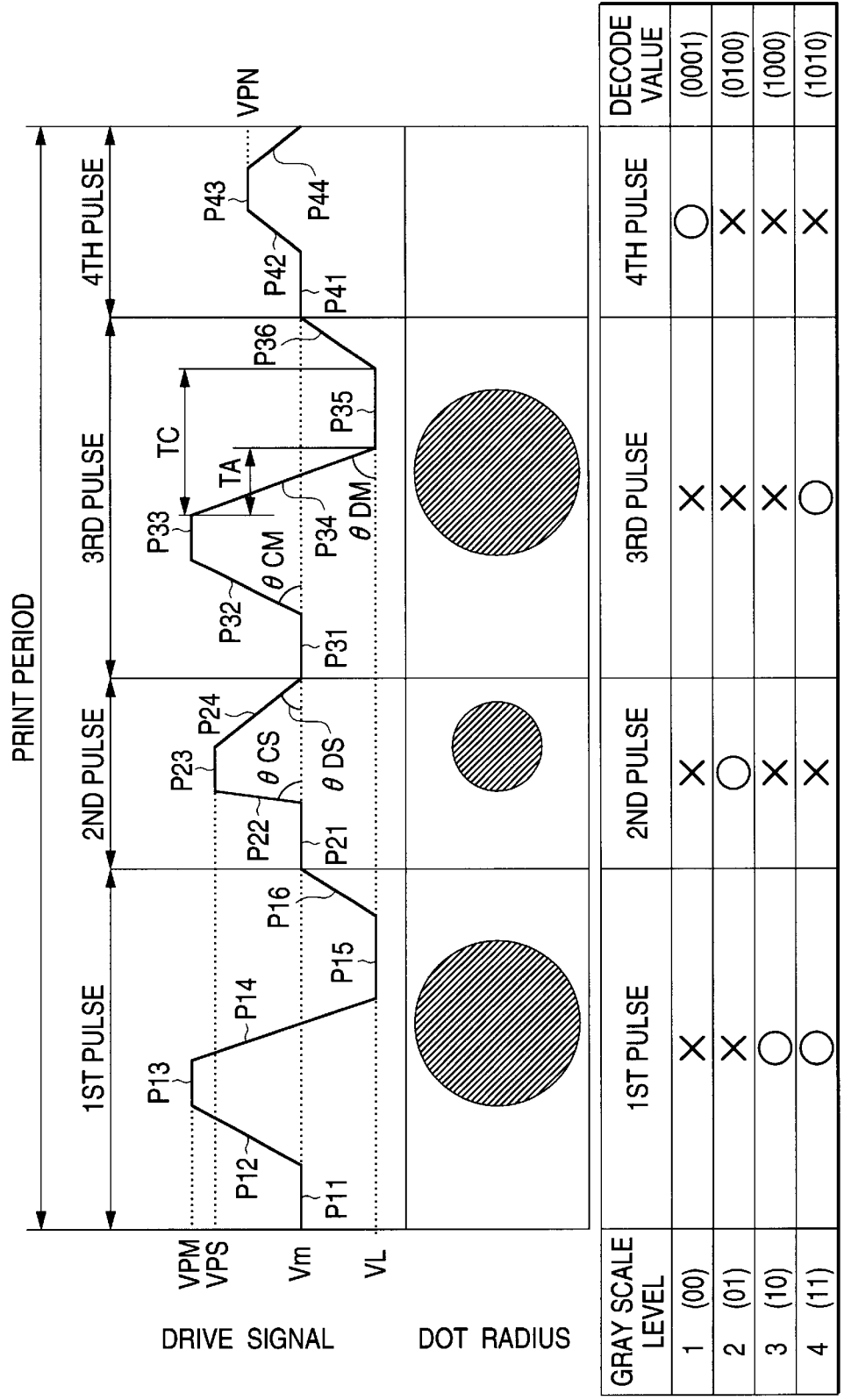
FIG. 4 is a diagram useful in correlatively explaining a drive signal and gray-scale levels used in the first embodiment.

FIG. 4 is a diagram correlatively showing a waveform of a drive signal and the size of dots formed by ink droplets, and tabulates how to express a tone gradation using the drive signal. In the present embodiment, a drive signal, generated by the drive signal generator circuit 8, comprises a first (1st) pulse (first (1st) drive pulse), a second (2nd) pulse (second (2nd) drive pulse), a third (3rd) pulse (third (3rd) drive pulse), and a fourth (4th) pulse (nonprint drive pulse).

The 1st to 3rd pulses take the same waveform, and each capable of ejecting an ink droplet of medium weight, e.g., approximately 10 ng. The dots deposited on the printing material by each of the 1st and 3rd pulses are medium in size. In this sense, the 1st and 3rd pulses will be referred to as "medium pulses". The 2nd pulse, located between the 1st and 3nd pulses on the time axis of the drive signal, forms a small ink dot of approximately 2 ng. That is, the 2nd pulse produces the dot of small diameter. In this sense, the 2nd pulse may be called a "small dot pulse". The 4th pulse, located the 3rd and 1st pulses on the time axis, is provided for increasing a viscosity of ink by minutely vibrating the ink in and near the nozzle hole 22A, and incapable of ejecting an ink droplet. Therefore, the 4th pulse may be called a "minute vibration pulse".

In FIG. 4, the individual segments of a waveform of the drive signal are denoted as P11, P12, . . . , for ease of explanation. As recalled, the 1st and 3rd pulses take the same waveform. Therefore, only the 1st pulse will be typically discussed in the following description, while omitting the discussion of the 3rd pulse.

The 1st pulse rises from a medium potential (P11) at a given inclination θCM (P12), and reaches a maximum potential VPM as "1st maximum potential" and maintains the maximum potential VPM for a given period of time (P13). Then, the 1st pulse falls from the maximum potential VPM at a given inclination θDM to a minimum potential VL (P14).

In the embodiment, the inclination θDM of the discharging of the piezoelectric element (this type inclination will be referred to as a discharging inclination) is larger than the inclination θCM of the charging of the same (this type inclination will be referred to as a charging inclination). A time taken for the voltage of the 1st pulse to fall from the maximum potential VPM to the minimum potential VL is set to be nearly equal to the period TA of the natural frequency of the piezoelectric element 17. The minimum potential VL is preferably set at a ground level (0V) or a positive potential in order to prevent the polarization of the piezoelectric element 17 from being reversed.

After the 1st pulse maintains the minimum potential VL for a given period of time (P15), its potential rise again to the medium potential Vm (P16). A time length from an instant that the falling of the 1st pulse from the maximum potential VPS starts until the maintaining of the minimum potential VL terminates is set to be nearly equal to the period TC (Helmholtz period) of a natural frequency of ink.

The 2nd pulse rises from the medium potential Vm (P21) at a given inclination θCS up to a maximum potential VPS as a "second maximum potential" (P22). The maximum potential VPS of the 2nd pulse is lower than that of each of the 1st and 3rd pulses. The 2nd pulse maintains the maximum potential VPS for a given period of time (P23), and falls at a given inclination θDS up to the medium potential Vm (P24). The charging inclination θCS in the variation of the 2nd pulse is set to be larger than the discharging inclination θDS.

The period at which the 1st and 2nd pulse recur is equal to one half of the print period. As stated above, no description of the 3rd pulse is given here since the 1st to 3rd pulses take the same waveform. As will subsequently be described, when the print controller selects the 1st and 3rd pulses for forming large dots on the print paper, the ink droplets capable of forming the dot of the medium size are ejected at equal time intervals. Specifically, where the print period is 14.4 kHz, the ejecting period of the ink droplets for the medium size dot is set at 28.8 kHz. The time length between the 1st and 2nd pulses is set to be equal to the maximum drive period of the print head 10.

The 4th pulse, like the 1st to 3rd pulses, rises from the medium potential Vm (P41) up to a maximum potential VPN (P42), which may be called a "third maximum potential". After it maintains the maximum potential VPN for a given time period (P43), it falls to the medium potential Vm. The maximum potential VPN of the 4th pulse is lower than the maximum potential VPS of the 2nd pulse because the 4th pulse and is for minutely vibrating the ink to such an extent as not to eject an ink droplet. The charging inclination of the 4th pulse is substantially equal to the discharging inclination thereof.

In FIG. 4, the waveform segments P12 and P32 correspond to "1st voltage rising waveform segment"; P13 and P33, "1st maximum potential maintaining waveform segment"; P14 and P34, "1st voltage falling waveform segment"; P15 and P35, "1st minimum potential maintaining waveform segment"; and P16 and P36, "medium potential rising waveform segment". Further, the waveform segment P22 corresponds to "second voltage rising waveform segment"; P23, "second maximum potential maintaining waveform segment"; and P24, "second voltage falling waveform segment".

Figure 5:
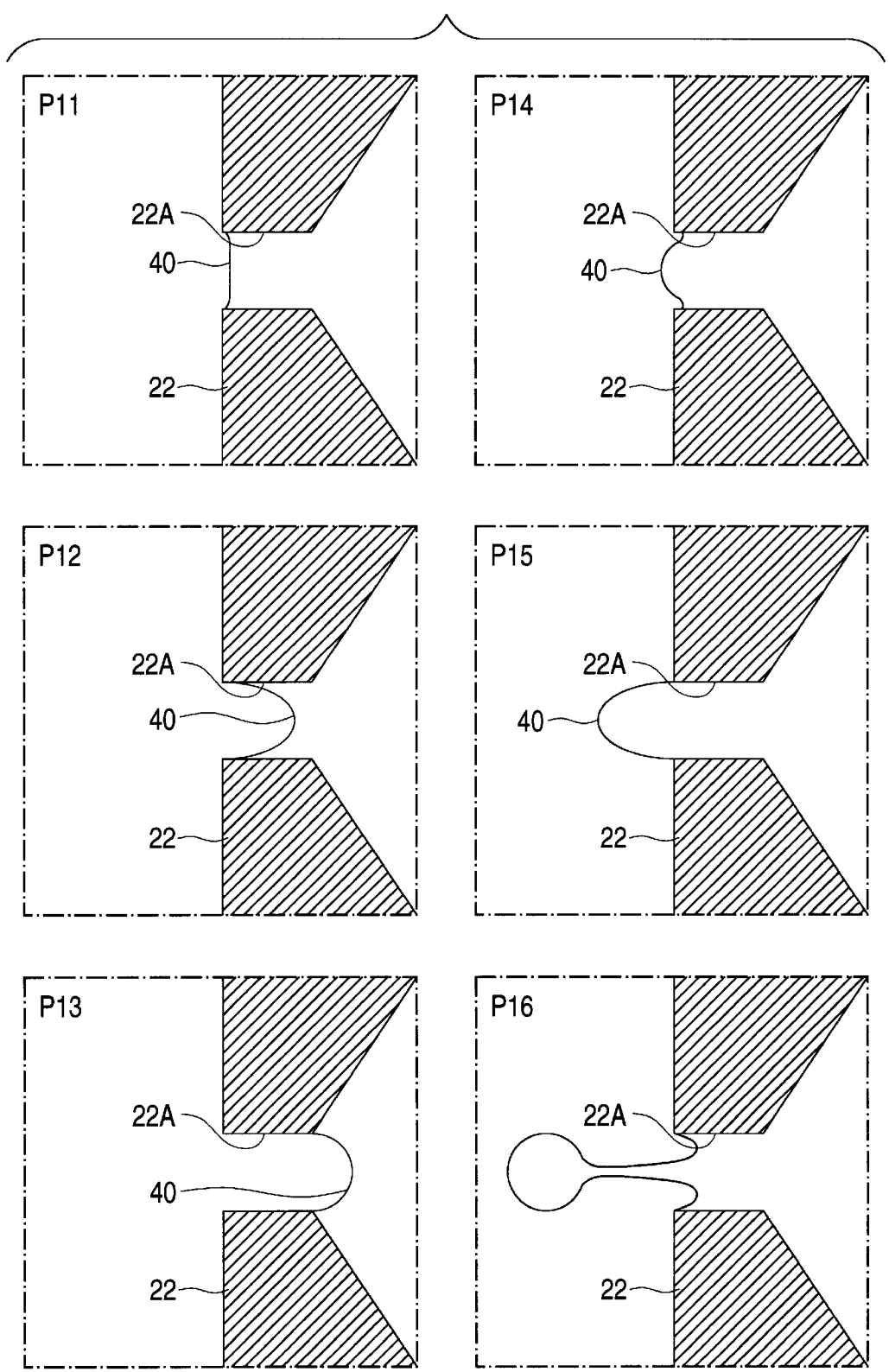
FIG. 5 shows a behavior of the ink at the nozzle hole when the 1st or 3rd pulse is applied to the piezoelectric element.
Figure 6:
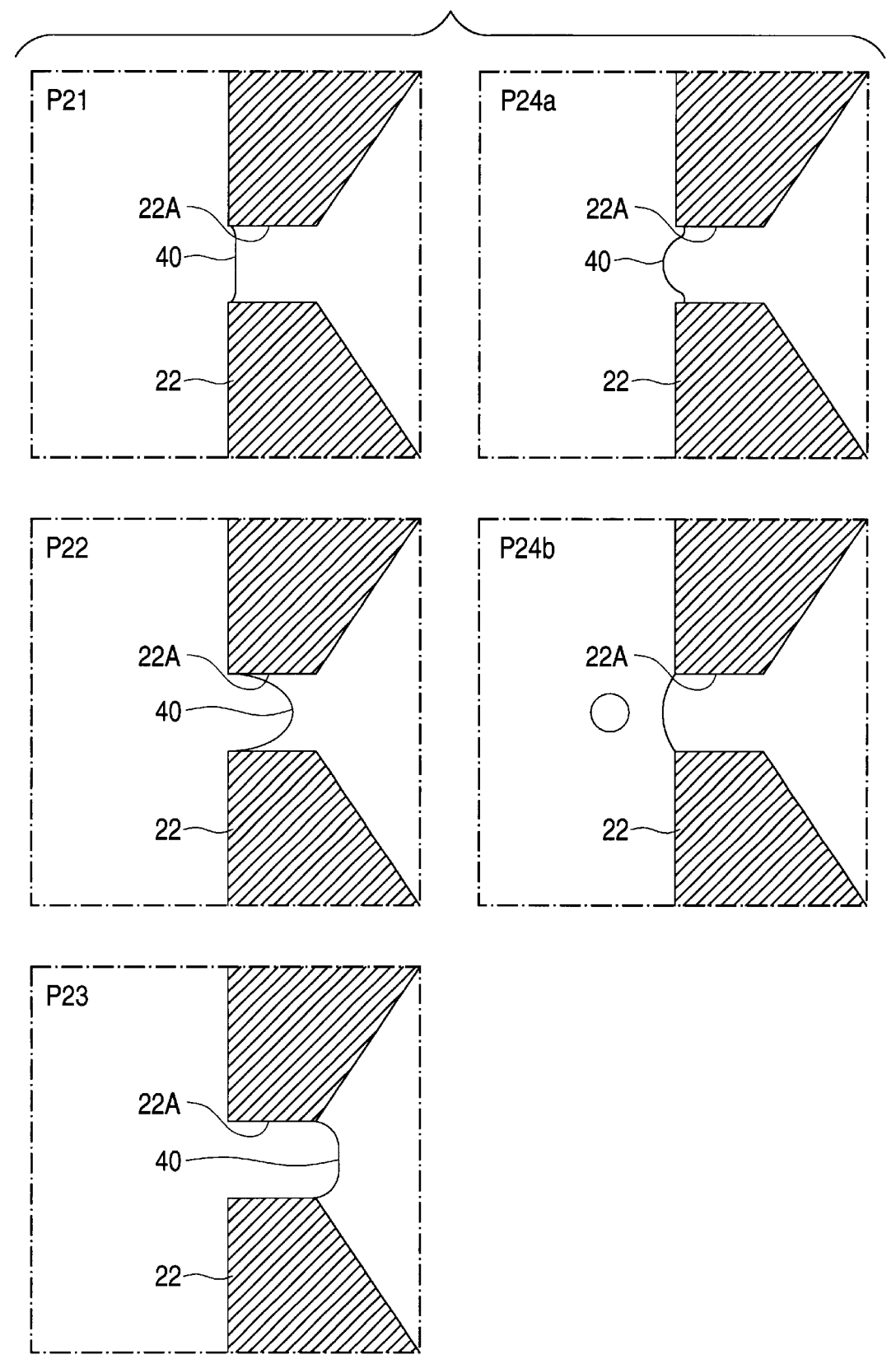
Figure 7:
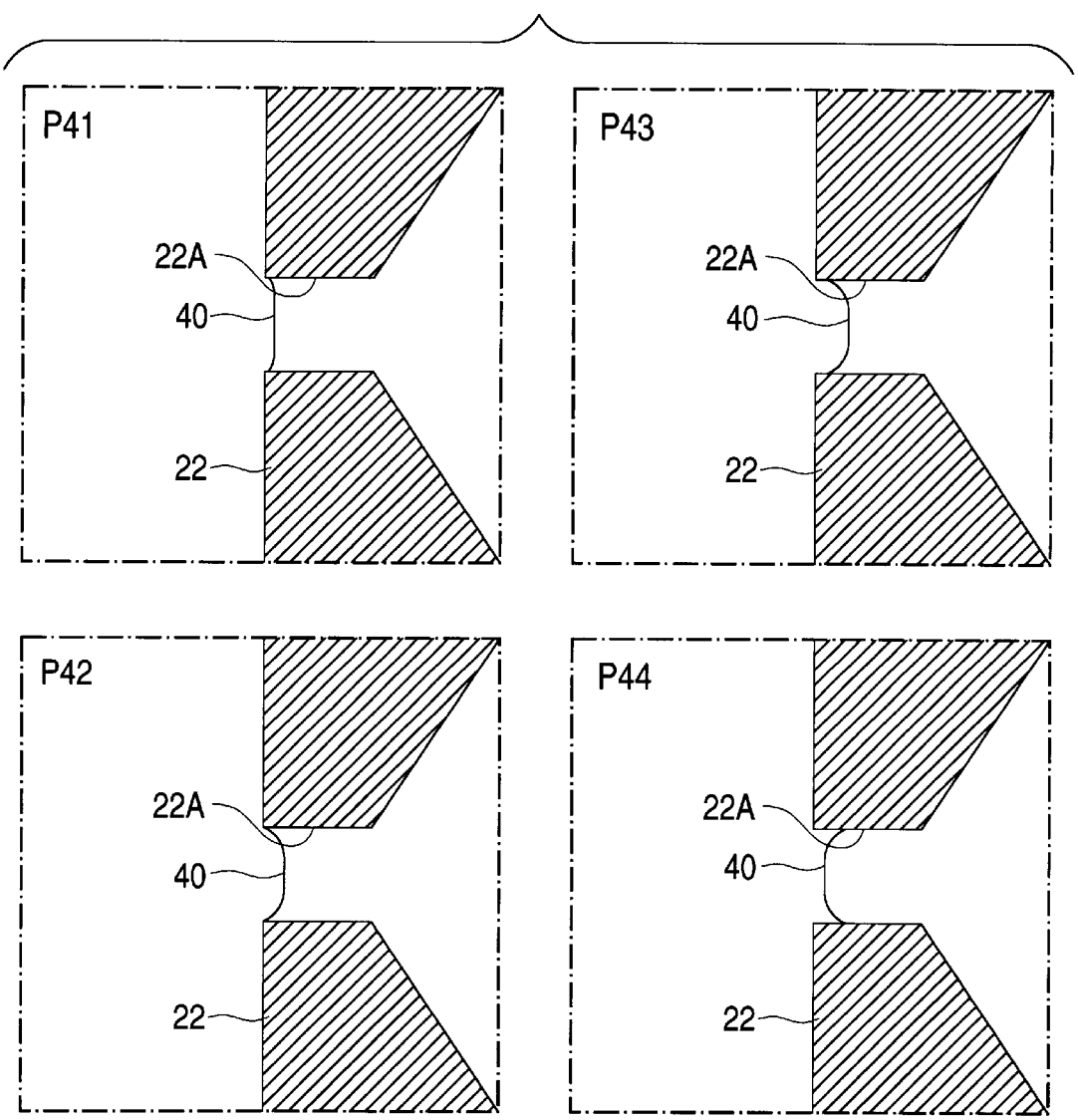
FIG. 7 shows a behavior of the ink at the nozzle hole when the 4th pulse is applied to the piezoelectric element.

Description to be given hereunder with reference to FIGS. 5 through 7 is how the ink behaves at the nozzle hole of the nozzle plate when a single drive pulse is applied to the piezoelectric element 17. FIG. 5 shows a behavior of the ink at the nozzle hole when the 1st or 3rd pulse is applied to the piezoelectric element. In the description, the 1st pulse is typically used.

In the waveform segment P11 of the medium potential Vm, a meniscus 40 of the ink in the print head is located slightly inward from the ejection surface of the nozzle hole 22A of the nozzle plate 22. In the waveform segment P12 where the 1st pulse rises from the medium potential Vm to the maximum potential VPM, the piezoelectric element 17 contracts and the pressure generating chamber 27 expands, and the meniscus 40 is pulled into the inside of the nozzle hole 22A. At this time, the pressure generating chamber 27 expands at a rate dependent on the contracting rate of the piezoelectric element 17. In the waveform segment P13, the 1st pulse maintains its maximum potential VPM for such a time period as to prevent the meniscus 40, once pulled into the nozzle hole, from returning to the position just before it was pulled into the ink ejecting orifice.

In the waveform segment P14, in a state that the meniscus 40 is pulled into the inner part of the nozzle hole, the piezoelectric element 17 is rapidly discharged from the maximum potential VPM to the minimum potential VL. As a result, the piezoelectric element 17 expands and the pressure generating chamber 27 is compressed, and the meniscus 40 starts to project from the ejection surface of the nozzle hole 22A. At this time, the pressure generating chamber 27 is compressed at a rate that is dependent on the expanding rate of the piezoelectric element 17. The meniscus 40 continues its projecting motion by inertia in the waveform segment P15 of the minimum potential VL. In the waveform segment P16, the piezoelectric element 17 is charged by increasing the 1st pulse from the minimum potential VL to the medium potential Vm in a state that the meniscus 40 is projected. As a result, the piezoelectric element 17 contracts and the pressure generating chamber 27 is expanded. A part of ink projected from the nozzle hole 22A is cut off and ejected in the form of an ink droplet corresponding to a medium dot.

FIG. 6 shows a behavior of the ink at the nozzle hole when the 2nd pulse is applied to the piezoelectric element. In the waveform segment P21 of the medium potential Vm, the meniscus 40 of the medium potential Vm is located slightly inward from the ejection surface of the nozzle hole 22A of the nozzle plate 22. In the waveform segment P22, the 2nd pulse is increased from the medium potential Vm to the maximum potential VPS. Then, the piezoelectric element 17 contacts and the pressure generating chamber 27 is expanded. The meniscus 40 is pulled into the nozzle hole 22A. In the waveform segment P23, the 1st pulse maintains its maximum potential VPM for such a time period as to prevent the meniscus 40, once pulled into the nozzle hole, from returning to its original position. Therefore, the meniscus 40 is left in the nozzle hole 22A. Since the maximum potential VPS of the 2nd pulse is lower than the maximum potential VPM of the 1st pulse, the volume of ink flowing from the ink chamber 25 into the pressure generating chamber 27 is smaller than in the case of the 1st pulse.

In the waveform segment P24 where the piezoelectric element 17 is discharged from the maximum potential VPS to the medium potential Vm, the piezoelectric element 17 expands and the pressure generating chamber 27 is compressed. A positive pressure is generated in the pressure generating chamber 27 and the meniscus 40 is pushed outward from the nozzle hole 22A (waveform segment P24a). As a consequence, a minute ink droplet is ejected from the nozzle hole 22A (waveform segment P24b). Thus, the volume of ink flowing into the pressure generating chamber 27 may be reduced by using the reduced maximum potential VPS. Since a pressure is varied in the positive direction in a state that the meniscus 40 is put in the nozzle hole, the 2nd pulse is capable of ejecting a minute ink droplet approximately ⅕ as large as the ink droplet caused by the 1st pulse.

FIG. 7 shows a behavior of the ink at the nozzle hole when the 4th pulse is applied to the piezoelectric element. In the waveform segment P41 of the medium potential Vm, the meniscus 40 of the medium potential Vm is located slightly inward from the ejection surface of the nozzle hole 22A of the nozzle plate, as in the waveform segments P11 and P21. In the waveform segment P42 where the piezoelectric element 17 is charged by increasing the 4th pulse from the medium potential Vm to the maximum potential VPN, the piezoelectric element 17 contracts and the pressure generating chamber 27 is expanded. The meniscus 40 is pulled into the nozzle hole 22A of the nozzle plate. In this case, the quantity of the pulling of the meniscus is small since the maximum potential VPN is small. In the waveform segment P43 where the maximum potential VPN is maintained for a short time period, the meniscus 40 is left in a state that it is slightly pulled into the nozzle hole 22A. In the waveform segment P44 where the piezoelectric element 17 is discharged from the maximum potential VPN to the medium potential Vm, the pressure generating chamber 27 is compressed, and the meniscus 40 is pushed back toward the ejection surface of the nozzle hole 22A of the nozzle plate 22.

Thus, the 4th pulse charges and discharges the piezoelectric element 17 not greatly, so that a pressure variation in the pressure generating chamber 27 is small. Therefore, the 4th pulse minutely vibrates the meniscus 40 without ejecting an ink droplet. With the minute vibration of the meniscus 40, an increase of viscosity of ink is avoided.

The clogging of the nozzle hole 22A may be prevented by minutely vibrating the meniscus 40 of the ink in a specific state of the print head, for example, when the print head 10 is at its home position or by covering the nozzle hole 22A with a cap. The 4th pulse is not essential to the present invention, and if required, it may be omitted.

A method of expressing tone gradations by selecting one or a plural number of the 1st pulse (medium dot), 2nd pulse (small dot), 3rd pulse (medium dot), and 4th pulse (minute vibration) will be described with reference to FIG. 4 and other figures.

As described above, when a bit of the print data to be input to the switch circuit 16 is logically "1", a drive signal is allowed to go to the piezoelectric element 17. At this time, the piezoelectric element 17 expands and contracts in accordance with a waveform of the drive signal. When a bit of the print data is logically "0", the drive signal is inhibited from going to the piezoelectric element 17. At this time, the piezoelectric element 17 maintains its state just before it receives the drive signal of logical "0". If the print data is input to the switch circuit 16 in synchronism with the timings of generating the drive pulses, one or a plural number of the drive pulse may be selected.

In the embodiment, as shown in a table in FIG. 4, four different dots are used for expressing a gray tone of an image or text on a printing substrate, e.g., paper. A 1st dot is a no dot, assigned a gray tone value 1; a second dot is a small dot, assigned a gray tone value 2; a third dot is a medium dot, assigned a gray tone value 3; and a fourth dot is a large dot, assigned a gray tone value 4. Thus, a gray tone of the dot is expressed using the four gray tone values. The gray tone values may be expressed in the form of 2-bit data: A particular example of this is that "00", "01", "10"and "11" are assigned to the gray tone values 1, 2, 3 and 4, respectively.

In the case defined by the tone value 1, viz., no drop of ink is ejected, the 4th pulse causing a minute vibration of the meniscus of ink is applied to the piezoelectric element. In this case, "0" is applied to the switch circuit 16 when the 1st to 3rd pulses are generated, and "1" is applied to the same at the timing of generating the 4th pulse. As a consequence, only the 4th pulse is applied to the piezoelectric element 17. Specifically, 2-bit data, "00", representative of the tone value 1 is converted into 4-bit data, "0001", whereby only the 4th pulse is applied to the piezoelectric element 17 to thereby deposit no dot of the gray tone value 1 on the printing substrate.

The small dot of the gray tone value 2 is deposited on the printing substrate in a manner that "0" is applied to the switch circuit 16 during the periods of the 1st, third and 4th pulses, and "1" is applied to the switch circuit 16 in synchronism with the generation of the 2nd pulse. Specifically, "01" representative of the tone value 2 data is decoded into the 4-bit data, "0100", which in turn is applied to the switch circuit 16. The 4-bit data enables the switch circuit 16 to allow only the 2nd pulse to go to the piezoelectric element 17. A drop of ink corresponding to a small dot is ejected and deposited on the printing substrate to thereby form a small dot thereon.

Similarly, the 4-bit data "1000", decoded from the 2-bit data "10" of the tone value 3, is applied to the switch circuit 16 which in turn allows only the 1st pulse to go to the piezoelectric element 17, whereby a medium dot of the tone value 3 is deposited on the printing substrate.

The 4-bit data "1010", decoded from the 2-bit data !11" of the tone value 3, is applied to the switch circuit 16 which in turn allows only the 1st and 3rd pulses to go to the piezoelectric element 17. In turn, two drops of ink corresponding to the medium dots are successively ejected and deposited on the printing substrate, whereby the two ink drops are mixed to form a large dot of the tone value 4.

Where the print data is thus constructed by assigning 1 bit to each drive pulse, a desired drive pulse may be selected by use of the value of each bit. A signal representative of the data of 1 bit assigned to the drive pulses may be expressed as a "pulse select signal".

The print data is generated by the control unit 6 as "print data generating means", and stored into the output buffer 4C. In a case where the 4th pulse is omitted, the gray tone is expressed by 3-bit data: the no dot formation of the gray tone value 1 is expressed as "010", the medium dot formation of the gray tone value 2, as "100"; the large dot formation by two medium dots, as "101". The 3-bit data is input to the switch circuit 16 for dot formation.

How the ink jet printer operates when the print data of 4 bits is applied to the switch circuit 16 and the like thereof will be described in detail with reference to a waveform diagram shown in FIG. 8.

A tone value (b1, b0) of 2 bits on each nozzle has been decoded into 4-bit print data (D1, D2, D3, D4) and stored in the output buffer 4C. D1 of the print data indicates a 1st pulse select signal; D2, a 2nd pulse select signal; D3, a 3rd pulse select signal; and D4, a 4th pulse select signal. The 4-bit print data is input to the switch circuit 16 within one print period.

Where the print head 10 includes an n number of nozzles, print data on the 1st nozzle of those arrayed vertically or in the sub-scanning direction is expressed as (D11, D21, D31, D41), print data on the second nozzle, as (D12, D22, D32, D42), and so on. In this case, data of the 1st pulse select signal D1 on all the nozzles are serially input, in the order of D11, D12, D13, . . . , D1n, to the shift register 13 in synchronism with a clock signal (CK). Similarly, data of the 2nd pulse select signal D2 on all the nozzles are serially input to the same in the order of D21, D22, D23, . . . , D2n; data of the 3rd pulse select signal D3 on all the nozzles are serially input to the same in the order of D31, D32, D33, . . . , D3n; and data of the 4th pulse select signal D4 on all the nozzles are serially input to the same in the order of D41, D42, D43, . . . , D4n. The transmission of those items of data of the 1st to 4th pulse select signals D1 to D4 to the shift register 13 is performed during one print period.

More specifically, before a target drive pulse is generated, print data to select the drive pulse is transferred to the shift register 13. In synchronism with the target drive pulse, the print data is transferred to and stored in the latch circuit 14, from the shift register 13. The print data is then read out of the latch circuit 14 and applied to the level shifter 15 where its voltage is increased to a preset voltage. Then, the printed data thus voltage level shifted is input to the switch circuit 16.

Figure 8:
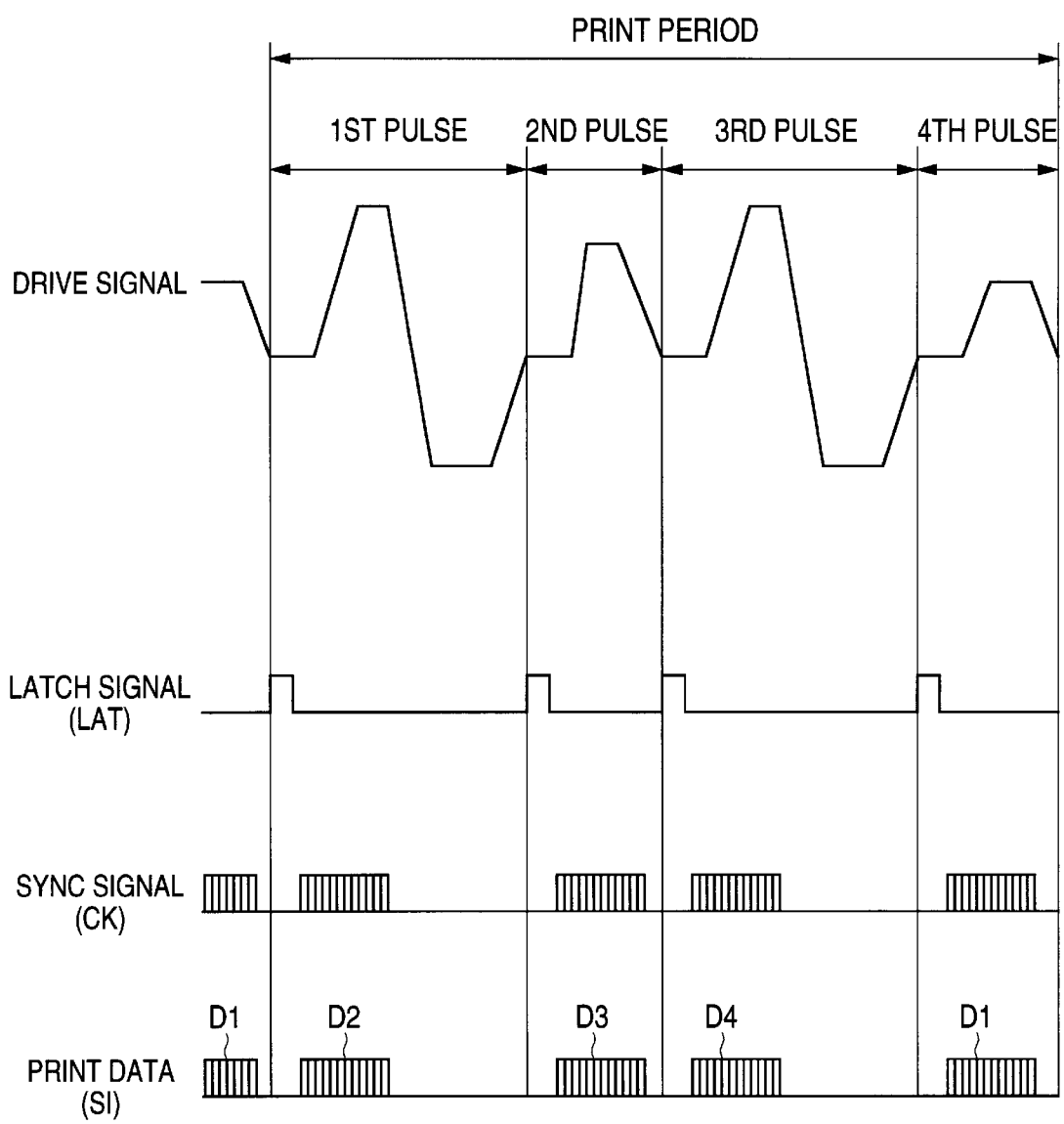

As shown in FIG. 8, the data of the 1st pulse select signal D1 is transferred to the shift register 13 within the period of generating the 4th pulse preceding to the 1st pulse generation period. A latch signal (LAT) is generated when the 1st pulse is generated. At this time, the print data of the select signal D1, stored in the shift register 13, is converted into a parallel signal, and transferred to and latched in the latch circuit 14. This print data is level shifted by the level shifter 15 and then input to the switch circuit 16. When the value of the select signal D1 that is applied to a nozzle is logically "1", the piezoelectric element 17 expands and contracts in accordance with the 1st pulse. As a result, an ink droplet corresponding to the medium dot is ejected from that nozzle. This ink droplet is deposited on the printing substrate to form a medium dot thereon. When the select signal D1 applied thereto is logically "0", no pulse is applied to the piezoelectric element 17, so that no ink droplet is ejected. Similarly, the data of the select signals D2 to D4 are each transferred to the shift register 13 during the period preceding to the target drive pulse generating period.

Figure 9:
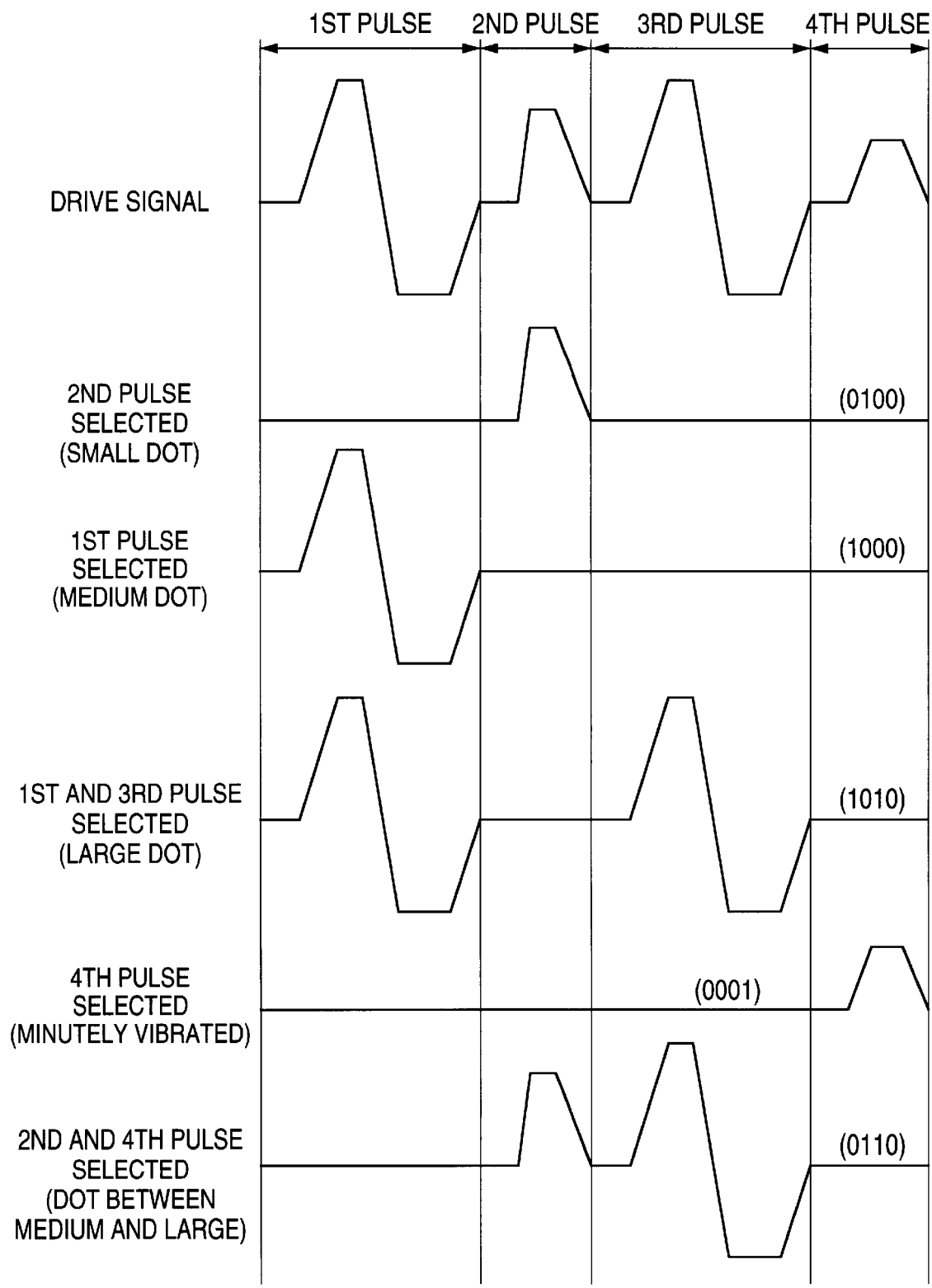
FIG. 9 is a timing diagram showing several pulse patterns of the drive signal showing in FIG. 4.

FIG. 9 is a diagram showing several pulse patterns of a drive signal when any and some of the 1st to 4th pulses of the drive signal are selected and combined. As already described, when the print data is "0100", a small dot is deposited on the print medium; when it is "1000", a medium dot is formed; when it is "1010", a large dot is formed; when it is "0001", no dot is formed, viz., the meniscus 40 of ink in the nozzle hole of the nozzle plate is minutely vibrated.

When the print data "0110", as of the lowermost pulse pattern in FIG. 9, is applied to the print head, ink droplets corresponding to small and medium dots are successively ejected toward the printing substrate. In this case, the ink droplets of small and medium dots are merged on the printing substrate, to thereby form a dot whose size is between the medium dot and the large dot.

It is noted here that the ink droplet of the small dot is 1st ejected, and the ink droplet of the medium dot is then ejected. If the order of ejecting those ink droplets is reversed, viz., the ink droplet of the medium dot is 1st ejected and the ink droplet of the small dot is then ejected, at least two kinds of times must be taken into consideration. A 1st time is taken for supplementing the volume of ink corresponding to the already ejected ink droplet of the medium dot size. A second time ranges from an instant that the ink droplet is ejected till a residual vibration of the meniscus is settled down. It is noted, again, that In the present invention, an ink drop of the small dot size is 1st ejected, and then an ink drop of the medium dot size is ejected, as mentioned above. Therefore, the ink supplementing time is short, and the residual vibration of the meniscus is also swiftly settled down. Therefore, it is possible to successively eject two ink drops of different weights during one print period. When the 2nd and 3rd pulses are successively applied to the piezoelectric element 17, a time space between the 2nd and 3rd pulses is preferably set to be equal to the maximum drive period of the print head 10.

Thus, in the present embodiment, a drive signal of a basic waveform is composed of a plural number of drive pulses. Print data having bit data dependent on the drive pulses is applied to the switch circuit 16 of the print head contained in the print engine. Therefore, one or plural number of ink droplets can be ejected from a single nozzle during one print period. It is possible to express dots deposited on the printing substrate every dot in a multiple of gray-tone levels. A high quality of print is realized without decreasing the printing speed.

Since the time space between the 2nd and 3rd pulses is equal to the maximum drive period of the print head 10, it is possible to eject the ink drops of the medium dot size in succession. If the 4th pulse is not used, all a designer has to do is to maintain the medium potential Vm for the duration of the 4th pulse.

Since a single drive signal comprising a plural number of drive pulses is used for the drive signal, there is no need of using a plural number of pulse generators, and the number of signal lines between the print controller and the print head is reduced.

<Second Embodiment>

A second embodiment of the present invention will be described with reference to FIGS. 10 and 11. In the description to follow, like or equivalent portions will be designated by like reference numerals used in the drawings referred to in the 1st embodiment description, and no description on them will be omitted.

Figure 10:
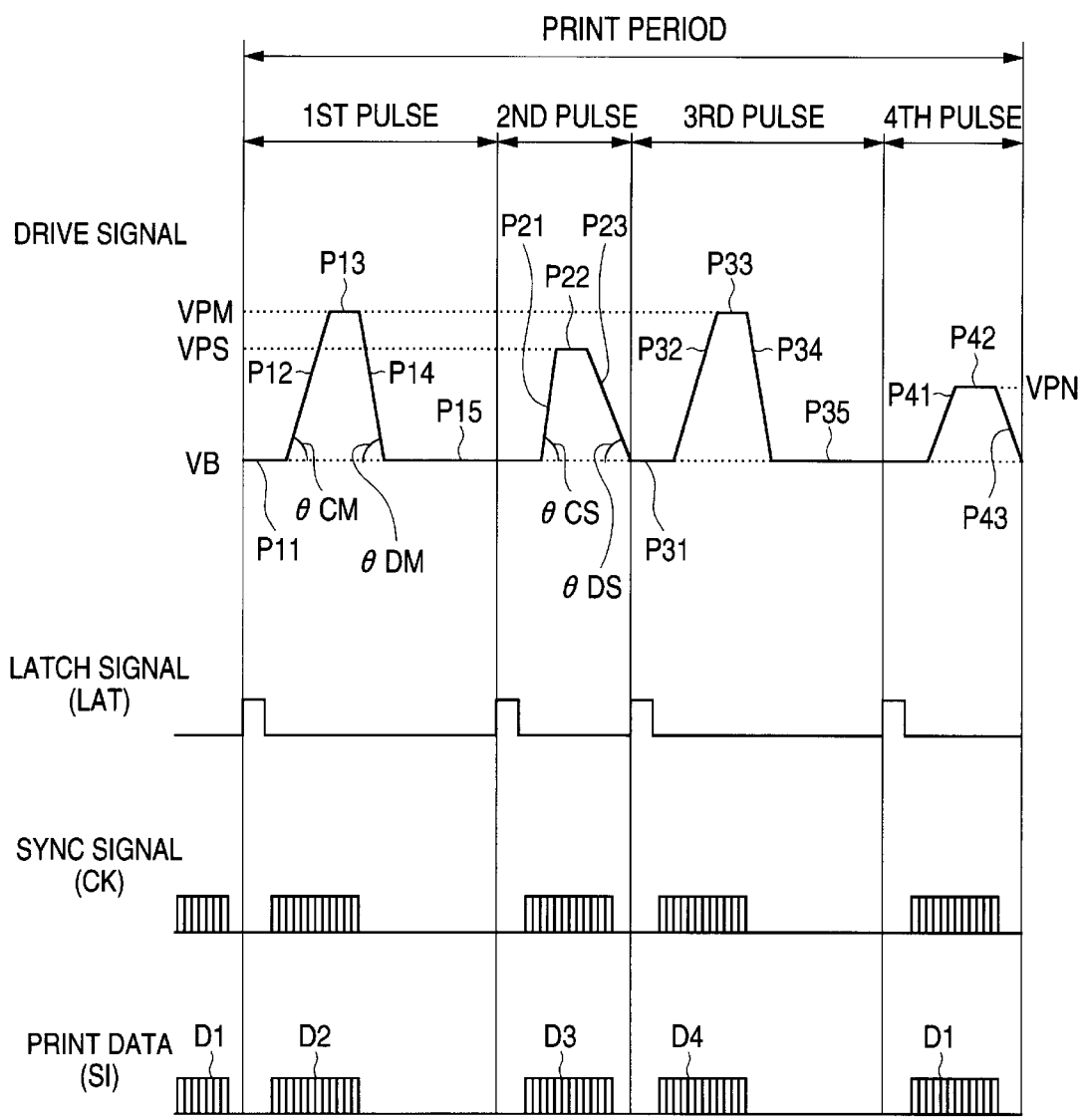

A drive signal used in the embodiment shown in FIG. 10, as in the 1st embodiment, is also composed of 1st and 3rd pulses for causing the ejection of the ink drop of the medium dot size, and a 2nd pulse causing the ejection of the ink drop of the small dot size, and a 4th pulse for vibrating the meniscus of ink in the nozzle hole of the nozzle plate. In the second embodiment, the base potential VB is used in place of the medium potential Vm as the reference for the voltage variation, and the waveform of each drive pulse is trapezoidal.

As shown, the 1st pulse starts to rise from the base potential VB at a preset inclination θCM (P11), and reaches the maximum potential VPM (P12). The drive signal maintains the maximum potential VPM for a preset period of time (P13), and then falls to the base potential VB at a preset inclination θDM (P14), and maintains its potential at the base potential VB (P15). The discharging inclination θDM is larger than the charging inclination θCM. The maximum potential VPM maintaining time is set at such a short time as to prevent the meniscus from resuming its just-before state.

The 2nd pulse rises from the base potential VB at a preset inclination θCS up to the maximum potential VPS (P21), and maintains the maximum potential VPS for such a short time as to prevent the meniscus from resuming its just-before position. Then, the 2nd pulse falls from the maximum potential VPS to the base potential VB at a preset inclination θDS. The charging inclination θCS is larger than the discharging inclination θDS.

The 3rd pulse takes the same waveshape as of the 1st pulse. Therefore, its explanation is omitted here. A time space existing between the 1st and 3rd pulses is set to be equal to the maximum drive period.

The 4th pulse for minutely vibrating the meniscus rises from the base potential VB to the maximum potential VPN (P41), and maintains the maximum potential VPN (P42), and thereafter falls to the base potential VB (P43).

Figure 11:
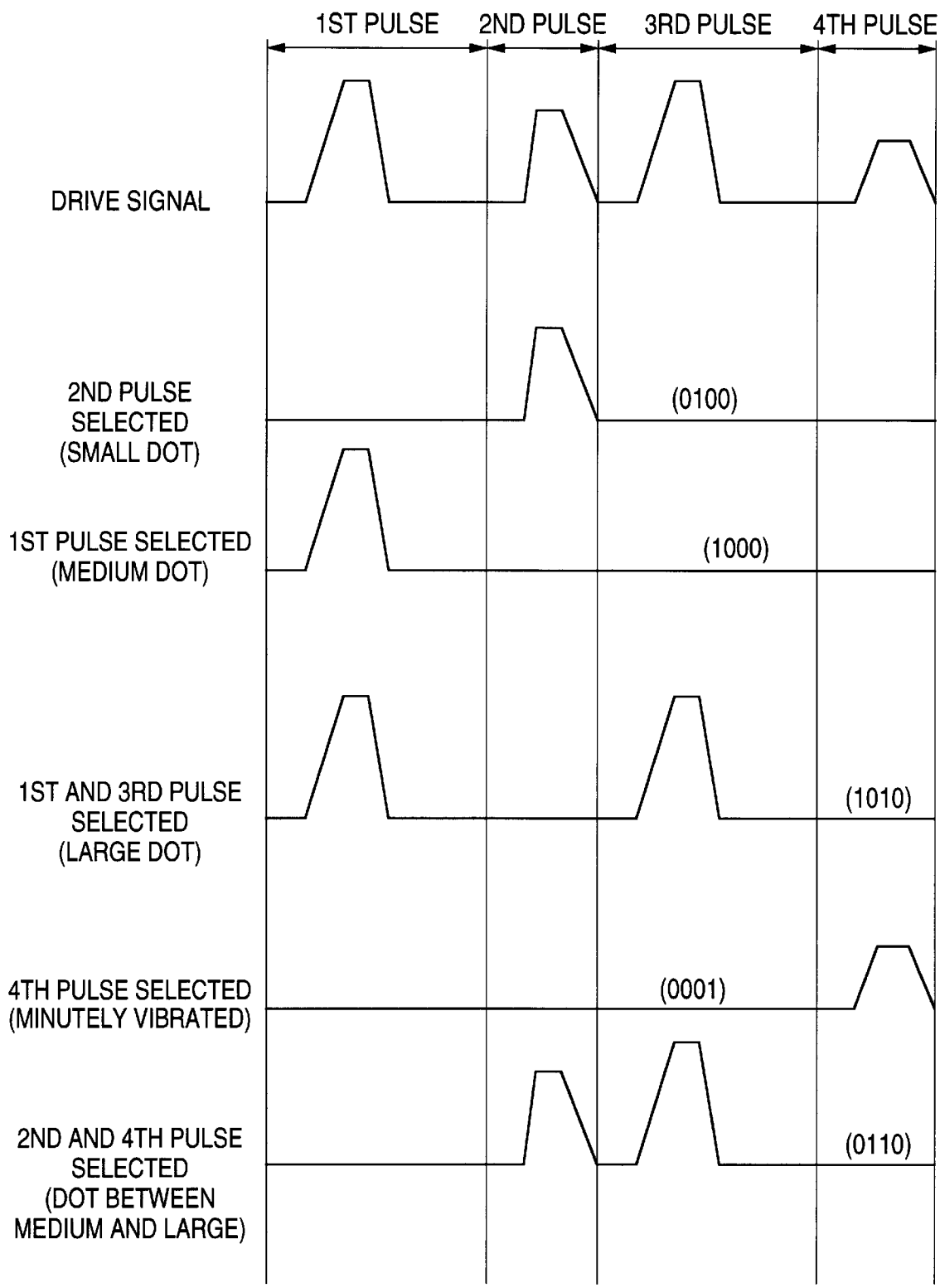
FIG. 11 is a timing diagram showing several pulse patterns of the drive signal showing in FIG. 10.

FIG. 11 is a waveform diagram showing several pulse patterns of a drive signal when any and some of the 1st to 4th pulses of the drive signal are selected and combined. As stated above, when only the 2nd pulse is selected, a small dot is printed on the print material (print data "0100"). When only the 1st pulse is selected, a medium dot is formed on the printing material (print data "1000"). When the 2nd and 3rd pulses are selected, ink drops of the medium dot size are successively deposited on the printing material, merged thereon to from a large dot (print data "1010"). When the 4th pulse alone is selected, the meniscus of ink in the nozzle hole is minutely vibrated (print data "0001"). When print data "0110" is applied to the switch circuit 16, the 2nd and 3rd pulses are selected, so that an ink drop of the small dot size and an ink drop of the medium dot size are ejected in succession. The result is to form a dot of the size between the medium dot and the large dot.

<Third Embodiment>

A third embodiment of the present invention will be described with reference to FIGS. 12 and 13.

Figure 12:
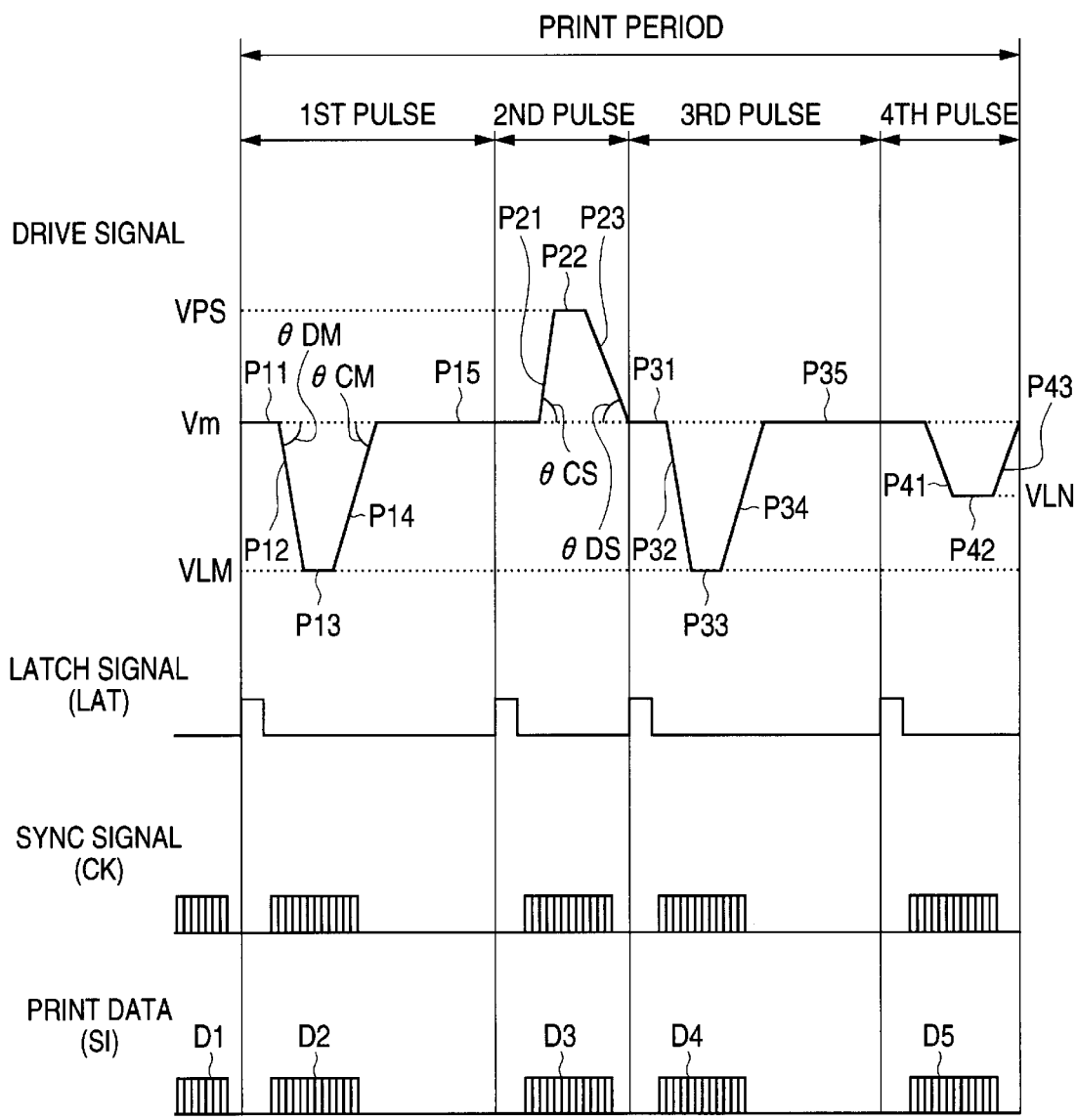

As shown in FIG. 12, a drive signal of the third embodiment is also composed of 1st and 3rd pulses for causing the ejection of the ink drop of the medium dot size, and a 2nd pulse causing the ejection of the ink drop of the small dot size, and a 4th pulse for vibrating the meniscus of ink in the nozzle hole of the nozzle plate.

The 1st pulse falls from the medium potential Vm to a 1st minimum potential VLM at a preset inclination θDM (P12). The drive signal maintains the first minimum potential VLM for a short time (P13), and then rises up to the medium potential Vm at a preset inclination θCM (P14), and maintains the medium potential Vm (P15). The discharging inclination θDM is larger than the charging inclination θCM. The 3rd pulse takes the same waveshape as of the 1st pulse, and a time space between the 1st pulse and the 3rd pulse is set to be equal to the maximum drive period of the print head.

The 2nd pulse rises from the medium potential Vm to the maximum potential VPS at a preset inclination θCS(P21), and maintains the maximum potential VPS for such a time period as to prevent the maximum potential VPS from resuming its just-before position. Then, it falls from the maximum potential VPS to the medium potential Vm at a preset inclination θDS. Here, the charging inclination θCS is larger than the discharging inclination θDS.

The 4th pulse falls from the medium potential Vm to a second minimum potential VLN (P41), keeps its potential state for a short time period of time (P42), and finally returns to the medium potential Vm (P43).

Figure 13:
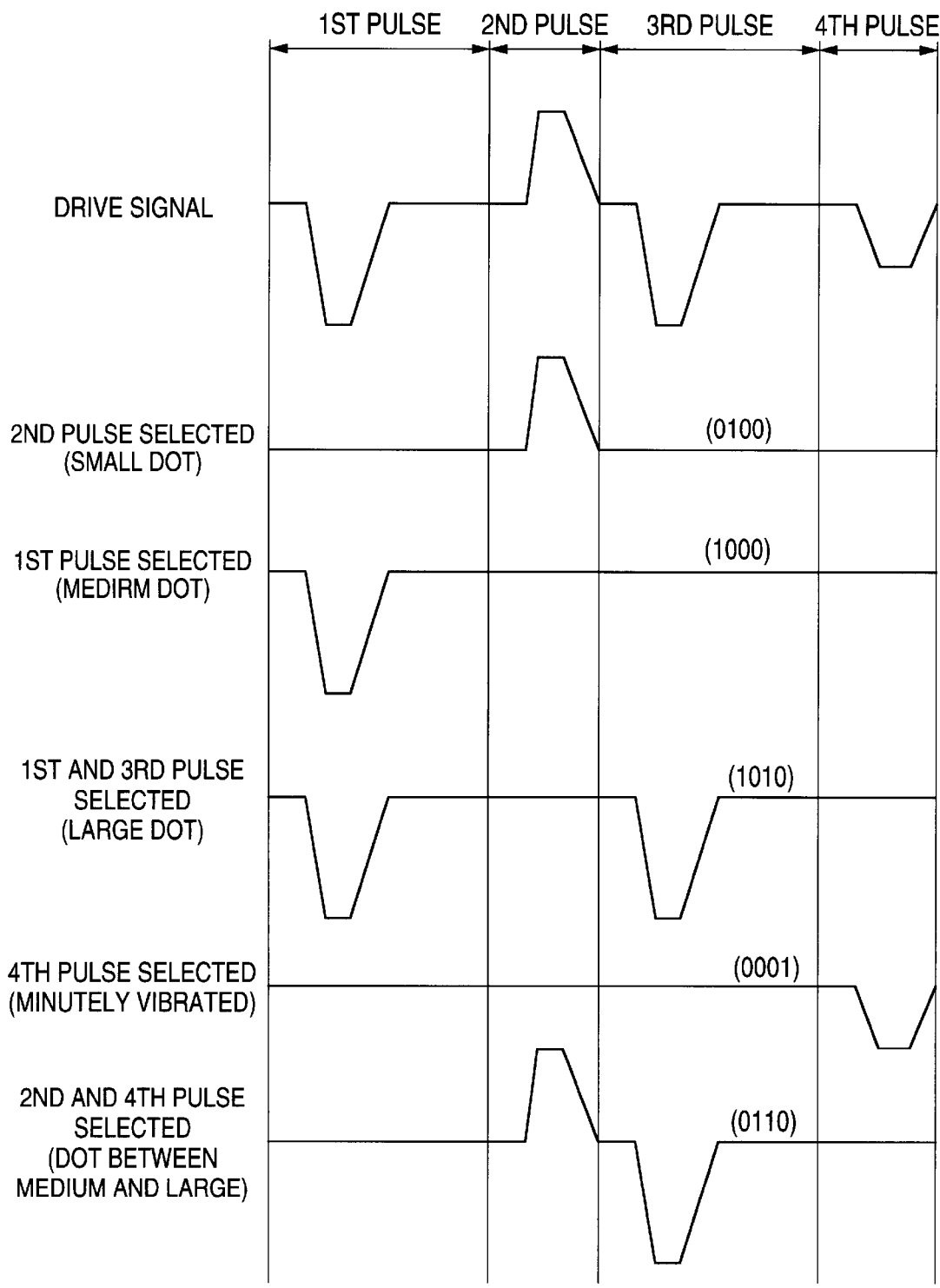
FIG. 13 is a timing diagram showing several pulse patterns of the drive signal showing in FIG. 12.

FIG. 13 is a waveform diagram showing several ink drop ejecting patterns in the third embodiment. As in the previous embodiments, small, medium, and large dots, and dot of the size between the medium and large dots are formed, and the meniscus is minutely vibrated.

<Fourth Embodiment>

A fourth embodiment of the present invention will be described with reference to FIGS. 14 through 17.

Figure 14:
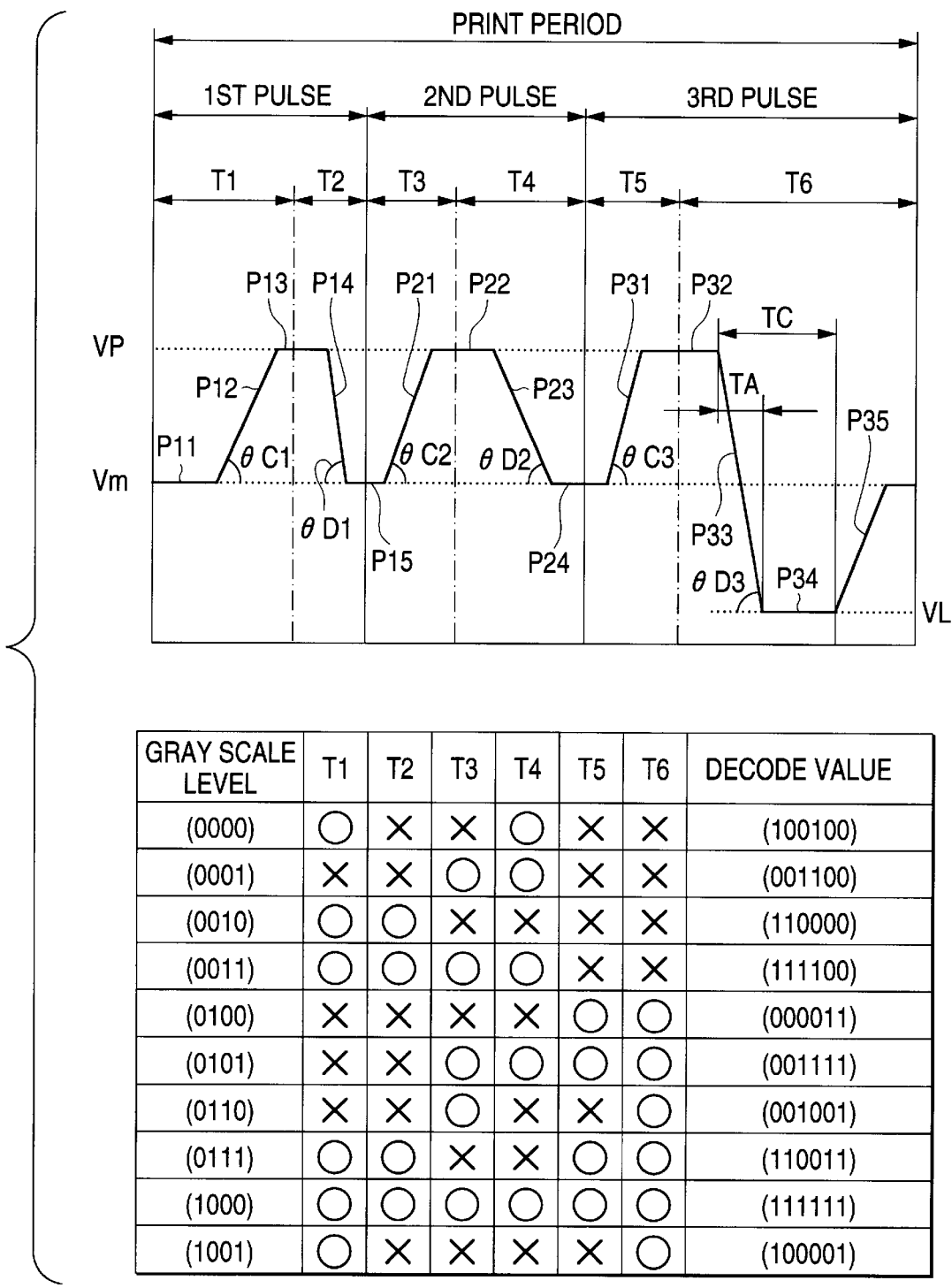

In the present embodiment, the pulse elements of the drive signal are combined to additional drive pulses. FIG. 14 is a diagram showing the relation of a drive signal and gray tone values.

A 1st pulse is used for ejecting an ink drop of approximately 5 ng. A 2nd pulse is for ejecting an ink drop of approximately 2 ng. A 3rd pulse is for ejecting an ink drop of about 10 ng. The ink drop ejected by the 1st pulse is deposited on the printing material to form a dot of the small diameter (small dot) thereon. The ink drop ejected by the 2nd pulse is deposited on the printing material to form a dot of the extremely small diameter (extremely small dot) thereon. The ink drop by the 3rd pulse is deposited on the printing material to form a dot of the medium diameter (medium dot) thereon.

The 1st pulse rises in voltage value from the medium potential Vm (P11) to the maximum potential VP at a preset inclination θC1 (P12), maintains the maximum potential VP for a preset time (P13). The 1st pulse descends in potential value from the maximum potential VP to the medium potential Vm at a preset inclination θD1 (P14), and maintains the medium potential Vm. The charging inclination θC1 is larger than the discharging inclination θD1.

The 2nd pulse, as the 1st pulse, starts to ascend in voltage variation profile from the medium potential Vm to the maximum potential VP at a preset inclination θC2 (P21). After the 2nd pulse maintains the maximum potential VP for a preset time (P22), it descends to the medium potential Vm at a preset inclination θD2 (P23), and keeps the medium potential Vm (P24). In the case of the 2nd pulse, the charging inclination θC2 is larger than the discharging inclination θD2.

A voltage variation profile of the 3rd pulse is as follows: the 3rd pulse starts to ascend from the medium potential Vm to the maximum potential VP at a preset inclination θC3 (P31), and the maximum potential VP is continued for a preset time (P32). Then, the 3rd pulse descends from the maximum potential VP to the minimum potential at a preset inclination θD3 (P33).

In this pulse profile, the discharging inclination θD3 is larger than the charging inclination θC3. A time taken for the 3rd pulse to drop from the maximum potential VP to the minimum potential VL is set to be substantially equal to the period TA of the natural frequency of the piezoelectric element 17. The minimum potential VL is preferably set at a ground level (0V) or a positive potential in order to prevent the polarization of the piezoelectric element 17 from being reversed.

In the waveshape profile of the 3rd pulse, the minimum potential VL continues for a preset time (P34), and then its voltage value rises to the medium potential Vm again (P35). A time ranging from the start of the voltage decreasing till the continuation of the minimum potential VL terminates is set to be substantially equal to the period TC (Helmholtz period) of a natural frequency of ink.

Each of the 1st to 3rd pulses is divided, in the pulse width, into two portions. In other words, it may be considered that each drive pulse comprises a couple of right and left waveform elements. More specifically, the 1st pulse is divided, in its waveform segment P13, into a couple of waveform elements of time periods T1 and T2. The 2nd pulse is divided, in its waveform segment P22, into a couple of waveform elements of time periods T3 and T4. The 3rd pulse is divided, in its waveform segment P32, into a couple of waveform elements of time periods T5 and T6.

If those waveform elements are selectively combined, it is possible to generate some new drive pulses, which are not found in the original drive signal. The present embodiment can secure a larger number of pulse patterns of the drive signal than the aforementioned embodiments, and therefore can express image and text in an increased level on the gray scale. In the description to follow, those newly generated drive pulses will be referred to as "composite drive pulses".

Figure 15:
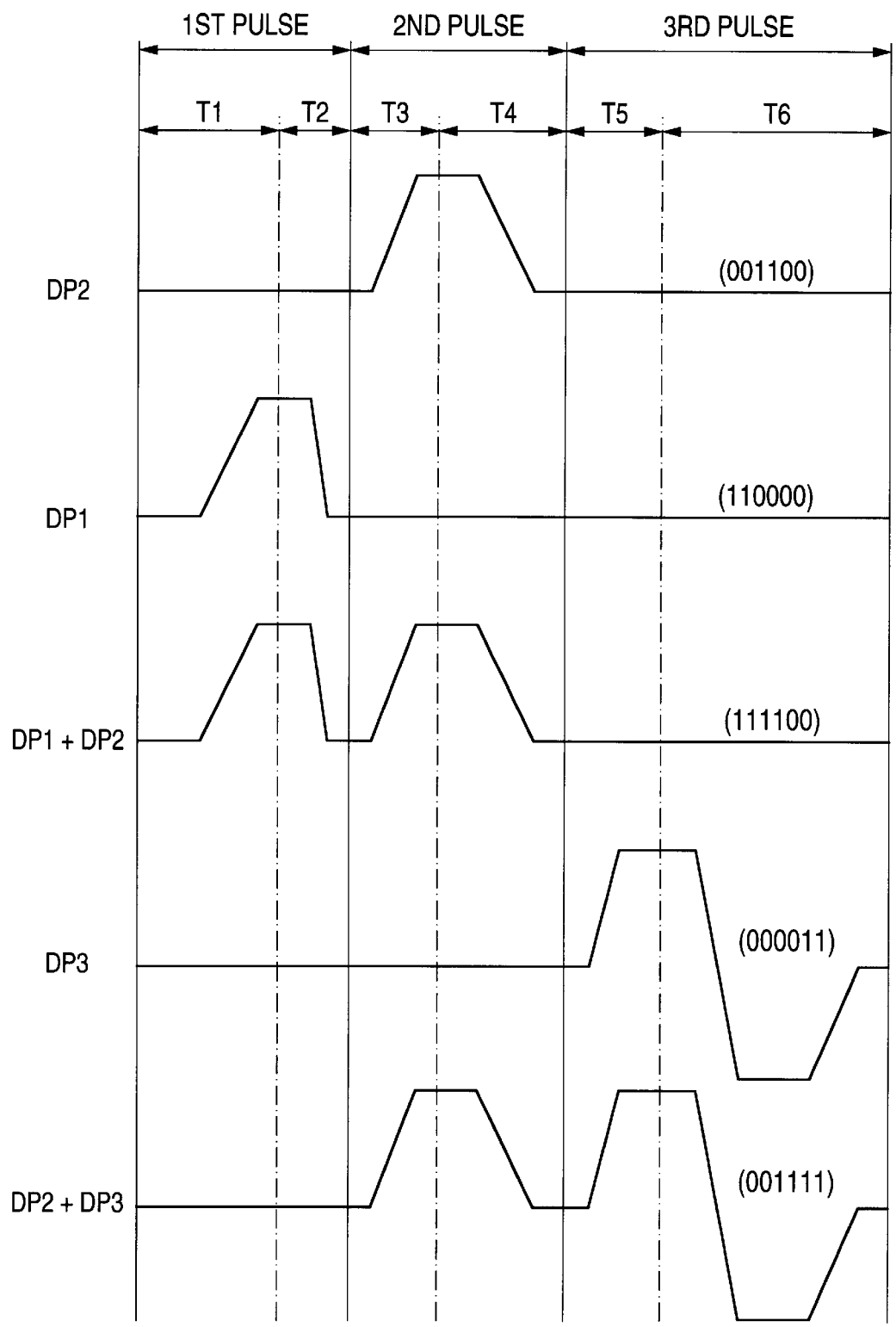
FIG. 15 is a timing diagram showing several pulse patterns of the drive signal showing in FIG. 14.
Figure 16:
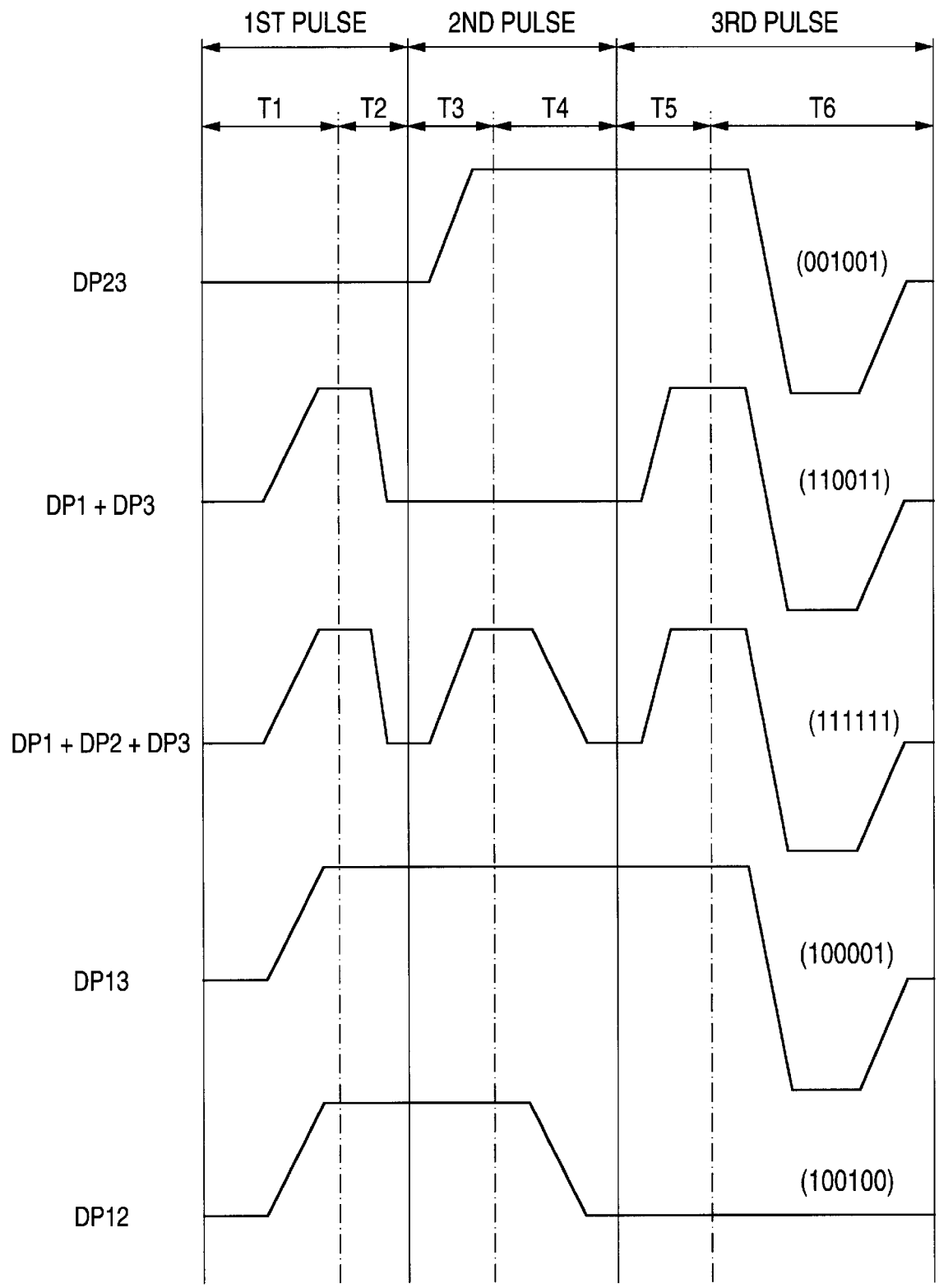
FIG. 16 is a timing diagram showing other pulse patterns of the drive signal showing in FIG. 14.

FIGS. 15 and 16 show pulse patterns, selectable, of drive signals. In these figures, those pulse patterns are illustrated in the ascending order of the weights of ink drops from top to bottom.

In the waveform chart of FIG. 15, the pulse patterns of the drive signal are indicated by DP2, DP1, DP1+DP2, DP3, and DP2+DP3 attached to the left ends of them. DP2 indicates a pulse pattern of the drive signal, which includes only the 2nd pulse. DP1 indicates a pulse pattern including on the 1st pulse. DP1+DP2 indicates a pulse pattern of the combination of the 1st and 2nd pulses. DP3 indicates a pulse pattern including only the 3rd pulse. DP2+DP3 indicates a pulse pattern including the combination of the 2nd and 3rd pulses. In FIG. 16, DP23, attached to the waveform profile, indicates a new pulse pattern formed by coupling the 2nd and 3rd pulses in a manner to be described later. Similarly, DP13 indicates another pulse pattern formed by coupling the 1st and 3rd pulses. DP1+DP3 indicates a pulse pattern including the combination of the 1st pulse and 3rd pulse. DP1+DP2+DP3 indicates a pulse pattern of the combination of the 1st to 3d pulses.

It is assumed that the weights of ink drops ejected by those drive signals are: DP1=5 ng, DP2=2 ng, DP3=10 ng, DP13=20 ng, and DP23=14 ng. Then, the weights of the ink drops caused by those drive signals, or pulse patterns, are:

DP2<DP1<DP1+DP2<DP3<DP2+DP3<DP23<DP1+DP3<DP1+DP2+DP3<DP13.

The drive pulse DP12 illustrated as the lowermost drive signal in FIG. 16 is provided for minutely driving the meniscus, i.e., a nonprint drive pulse not ejecting the drop of ink. Incidentally, the drive pulse DPl2 is a composite pulse formed by coupling the 1st and 2nd pulses.

How to compose new drive pulses from the 1st to 3rd pulses as original drive pulses and how to express image and text in multilevel on the gray scale by selecting one or more composite pulses and original pulses will be described.

In the present embodiment, a maximum of 10 pulse patterns can be obtained for the drive signal. Therefore, the gray tone can be expressed in a maximum of 10 levels. In the case of 10 gray-tone levels, each gray tone value can be expressed in a compressed form by 4-bit data (see the leftmost column in the table in FIG. 14). To obtain a desired gray tone by driving the piezoelectric element 17, it is necessary to decode the 4-bit data indicative of the gray tone value into data of 6 bits corresponding to the time periods T1 to T6 within the print period (see the rightmost column in the table of FIG. 14). In the present embodiment, the decoding from the 4-bit data into the 6-bit data is carried out by the control unit 6.

A gray tone value gained by selecting the 2nd pulse is expressed by 4-bit data "0001", or in the compressed form. To actually apply only the 2nd pulse to the piezoelectric element 17, it is necessary to set the print data to be applied to the switch circuit 16 at "1" for the time periods T3 and T4 of the 2nd pulse. To this end, the 4-bit data of the gray tone value, "0001", is converted into the 6-bit data "001100", whereby only the 2nd pulse is applied to the piezoelectric element 17. Similarly, to select only the 1st pulse, it is necessary to do is to set the print data at "1" for the time periods T1 and T2. To select only the 3rd pulse, it is necessary to do is to set the print data at "1" for the time periods T5 and T6.

How to generate new drive pulses follows. A case of composing a new drive signal having the pulse pattern DP23 from the 2nd and 3rd pulses (the uppermost pulse pattern in FIG. 16) will be described by way of example. If the print data is set to "1" at the start of the time period T3, voltage is applied to the piezoelectric element 17 in accordance with a wave profile of the waveform element during the time period T3. Then, the print data is set to "0" at the start of the time period T4, and a state of "0" is continued till the subsequent time period T5 is terminated.

In the state that the print data is set at "0", a voltage variation of the drive signal is not transferred to the piezoelectric element 17. In this state, the piezoelectric element 17 holds charge, and the voltage across the piezoelectric element 17 is kept at its just-before voltage VP. Strictly, the piezoelectric element 17 discharges and looses a slight amount of charge during the "0" state of the print data. However, no problem arises practically since the discharging operation continues for a very short time.

If the print data is set to "1" at the start of the time period T6, the drive signal is again applied to the piezoelectric element 17, and the piezoelectric element 17 is swiftly discharged and expands. The result is to form a new composite drive pulse formed by coupling the 2nd and 3rd pulses (see the uppermost pulse pattern in FIG. 16), and apply it to the piezoelectric element 17.

Thus, the waveform elements are coupled with each other in a manner that the print data is set to "1" during the appearance of each of those waveform elements, and it is set to "0" during time interval between those waveform elements. Data of one bit assigned to each of the waveform elements corresponds to a "pulse select signal". The potential values of the waveform elements at the junction point between them are preferably equal to each other in order to prevent rush current from flowing through the transistors of the switch circuit 16. The rush current possibly damages the transistors.

Figure 17:
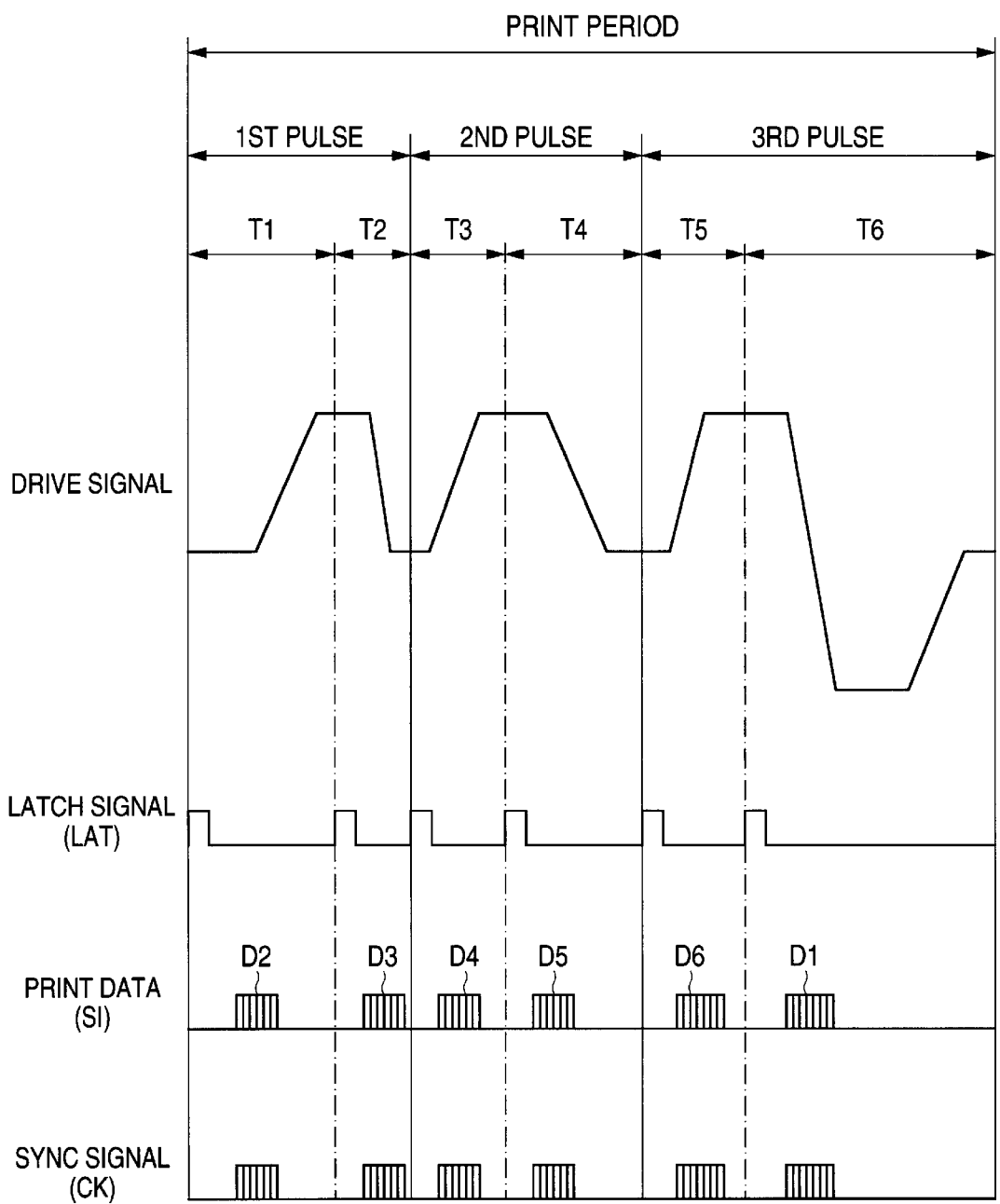

How the ink jet printer operates when the print data of 4 bits is applied to the switch circuit 16 and the like will be described in detail with reference to a waveform diagram shown in FIG. 17.

A gray tone value (b3, b2, b1, b0) of 4 bits for each nozzle is decoded into 6-bit print data (D1, D2, D3, D4, D5, D6), and the decoded print data is stored in the output buffer 4C. D1 is a select signal for selecting the waveform element of the first period T1; D2, a select signal for selecting the waveform element of the second period T2; D3, a select signal for selecting the waveform element of the third period T3; D4, a select signal for selecting the waveform element of the fourth time period T4; D5, a select signal for selecting the waveform element of the fifth time period T5; and D6, a select signal for selecting the waveform element of the sixth time period T6. The 6-bit print data is applied to the switch circuit 16 every nozzle of the print head 10.

As already described in the first embodiment, data (D11, D12, ..., D1n) of the first select signal D1 on all the nozzles (all the piezoelectric elements) is serially input to the shift register in synchronism with a clock signal during one print period. Similarly, the data (D21, D22, ..., D2n) to (D61, D62, ..., D6n) of the remaining select signals, or the second to sixth select signals D2 to D6 are each serially input to the shift register 13 during one print period, in synchronism with the clock signal.

As seen from the foregoing description, in the present embodiment, new drive pulses (DP23, DP13, DP12), not found in the original drive signal, can be composed by coupling the waveform elements of the drive pulses, properly chosen. The number of selectable pulse patterns of the original drive signal is seven. In the present embodiment, however, it is a total of 10 pulse patterns since three composite drive pulses are added to the seven ones. Therefore, image and text may be printed more rich in gray tone.

The tops of the drive pulses of the maximum potential VP are flat and equal in amplitude. The pulse width of each of those drive pulses is divided to form waveform elements. Therefore, desired waveform elements may be coupled together at the equal amplitude or potential (maximum potential VP). If the pulse dividing position is shifted from its correct one because the timing varies, the pulse top width can absorb such a dividing position shift.

<Fifth Embodiment>

A fifth embodiment of the present invention will be described with reference to FIGS. 18 through 20.

Figure 18:
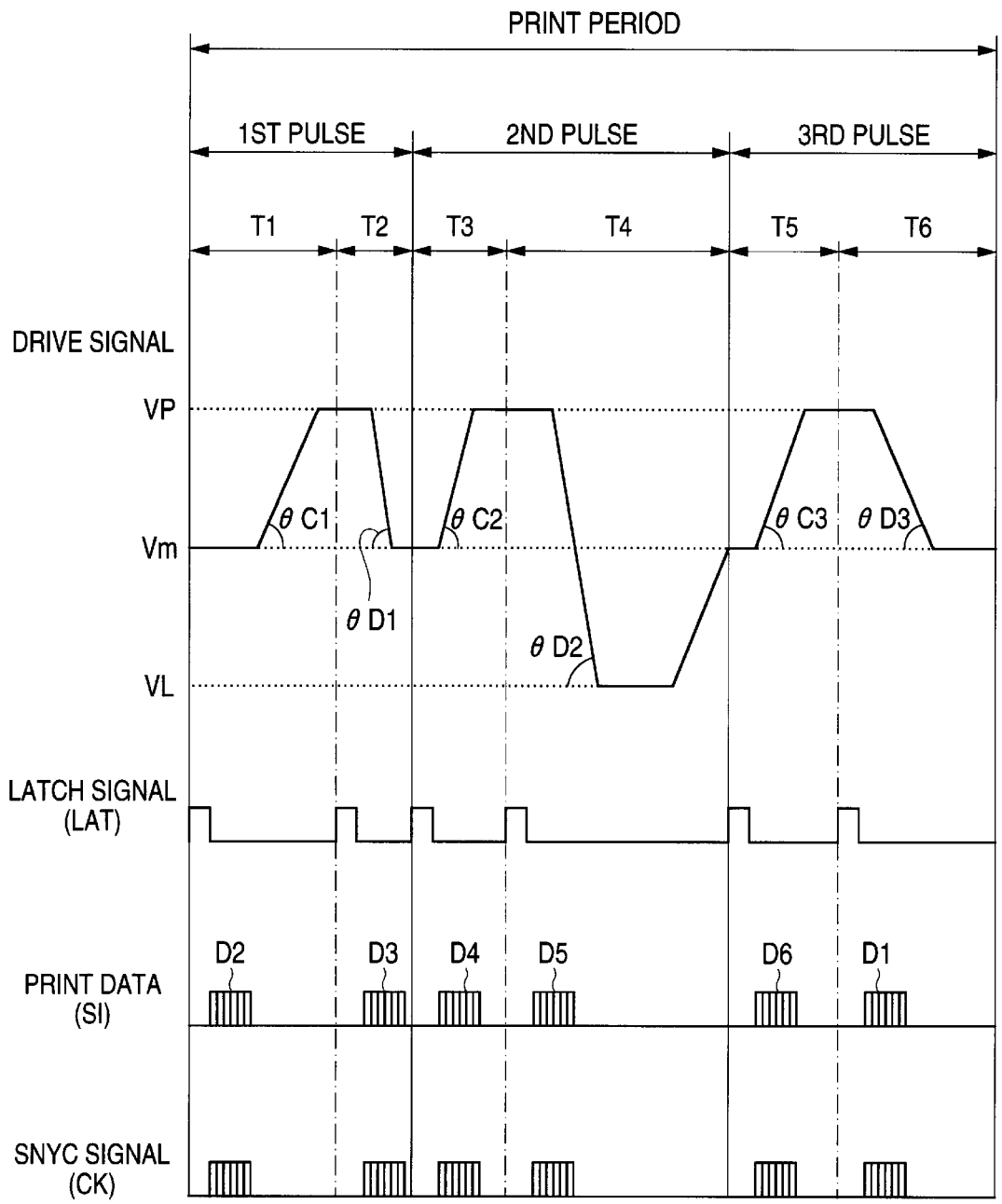

In the fifth embodiment shown in FIG. 18, a drive signal comprises a 1st pulse (for small dot) for ejecting an ink droplet of approximately 5 ng, for example, a 2nd pulse (for medium dot) for ejecting an ink droplet of approximately 10 ng, for example, and a 3rd pulse (for extremely small dot) for ejecting an ink droplet of approximately 2 ng, for example.

Each of those drive pulses continues its maximum potential VP for a short time. Accordingly, the top of a waveshape of each drive pulse is flat. The description of the drive pulses in the fourth embodiment is correspondingly applied to the drive pulses in the present embodiment. The 1st pulse in the present embodiment is equal in shape to the 1st pulse in the fourth embodiment. The 2nd pulse in the present invention is equal in shape to the 3rd pulse in the fourth embodiment. The 3rd pulse is equal in shape to the 2nd pulse in the fourth embodiment. The voltage charging inclination θC and the discharging inclination θD are attached with affixes pulse generation numbers. Accordingly, sometimes the voltage inclinations are different in denotation from those in the fourth embodiment.

Figure 19:
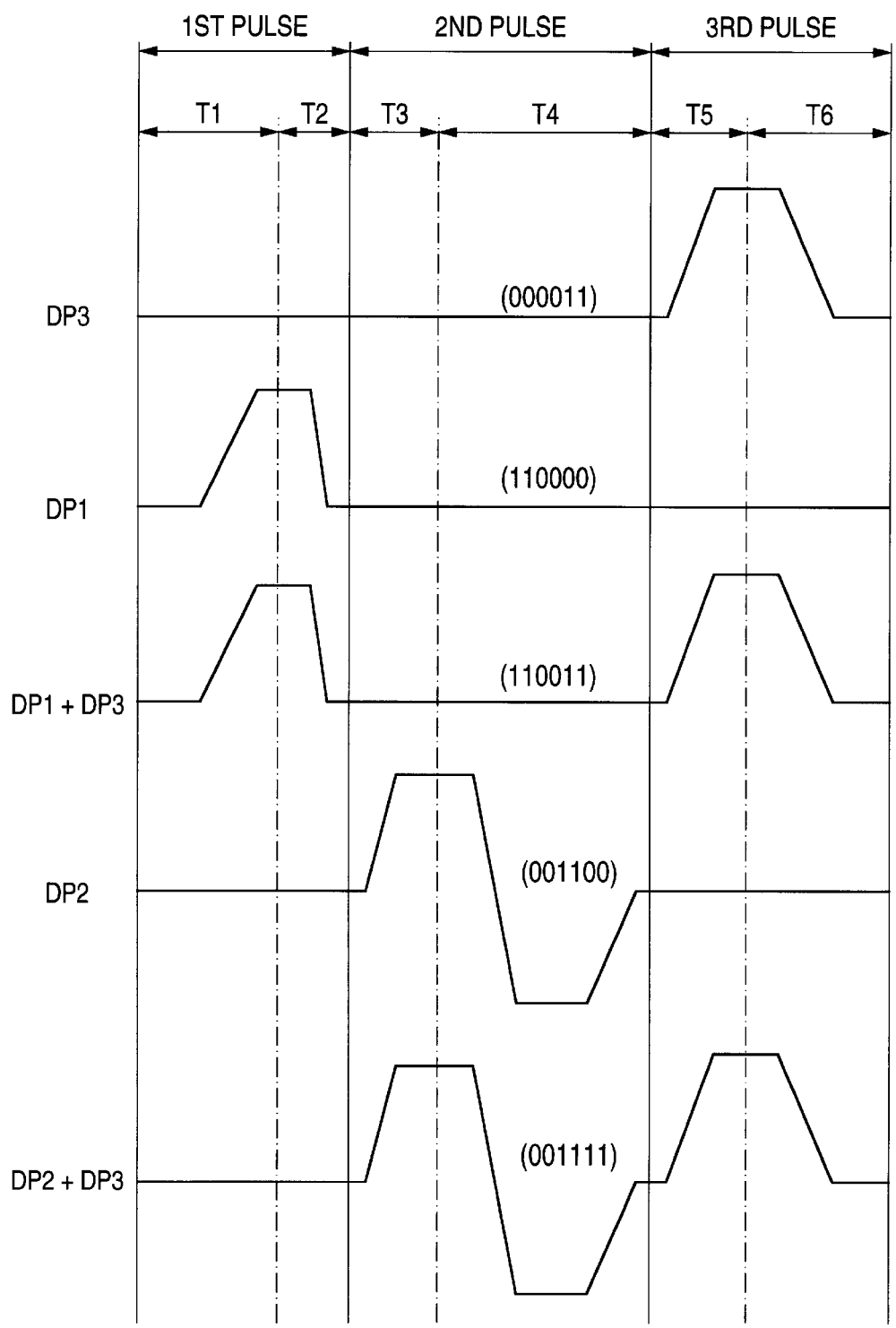
FIG. 19 is a timing diagram showing several pulse patterns of the drive signal showing in FIG. 18.
Figure 20:
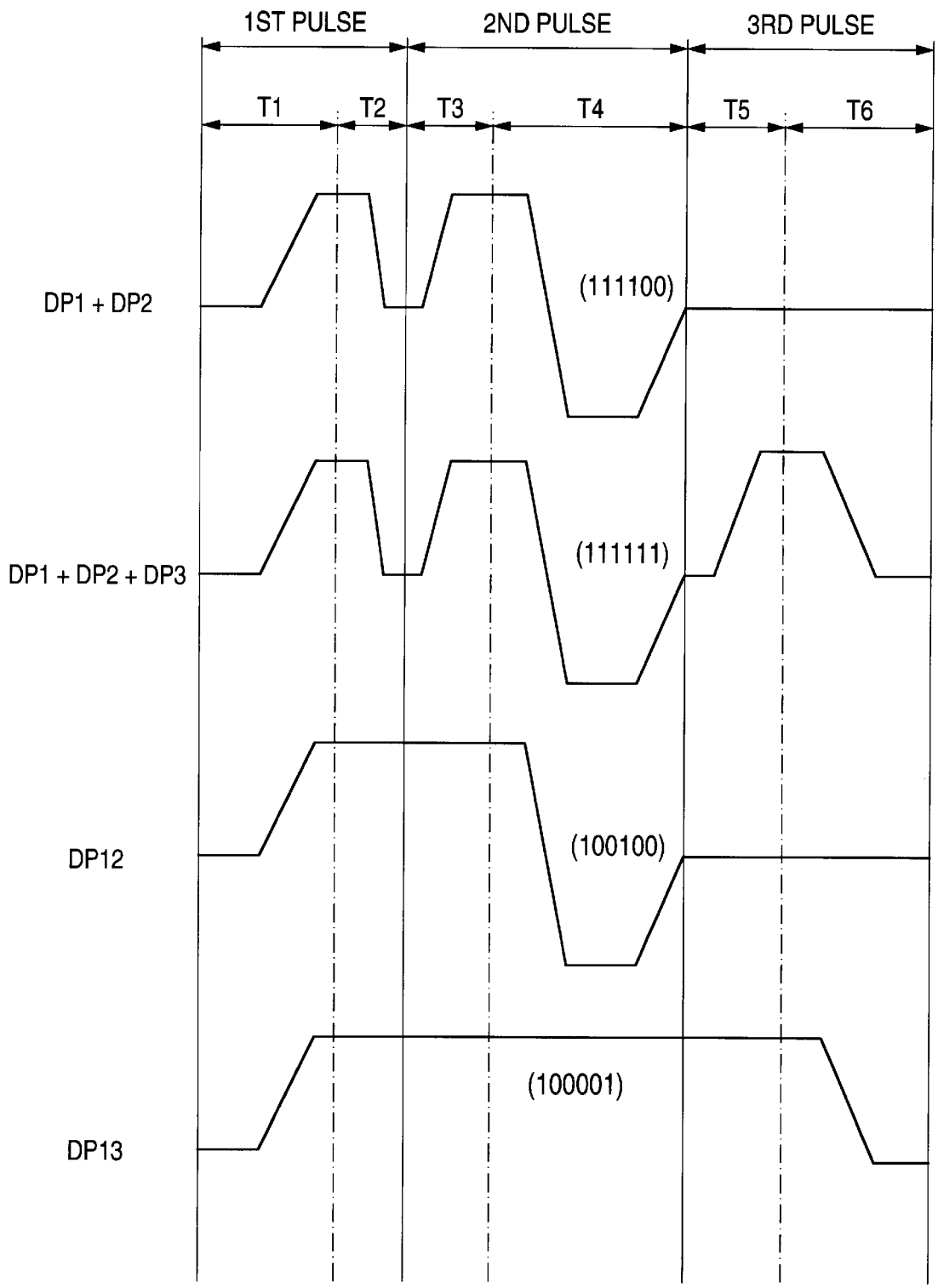
FIG. 20 is a timing diagram showing other pulse patterns of the drive signal showing in FIG. 18.

In the present embodiment, as shown in FIGS. 19 and 20, a total of nine (9) pulse patterns of the drive signal are selectable. It is assumed that the weights of ink drops ejected by those drive signals are: DP1=5 ng, DP2=10 ng, DP3=2 ng, and DP12=20 ng. Then, the weights of the ink drops caused by those drive signals, or pulse patterns, are:

DP3<DP1<DP1+DP3<DP2<DP2+DP3<DP1+DP2<DP1+DP2+DP3<DP12.

The drive pulse DP13 illustrated as the lowermost drive signal in FIG. 20 is provided for minutely driving the meniscus, i.e., a nonprint drive pulse not ejecting the drop of ink. The drive pulse DP13 is a composite pulse formed by coupling the 1st and 3rd pulses.

<Sixth Embodiment>

Figure 21:
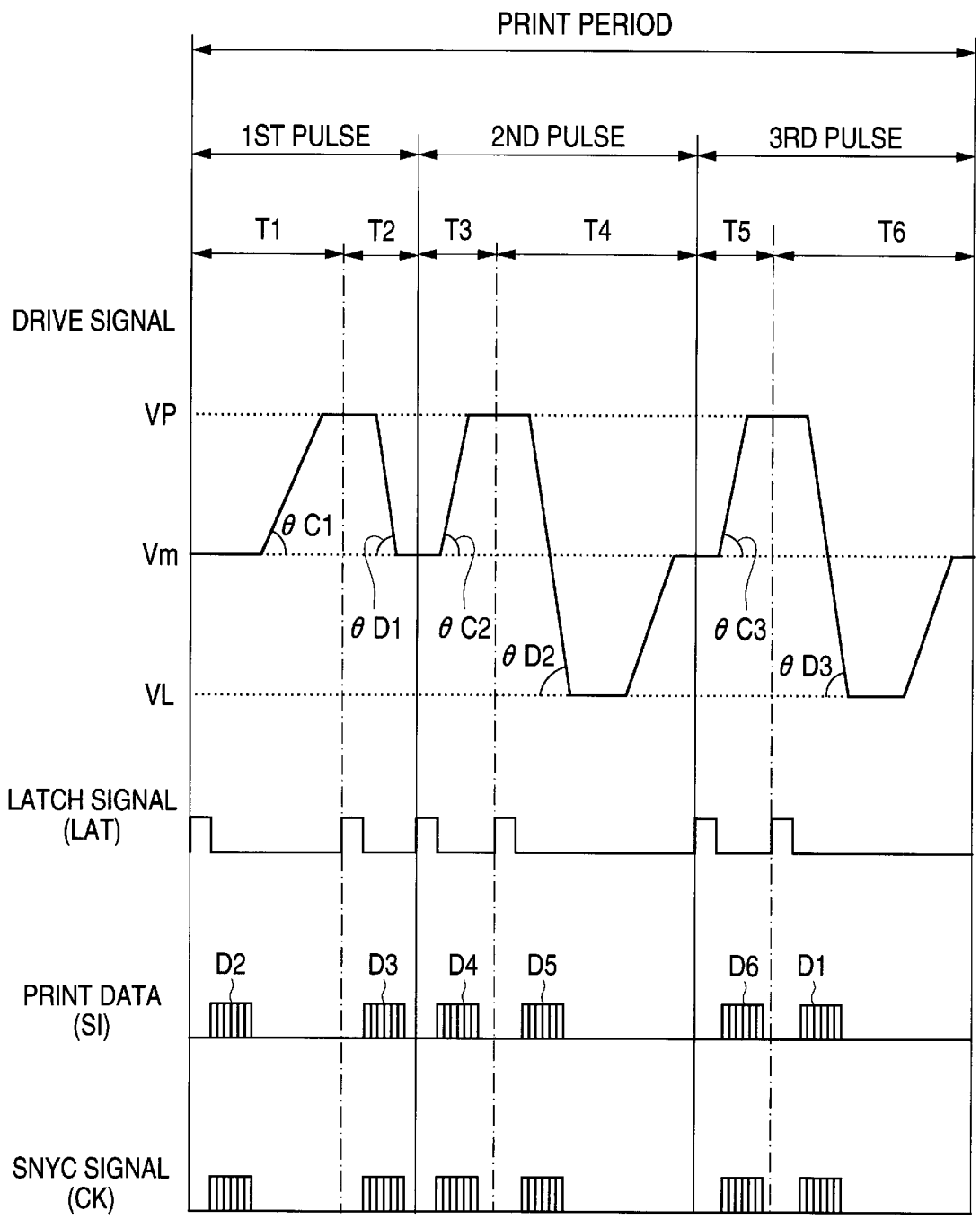

A third embodiment of the present invention will be described with reference to FIGS. 21 to 23.

As seen from the waveforms shown in FIG. 18, in the sixth embodiment, a drive signal comprises a 1st pulse (for extremely small dot) for ejecting an ink droplet of approximately 3 ng, for example, and 2nd and 3rd pulses (both for the medium dot) each for ejecting an ink droplet of approximately 8 ng, for example.

The description of the drive pulses in the fourth embodiment is available for the drive pulses in the present embodiment. The 1st pulse in the present embodiment is equal in shape to the 1st pulse in the fourth embodiment. The 2nd and 3rd pulses in this embodiment are each substantially equal in shape to the 3rd pulse in the fourth embodiment.

Figure 22:
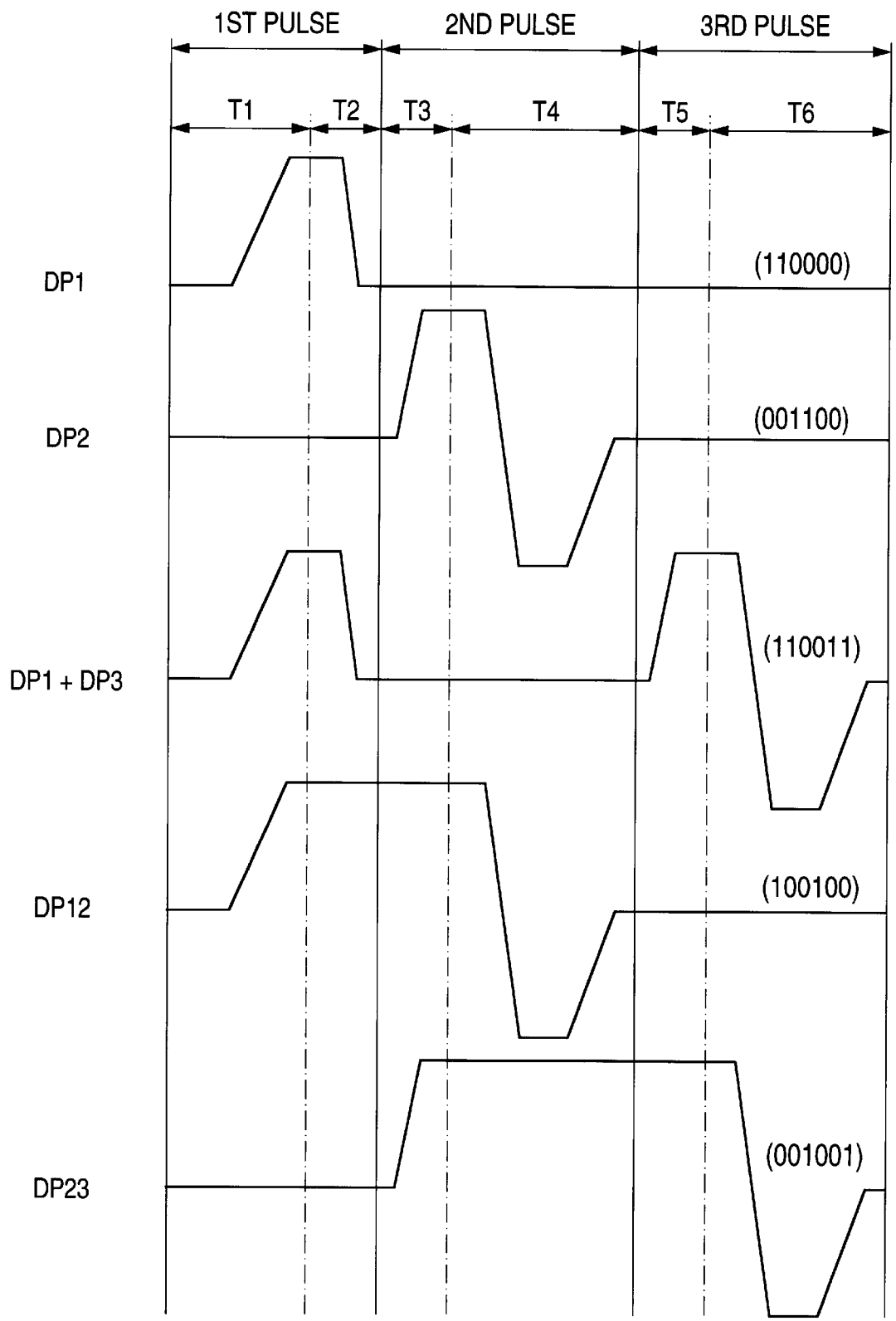
FIG. 22 is a timing diagram showing several pulse patterns of the drive signal showing in FIG. 21.
Figure 23:
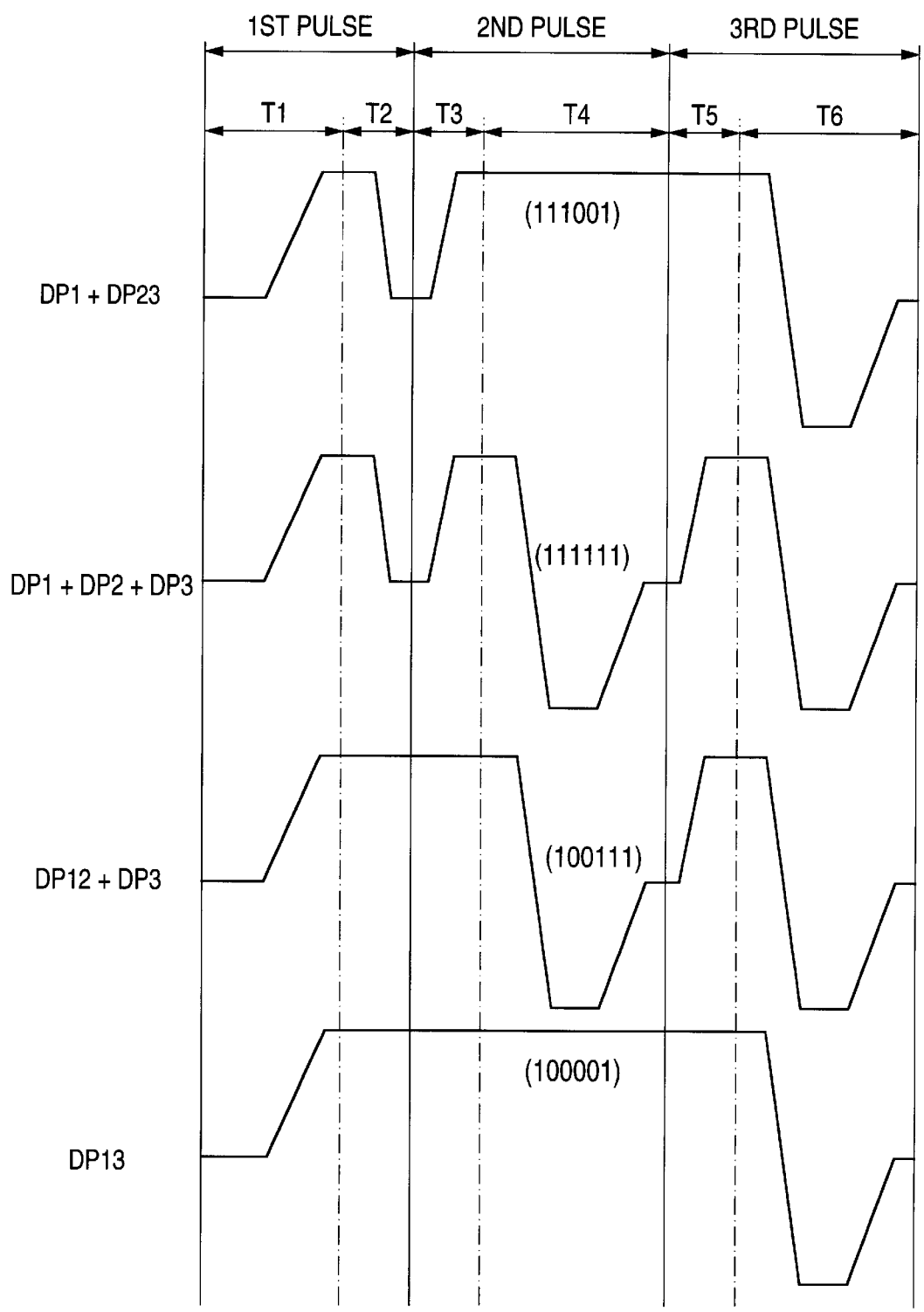
FIG. 23 is a timing diagram showing other pulse patterns of the drive signal showing in FIG. 21.

In the present embodiment, as shown in FIGS. 22 and 23, a total of nine (9) pulse patterns of the drive signal are selectable. It is assumed that the weights of ink drops ejected by those drive signals are: DP1=3 ng, DP2=DP3=8 ng, DP12=12 ng, DP23=15 ng, and DP13=22 g. Then, the weights of the ink drops caused by those drive signals, or pulse patterns, are:

DP1<DP2 (or DP3)<DP1+DP2 (or DP3)<DP12<DP23<DP1+DP23<DP1+DP2+DP3<DP12+DP3<DP13.

<Seventh Embodiment>

A seventh embodiment of the present invention will be described with reference to FIGS. 24 and 25.

Figure 24:
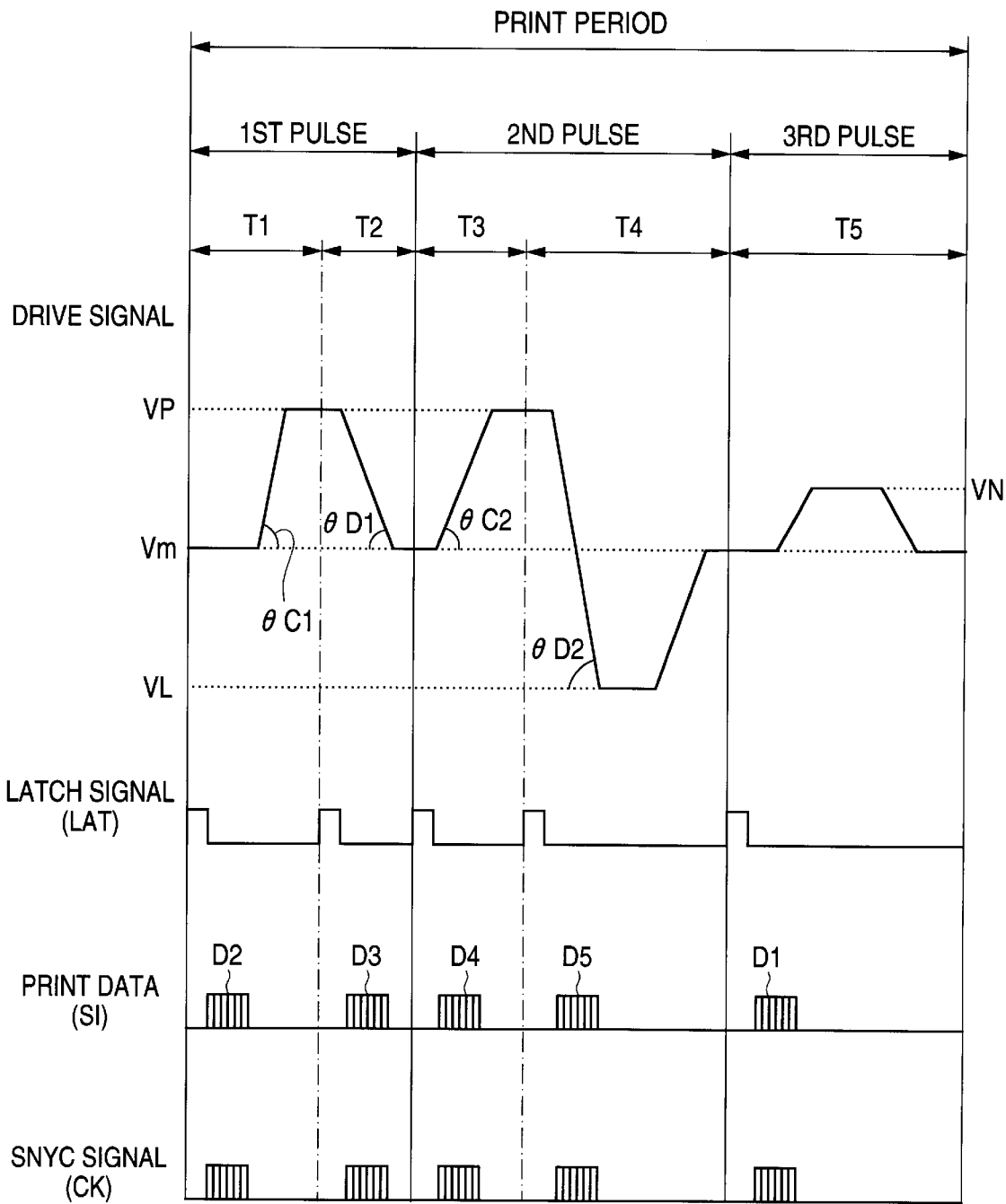

As seen from the waveforms shown in FIG. 24, in this embodiment, a drive signal comprises a 1st pulse (for extremely small dot) for ejecting an ink drop of an extremely small volume, a 2nd pulse (for medium dot) for ejecting an ink drop of the medium volume, and a 3rd pulse (minute vibrating pulse) for ejecting no drop of ink. The 1st and 2nd pulses are equal in amplitude (equal to the maximum potential VP), and the amplitude of the 3rd pulse is a maximum potential VN, which is smaller than the maximum potential VP. The 3rd pulse is used in the form of a single pulse. Therefore, it is not divided into waveform elements. Therefore, in this embodiment, one print period comprises five time periods T1 to T5. The print data comprises five (5) bits. As will be described later, the number of selectable pulse patterns is four (4). Therefore, the tone data may be compressed to the data of 2 bits in the print controller.

In the present embodiment, the 1st pulse resembles in waveshape the 2nd pulse, but the charging inclination θC1 is steeper than in the fourth embodiment. Since the charging inclination is steep, the meniscus of ink in the nozzle hole of the nozzle plate oscillates, and when the first pulse reaches the maximum potential VP, an extremely small drop of ink is ejected. The 2nd pulse resembles in waveshape the 3rd pulse.

Figure 25:
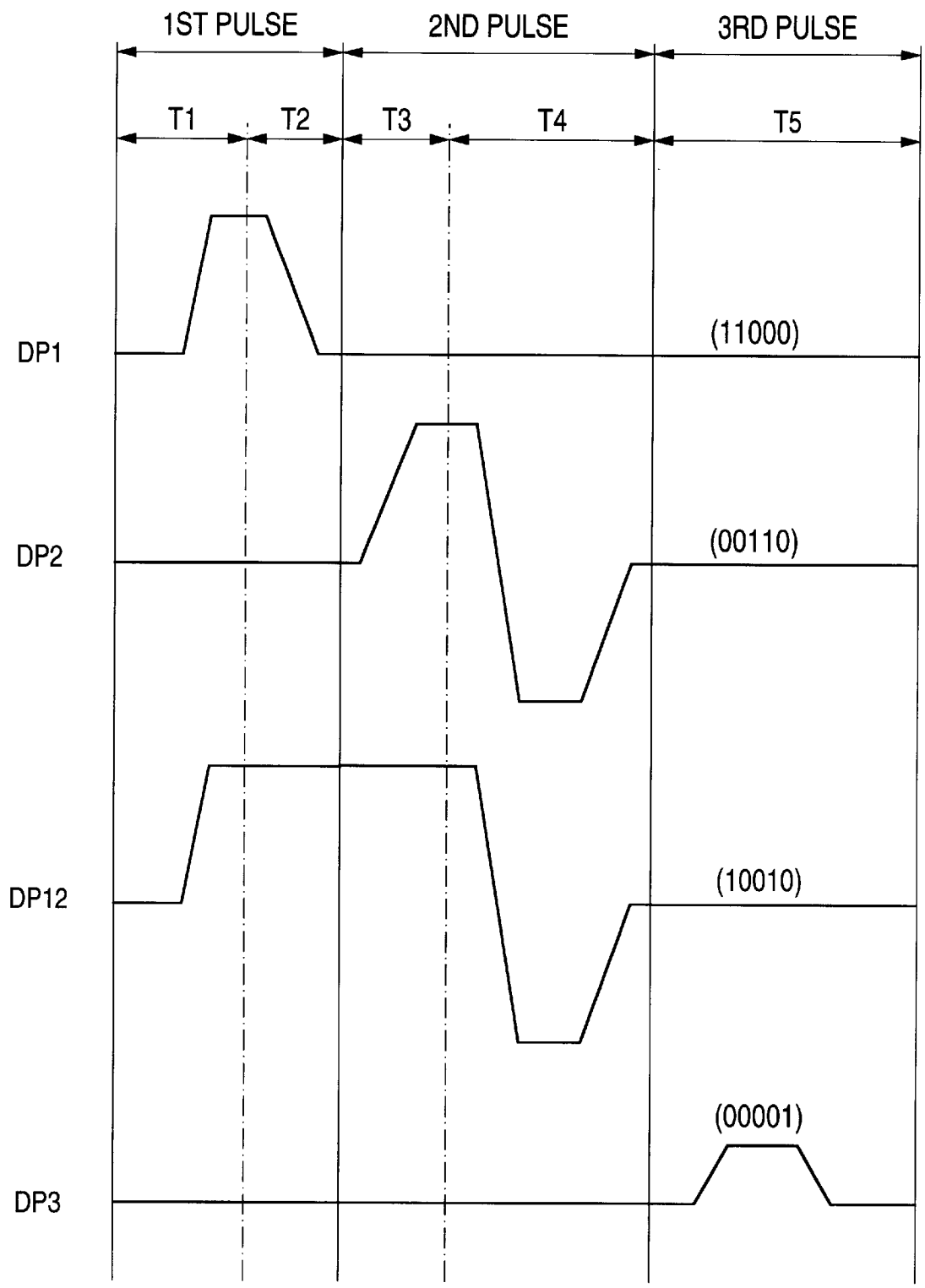
FIG. 25 is a timing diagram showing several pulse patterns of the drive signal showing in FIG. 24.

In the present embodiment, as shown in FIG. 25, a total of four (4) pulse patterns are selectable. The weights of the ink drops caused by those drive signals, or pulse patterns, are: DP1<DP2<DP12.

A mechanism for ejecting a drop of ink by a composite pulse DP12 formed by coupling the 1st and 2nd pulses will be described. When the piezoelectric element 17 is rapidly charged by the waveform element of which the time period is T1, the piezoelectric element 17 rapidly contracts. In turn, the meniscus is rapidly pulled into the nozzle hole and oscillates, whereby to eject an extremely small drop of ink. That is, in the time period T1, an extremely small drop of ink is ejected by the utilization of the oscillating phenomenon, and deposited on the printing medium. After the ejection of this ink drop, during a hold period of the time periods T2 and T3, the print head or drop generator is filled with ink, and the meniscus returns to the original position just before the ink drop ejection. When the period T4 is reached, the piezoelectric element 17 is rapidly discharged from the maximum potential VP to the minimum potential VL, and the piezoelectric element 17 rapidly expands. As a result, the meniscus, which has returned to the original position, is rapidly ejected out of the nozzle hole. In this case, the volume of the ink drop ejected is larger than of the ink drop ejected by use of the single 2nd pulse. When the composite pulse DP12 is applied to the piezoelectric element 17, an extremely small drop of ink is first ejected and then a large ink drop is ejected.

<Eighth Embodiment>

An eighth embodiment of the present invention will be described with reference to FIGS. 26 and 27.

Figure 26:
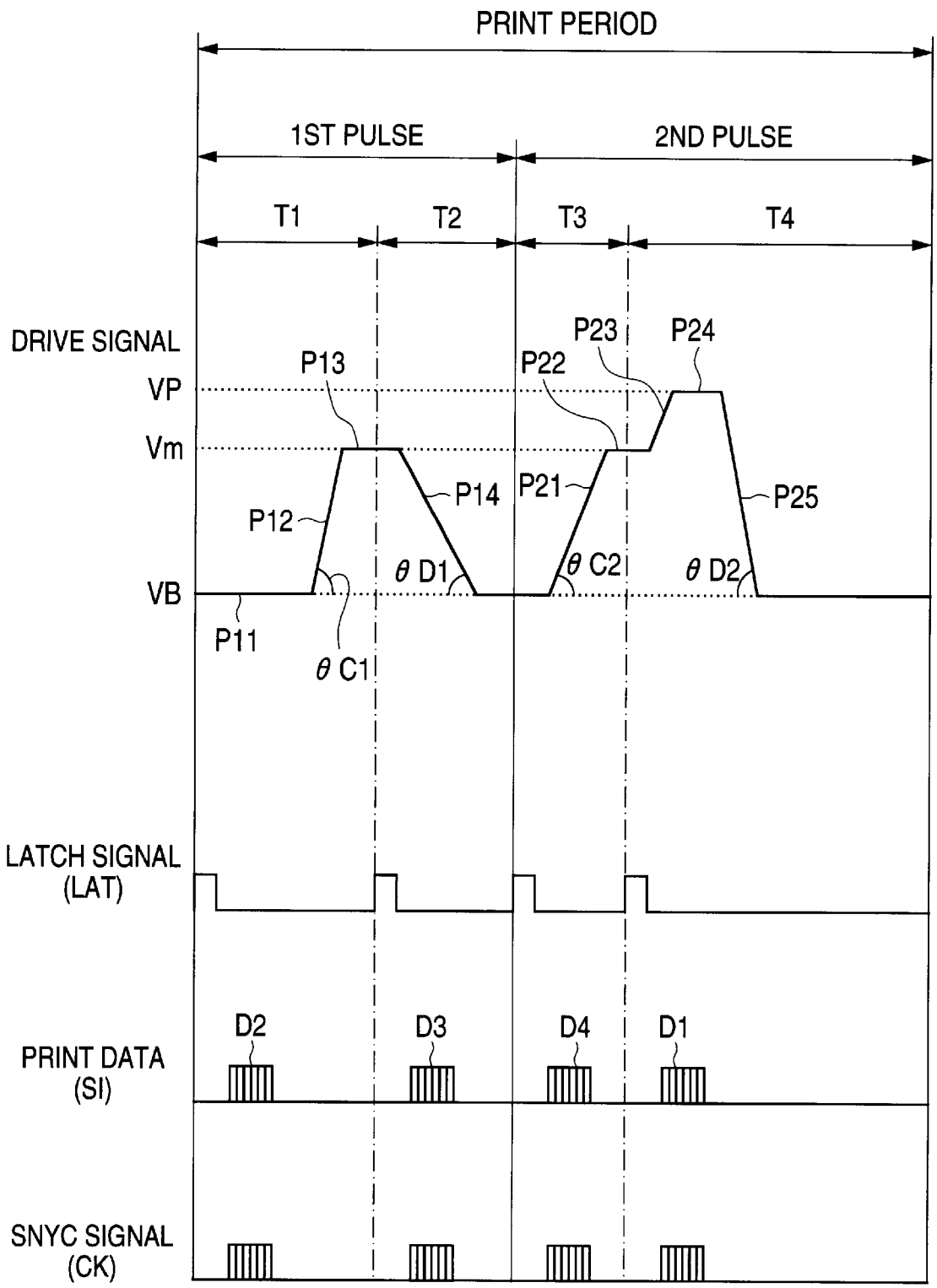

As seen from the waveforms shown in FIG. 26, in this embodiment, a drive signal comprises a 1st pulse for ejecting an ink drop of an extremely small volume, and a 2nd pulse for ejecting an ink drop of the medium volume. Each drive pulse is divided, in its width, into two waveform elements. Therefore, the print data of this embodiment is 4-bit print data. As will be described later, the number of selectable pulse patterns is four (4). Therefore, the data of the gray tone value may be compressed to the data of 2 bits in the print controller 1.

The 1st pulse starts to rise, at a preset inclination $\theta C1$, from the base potential VB of approximately the ground level (P11) to the medium potential Vm (P12). The 1st pulse maintains the medium potential Vm for a short time (P13), and then falls to the base potential VB at a preset inclination $\theta D1$. The charging inclination $\theta C1$ is larger than the discharging inclination $\theta D1$.

The 2nd pulse rises, at a preset inclination $\theta C2$, from the base potential VB to the medium potential Vm (P21), maintains the medium potential Vm for a short time (P22), and then rises to the maximum potential VP (P23). The 2nd pulse maintains the maximum potential VP for a short time (P24), and falls to the base potential VB. The position for dividing the 2nd pulse is set at a position on the waveform segment P22 of the medium potential Vm. The reason why the waveform segment P22 is set at the medium potential Vm is that it is necessary to properly time the switching transistor in its operation.

Figure 27:
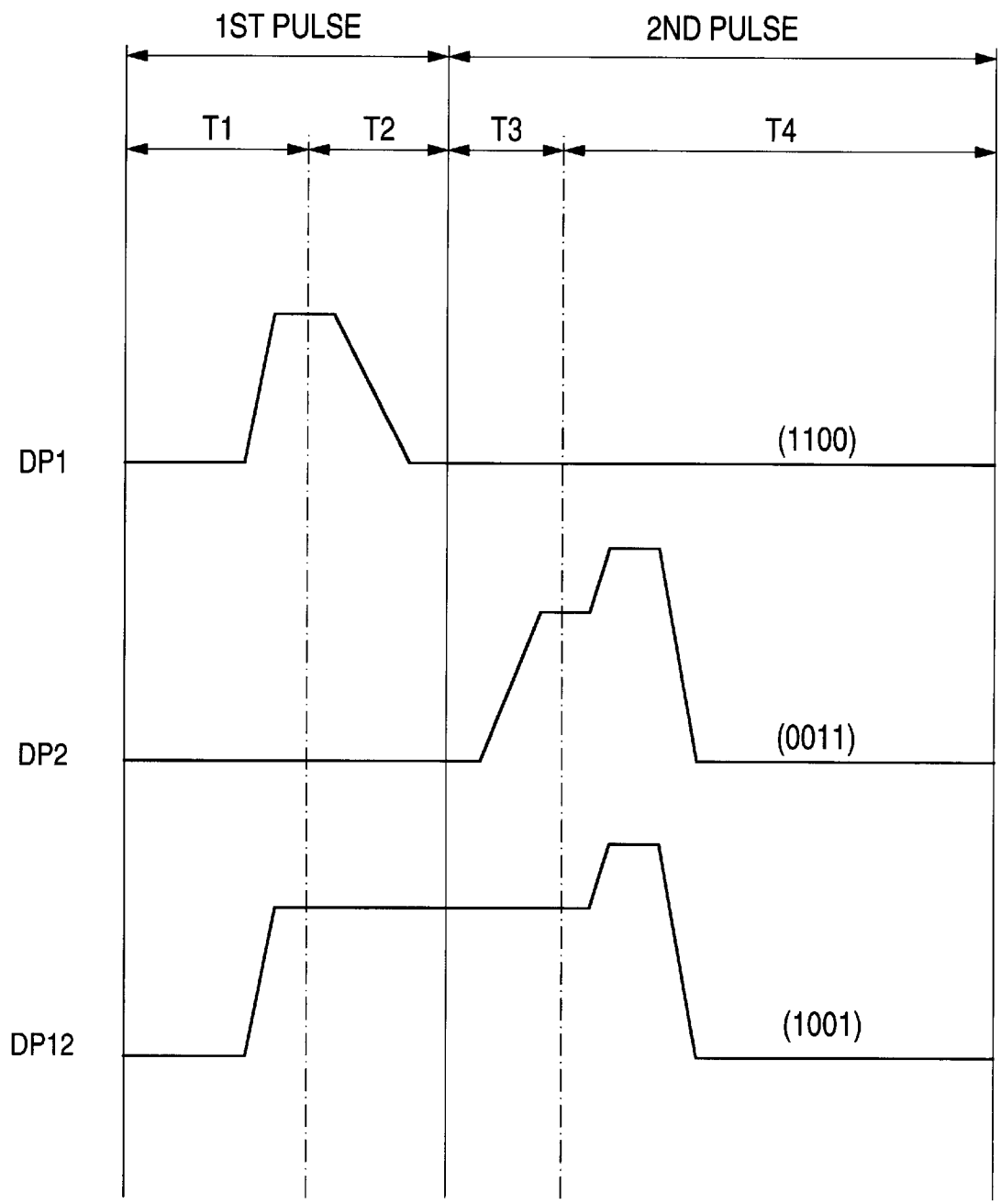
FIG. 27 is a timing diagram showing several pulse patterns of the drive signal showing in FIG. 26.

As shown in FIG. 27, in the present embodiment, the number of selectable pulse patterns is four (4). If only the 1st pulse is selected (DP1), an extremely small dot is formed on the printing medium. If only the 2nd pulse is selected (DP2), a medium dot is formed on the printing medium. If a composite pulse including the 1st and 2nd pulses is selected (DP12), a large dot is formed on the printing medium.

<Ninth Embodiment>

A ninth embodiment of the present invention will be described with reference to FIGS. 28 to 30.

Figure 28:
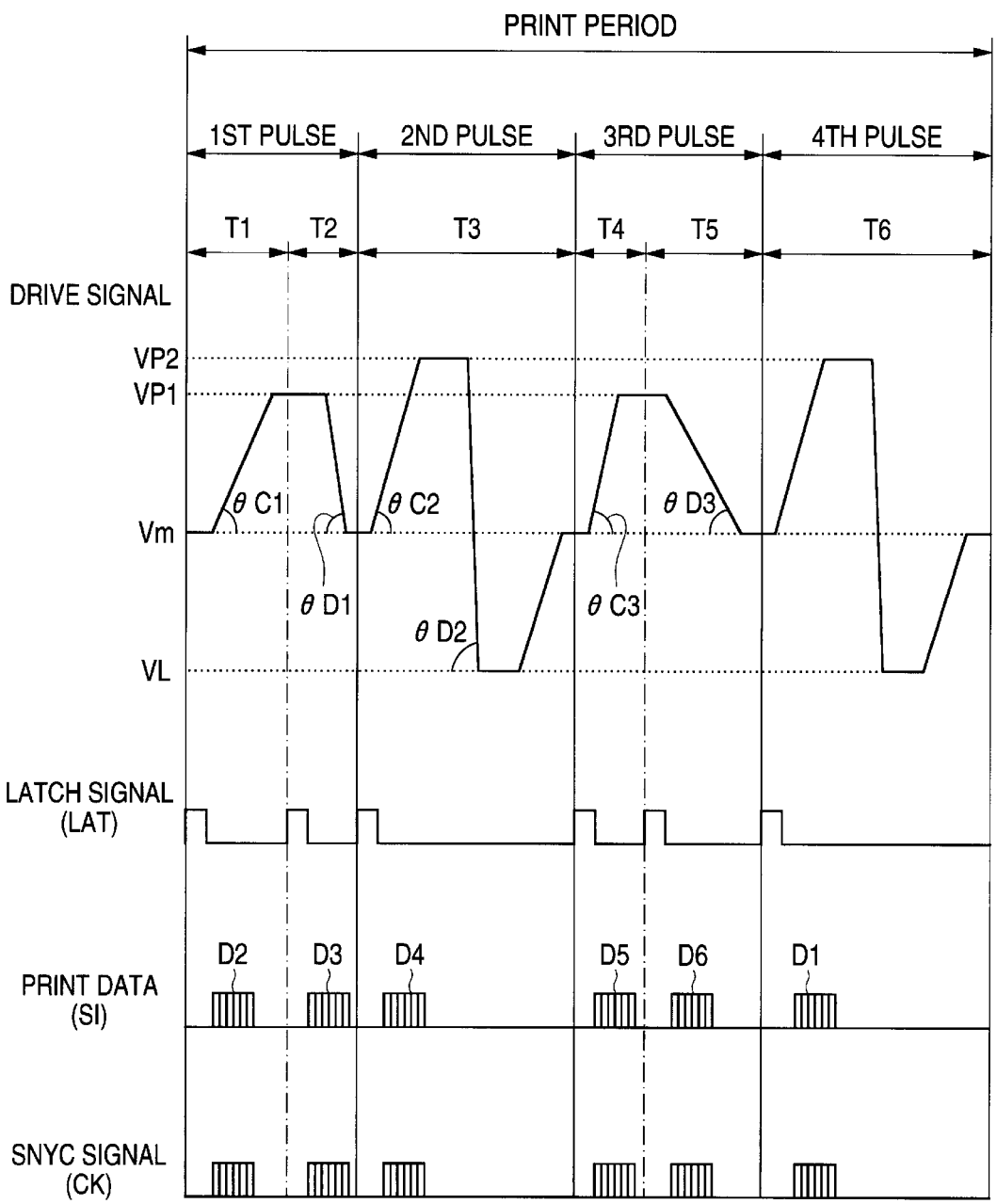

As shown in FIG. 28, in this embodiment, a drive signal comprises a total of four (4) pulses: a 1st pulse (for small dot) for ejecting a small ink drop of approximately 5 ng, for example, 2nd and 4th pulses (both for medium dot) each for ejecting an ink drop of approximately 10 ng, for example, and a 3rd pulse (for extremely small dot) for ejecting an extremely small drop of ink of approximately 2 ng.

The 1st and 3rd pulses have each a first maximum potential VP1. The 2nd and 4th pulses have each a second maximum potential VP2. The second maximum potential VP2 is larger than the first maximum potential VP1.

In the wave profile of the 1st pulse, the discharging inclination $\theta D1$ is larger than the charging inclination $\theta C1$. In the wave profile of the 3rd pulse, the charging inclination $\theta C3$ is larger than the discharging inclination $\theta D3$. Therefore, the 1st and 3rd pulses have each the first maximum potential VP1, but the volume of the ink drop ejected by the 1st pulse is larger than of the ink drop ejected by the 3rd pulse. The reason for this is as follows. The 1st pulse relatively gently pulls the ink meniscus into the nozzle hole, and then rapidly pushes it out of the nozzle hole. The 3rd pulse rapidly pulls the meniscus into the nozzle hole to oscillate the meniscus of ink therein. With the energy of the oscillation, an ink drop is ejected. Each of the 1st and 3rd pulses is divided, in the pulse width, into two waveform elements at the top or plateau of the pulse waveform whose potential is the first maximum potential VP1.

The 2nd and 3rd pulses are the same in their waveshapes and substantially the same as the waveshape of the 3rd pulse in the fourth embodiment. The 2nd and 4th pulses are each used in the form of a single pulse. Therefore, those pulses are not divided, unlike the 1st and 3rd pulses.

Figure 29:
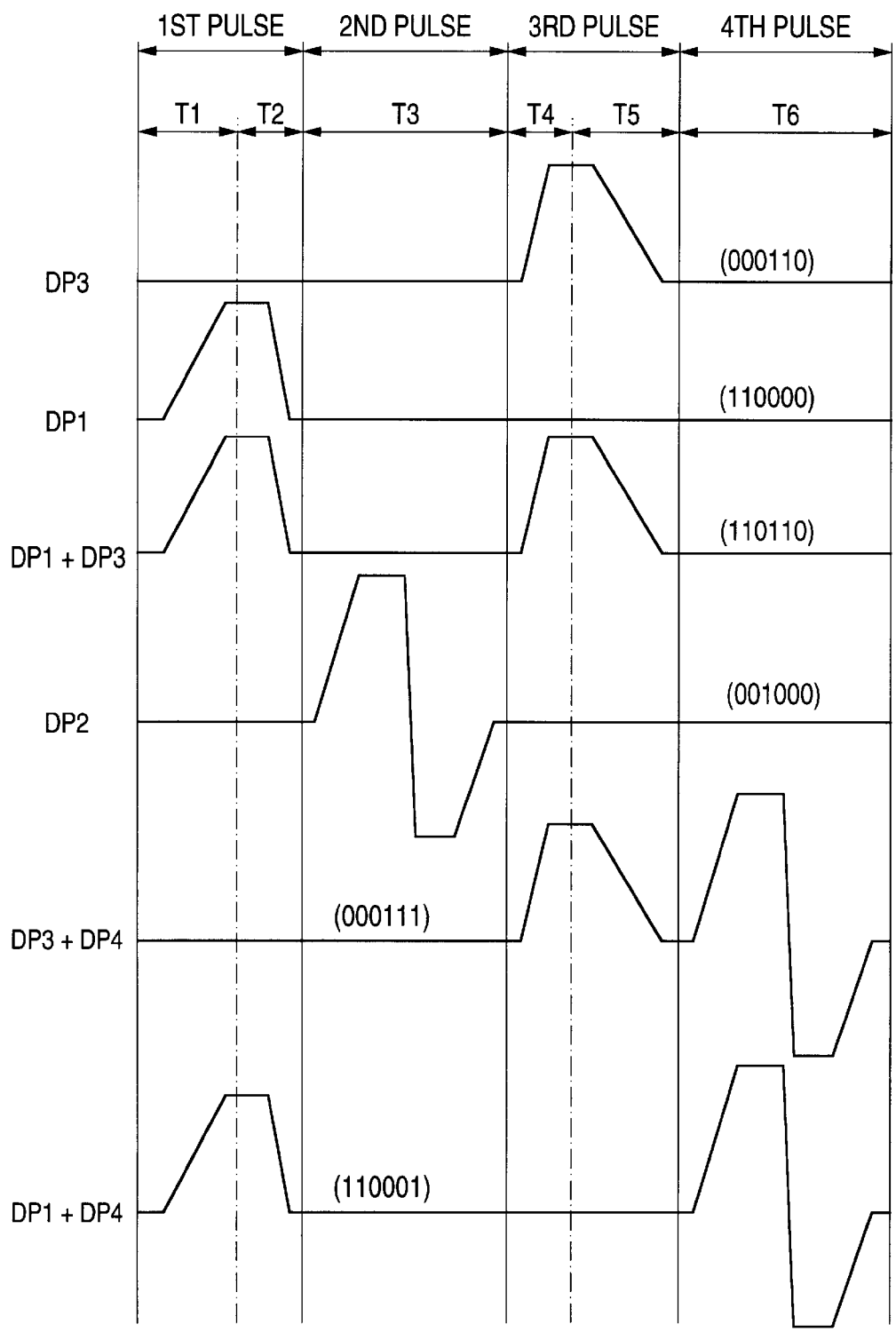
FIG. 29 is a timing diagram showing several pulse patterns of the drive signal showing in FIG. 28.
Figure 30:
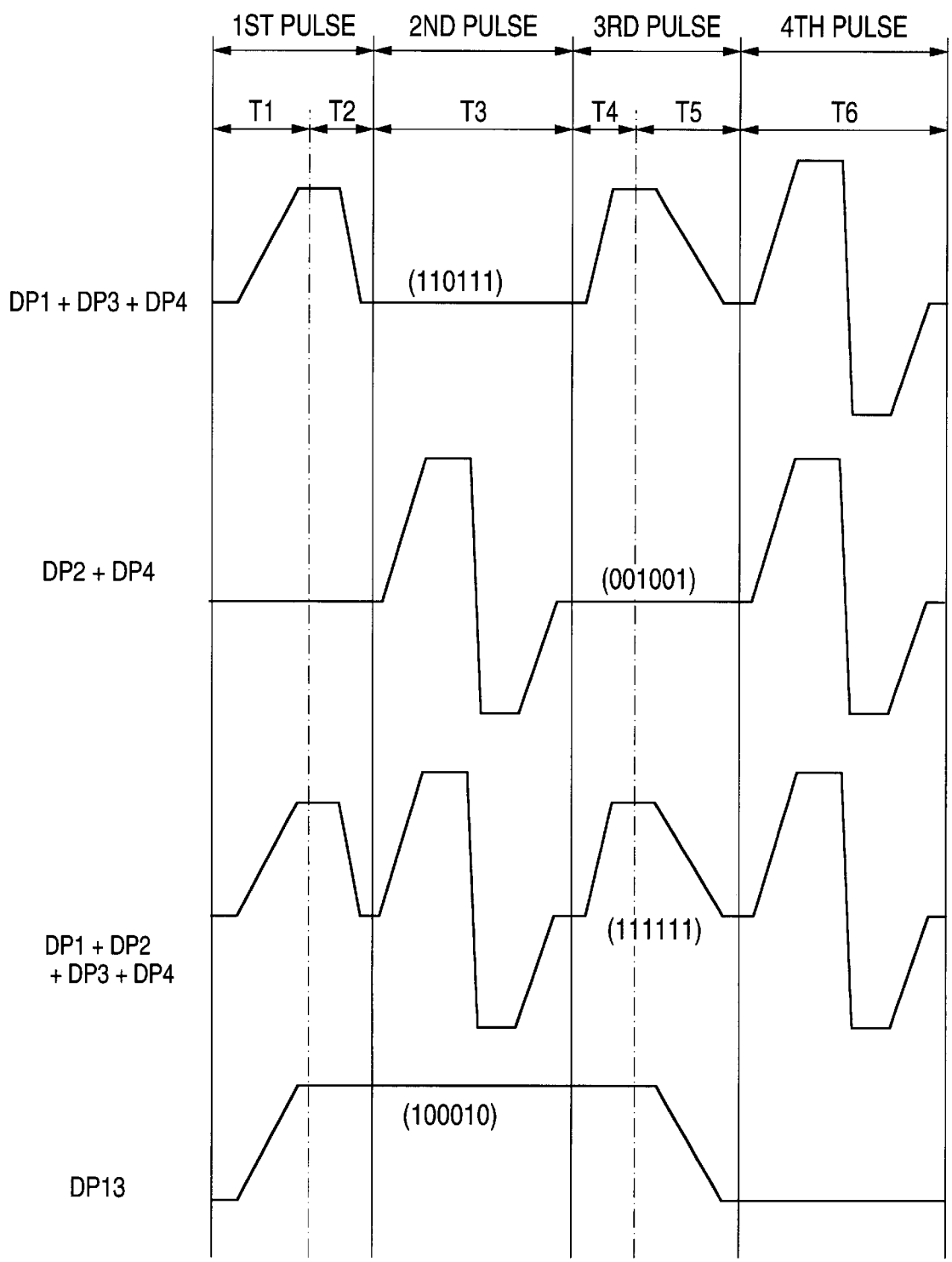
FIG. 30 is a timing diagram showing other pulse patterns of the drive signal showing in FIG. 28.

In the present embodiment, as shown in FIGS. 29 and 30, a total of ten (10) pulse patterns are selectable. If DP1=5 ng, DP2=DP4=10 ng, and DP3=2 ng, the weights of the ink drops caused by those drive signals, or pulse patterns, are:

DP3<DP1<DP1+DP3<DP2 (or DP4)<DP3+DP4 (or DP2)<DP1+DP4 (or DP2)<DP1+DP3+DP4 (or DP2) <DP2+DP4<DP1+DP2+DP3+DP4.

In this embodiment, only the minutely vibrating pulse is generated, and new drive pulses for ejecting drops of ink are not generated.

A composite drive pulse DP13 located in the lowermost place in FIG. 30 is a minutely vibrating pulse.

<Tenth Embodiment>

Figure 31:
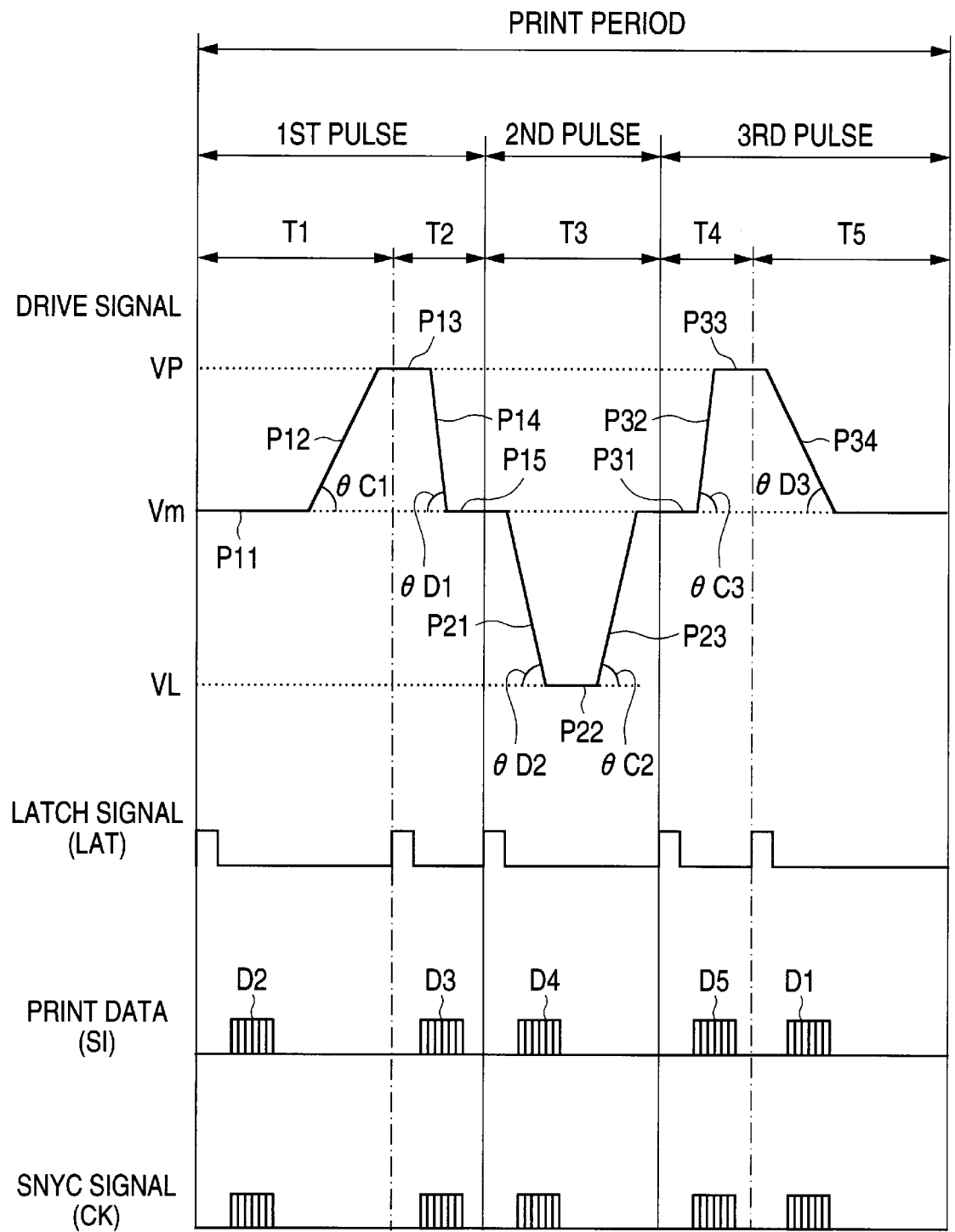

A tenth embodiment of the present invention will be described with reference to FIGS. 31 and 32. In this embodiment, a drive signal comprises a total of three (3) pulses, 1st to 3rd pulses. Each of the 1st and 3rd pulses comprises two waveform elements.

The 1st pulse starts to rises from the medium potential Vm (P11) at a preset charging inclination $\theta C1$ to the maximum potential VP (P12). The 1st pulse maintains the maximum potential VP for a short time (P13), and falls at a preset discharging inclination $\theta D1$ to the medium potential Vm (P14), and its potential state continues for a short time (P15). The discharging inclination $\theta D1$ is steeper than the charging inclination $\theta C1$.

The 2nd pulse falls from the medium potential Vm at a preset discharging inclination $\theta D2$ to the minimum potential VL (P21), keeps its potential state (P22), and rises to the medium potential Vm at a preset charging inclination $\theta C2$. In the waveform segment P15, the medium potential Vm is kept up for a short time, and then a 2nd pulse is generated. The reason for this is that it is necessary to properly time the switching transistor operations. It is preferable that a waiting time on the waveform segment P15 is as small as possible.

The 3rd pulse starts to rise from the medium potential Vm (P31) at a preset charging inclination θC3 to the maximum potential VP (P32). The maximum potential VP is sustained (P33) for a short time, and falls to the medium potential Vm at a preset discharging inclination θD3 (P34). The charging inclination θC3 is steeper than the discharging inclination θD3. As in the previous case, the 3rd pulse utilizes, for ink drop ejection, an oscillation of the meniscus that is caused by rapidly pulling the meniscus into the nozzle hole. Therefore, an ink drop ejected is extremely small in volume.

In the present embodiment, a total of six (6) pulse patterns are selectable. If DP1=5 ng, DP3=2 ng, and DP12=15 ng, the weights of the ink drops caused by those drive signals, or pulse patterns, are:

DP3<DP1<DP1+DP3<DP12<DP12+DP3.

Figure 32:
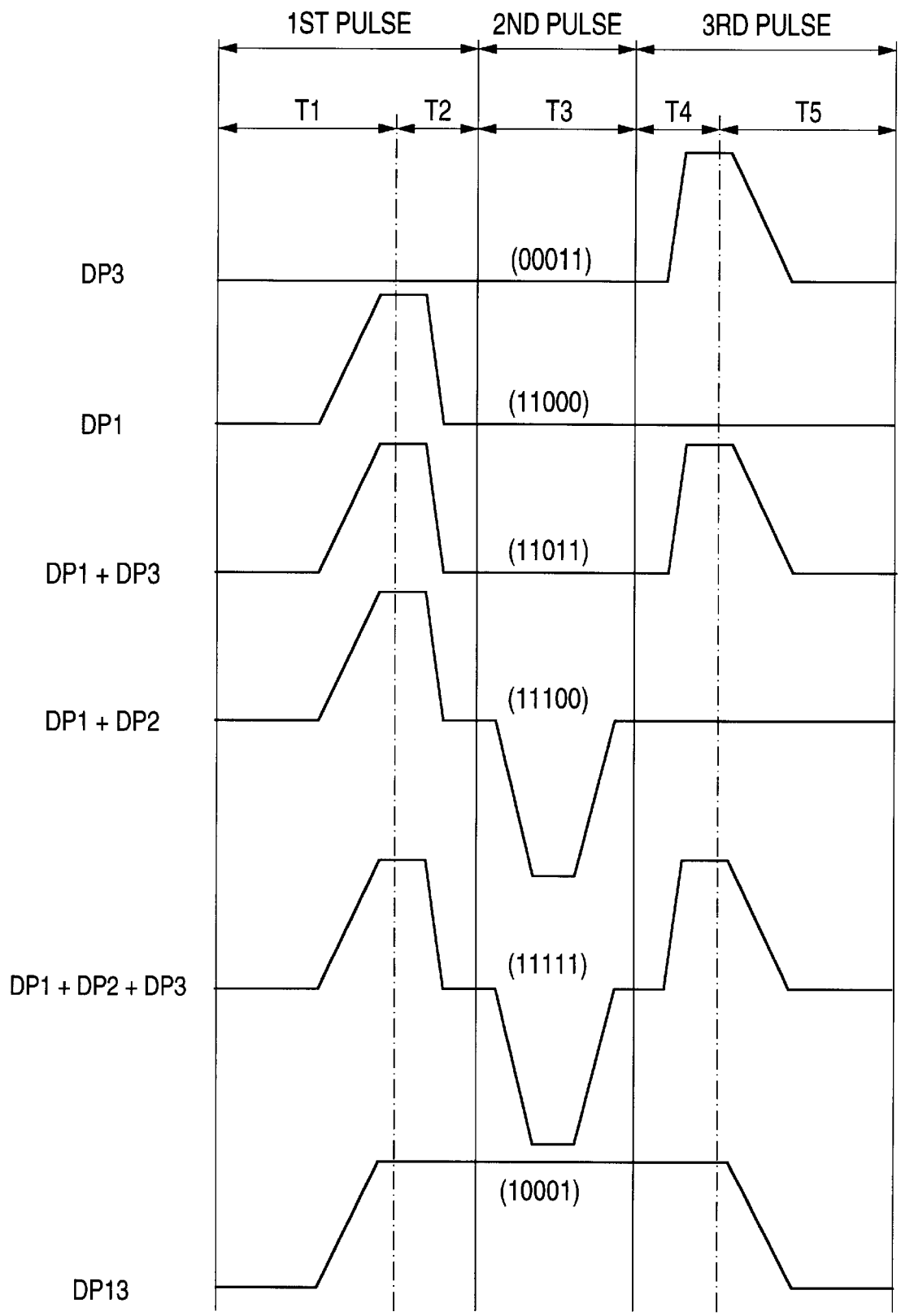
FIG. 32 is a timing diagram showing several pulse patterns of the drive signal showing in FIG. 31.

A composite drive pulse DP13 in FIG. 32 is a minutely vibrating pulse.

<11th Embodiment>

Figure 33:
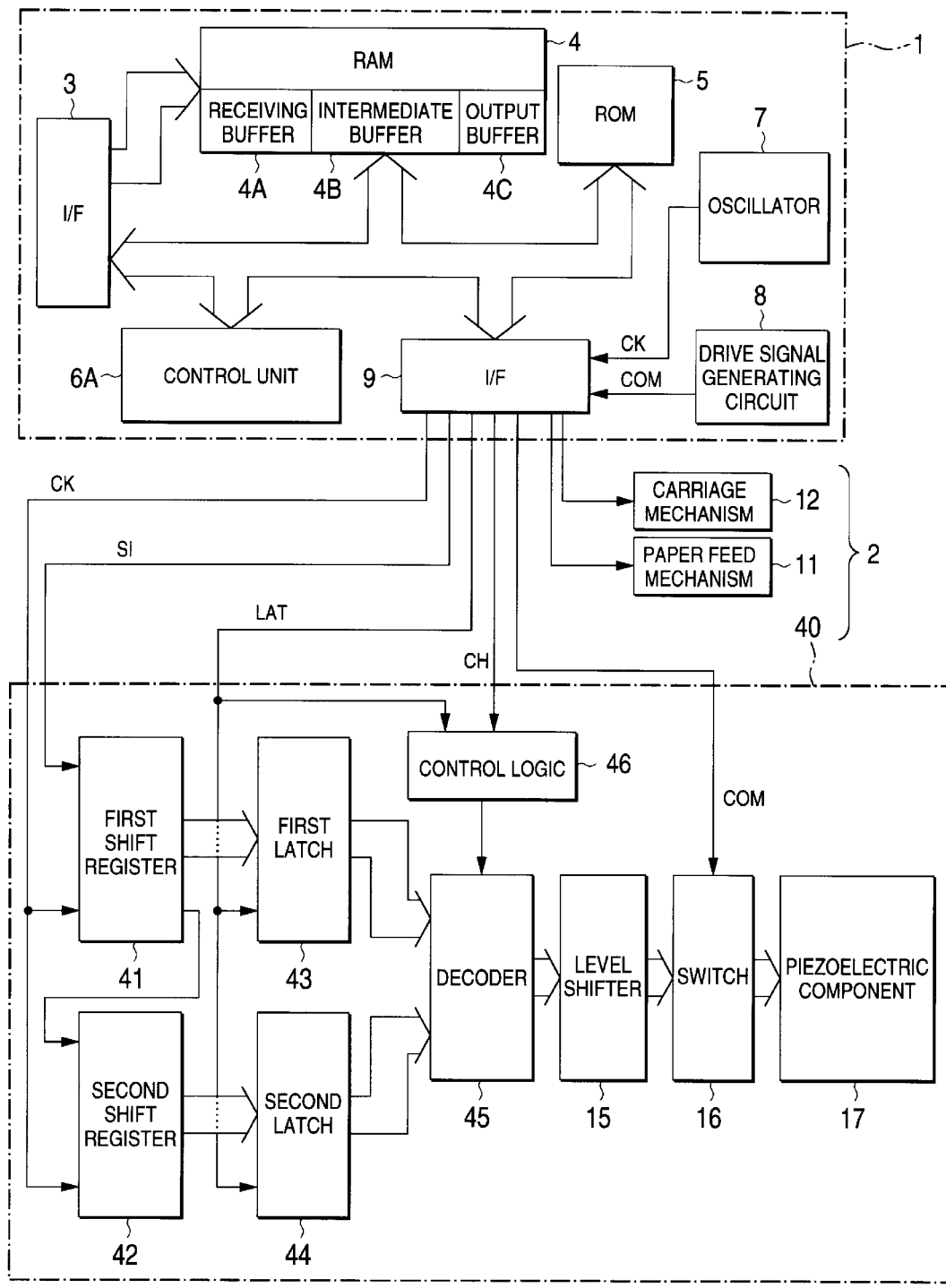
FIG. 33 is a block diagram showing an ink jet printer according to an 11th embodiment of the present invention.

A 11th embodiment of the present invention will be described with reference to FIGS. 33 through 35. The present embodiment characterized in that the conversion of the gray tone data to the print data is carried out in the print head.

A control unit 6A, unlike the control unit 6 of each of the embodiments described above, does not generate the print data for the selection of the pulse patterns of the drive signal. The control unit 6A develops tone data that is compressed to 2-bit data into the output buffer 4C of the RAM 4.

A print head 40, unlike the print head 10 in each of the above-mentioned embodiments, is made up of a pair of shift registers 41 and 42, a pair of latch circuits 43 and 44, a decoder 45, and a control logic 46.

Gray tone data (SI), which comes in from the printer controller 1, is serially transferred to the first shift register 41 and the second shift register 42, both serving as "serial/parallel converting means". The most significant bit (MSB) of the tone data is input to the second shift register 42. The least significant bit (LSB) of the tone data is input to the first shift register 41.

The first and second shift registers 41 and 42 are respectively coupled with first and second latch circuits 43 and 44, both serving as "latch means". When receiving a latch signal LAT from the printer controller 1, the latch circuits 43 and 44 latch therein tone data as parallel data received from the first and second shift registers 41 and 42. Accordingly, the LSB data of the tone data is latched in the first latch circuit 43, and the MSB data is latched in the second latch circuit 44.

The first shift register 41 and the first latch circuit 43 cooperate to form a "memory circuit", and the second shift register 42 and the second latch circuit 44 also form a "memory circuit". Those memory means form "memory means".

The tone data latched in the latch circuits 43 and 44 are input to the decoder 45. In response to a signal from the control logic 46, the decoder 45 converts the 2-bit tone data into 4-bit print data. The decoder 45 and the control logic 46 form "print data generating means" in the present embodiment.

Figure 34:
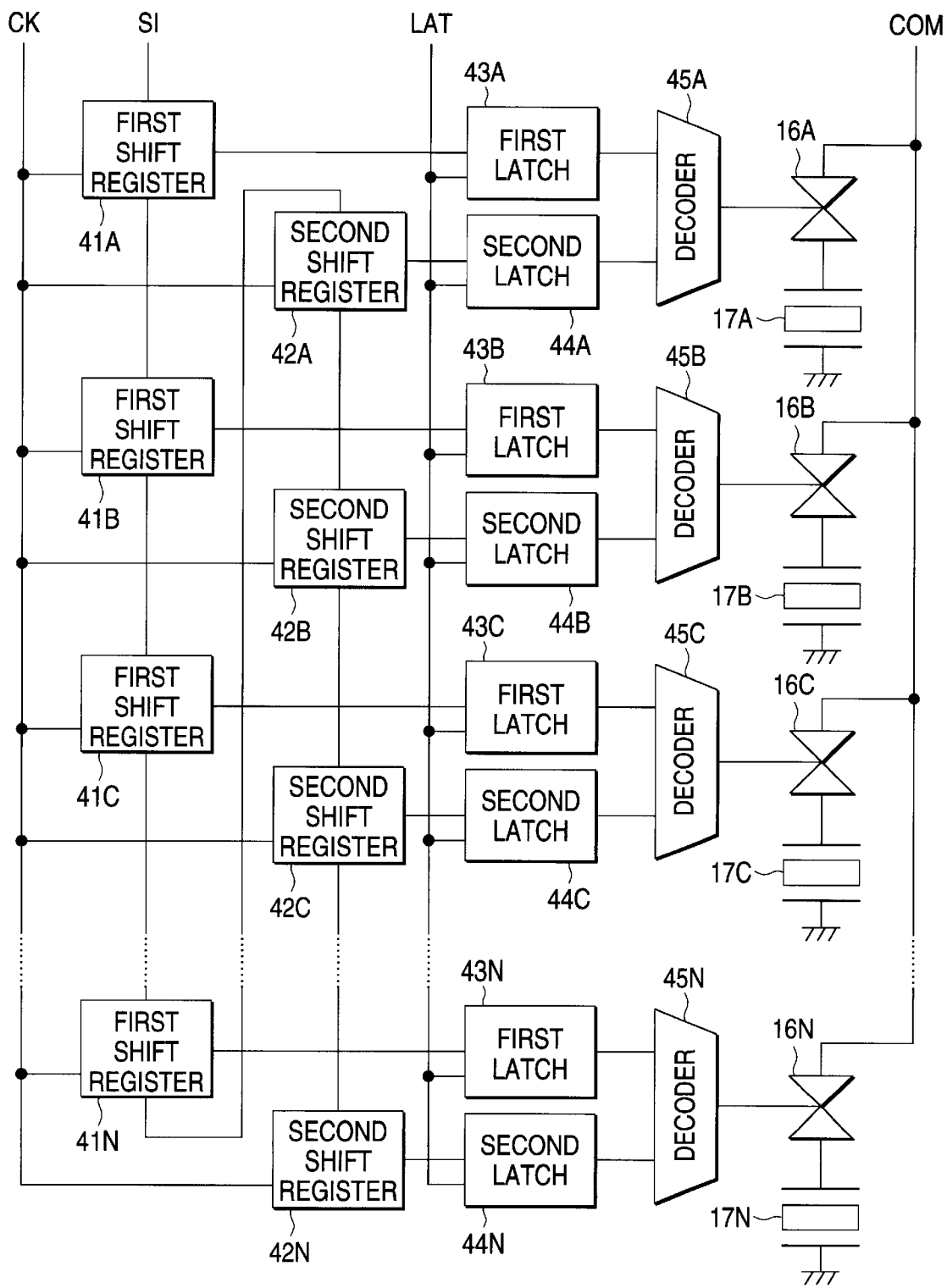
FIG. 34 is a circuit diagram showing a key portion of a print head drive circuit shown in FIG. 33.

A specific arrangement of the print head 40 is illustrated in FIG. 34. In the figure, the control logic 46 and the level shifter 15 are omitted. The grey tone data, output from the printer controller 1, comprises two bits, MSB and LSB, such as "10" or "01", every nozzle. The data of "0" on all the nozzles are input the first shift registers 41A to 41N. The data of "1" on all the nozzles are input the second shift registers 42A to 42N.

The tone data on each nozzle, stored in the first and second shift registers 41A to 41N and 42A to 42N, are latched in the latch circuits 43A to 43N and 44A to 44N, and to the decoders 45A to 45N. In response to a signal from the control logic 46, the decoders 45A to 45N decode the 2-bit tone data into 4-bit print data.

How the ink jet printer operates when the print data of 4 bits is applied to the switch circuit 16 and the like will be described in detail with reference to a waveform diagram shown in FIG. 35.

Grey tone data (b1, b0) on each nozzle, stored in the output buffer 4C, is converted into 4-bit print data (D1, D2, D3, D4) by the decoder 45 of the print head 40. The print data is applied to the switch circuits 16A to 16N of the print head 40 corresponding to the nozzles within one print period.

Figure 35:
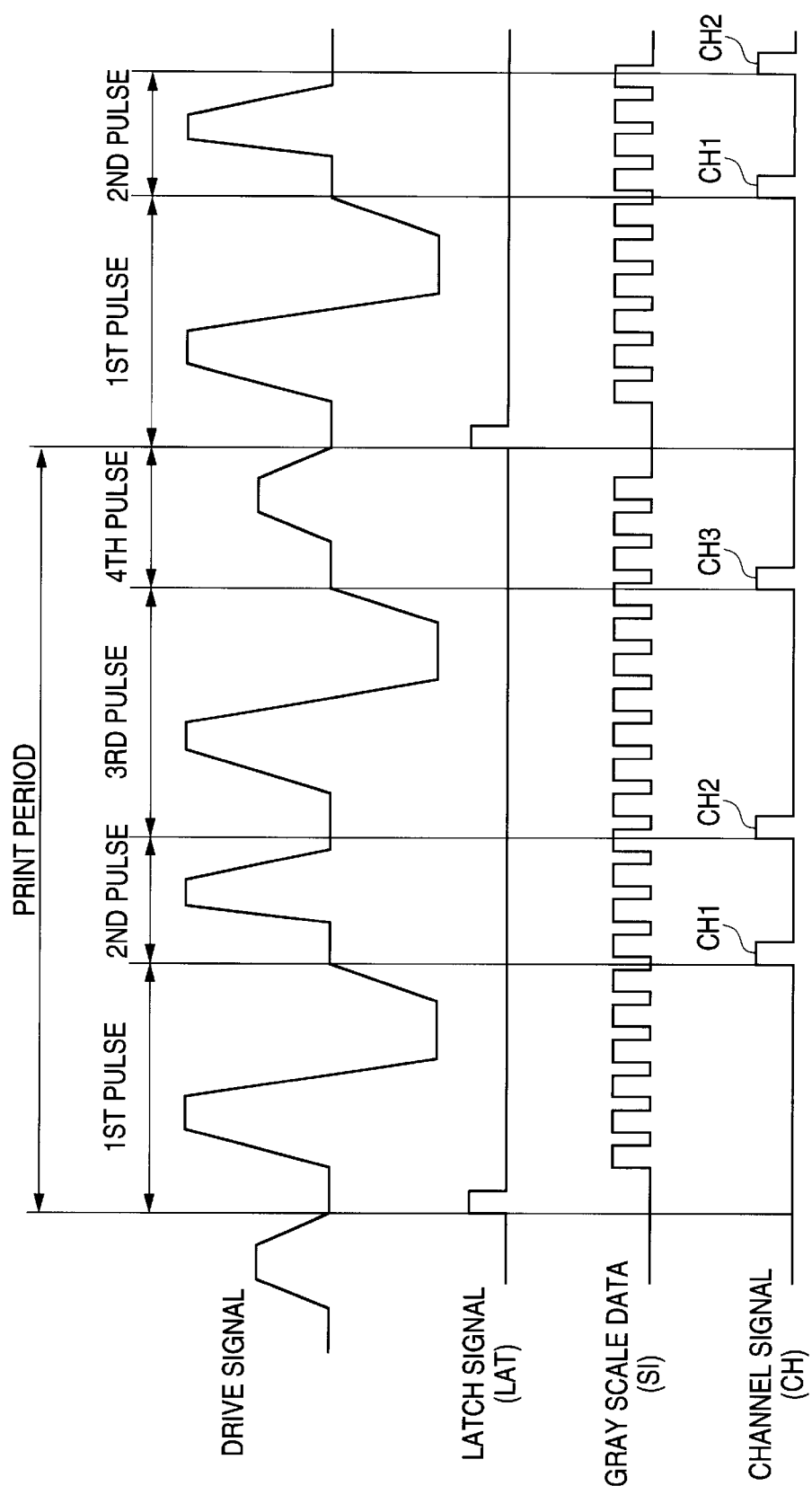

As shown in FIG. 35, the tone data SI of 2 bits on all the nozzles are transferred to the first and second shift registers 41 and 42 within one print period, and latched in the latch circuits 43 and 44 in response to the next latch signal. The tone data transferred are converted into print data of 4 bits wide at the timings of generating the drive pulses. The timings of the drive pulse generation are detected by a channel signal CH and a latch signal LAT. More specifically, the generation timing of the 1st pulse is detected by the latch signal, the generation timing of the 2nd pulse is detected by a channel signal CH1, the generation timing of the 3rd pulse is detected by a channel signal CH2, the generation timing of the 4th pulse is detected by a channel signal CH4.

In the present embodiment, the latch signal and the channel signal form a "timing detect signal". A channel signal CH0 may be generated at the same timing as of generating the latch signal. In this case, the system is redundant. In other words, in the present embodiment, the latch signal is also used as a timing detecting signal of the generation of the 1st pulse.

In the embodiment, the 2-bit tone data transferred from the printer controller 1 is translated into the 4-bit print data by the decoder 45 and the control logic 46 in the print head 40. Therefore, the amount of data transferred between the printer controller 1 and the print head 40 may be reduced.

Where the number of nozzles is 64 and print data is generated in the printer controller 1, data of 64×64 bits, i.e., 256 bits, must be transferred to the print head 40 within one print period. In this embodiment, the gray tone data, compressed to 2 bits, is transferred from the printer controller 1 to the print head 40, and it is expanded into 4-bit data in the print head 40. Therefore, the amount of transferred data is reduced to the half.

This leads to decrease of the frequency of a transfer clock signal used for transferring the tone data. With the decreased frequency, the logic section can be fabricated by a slow semiconductor process. Further, the decreased frequency of the transfer clock signal is useful in suppressing undesired radiation noise.

<12th Embodiment>

Figure 36:
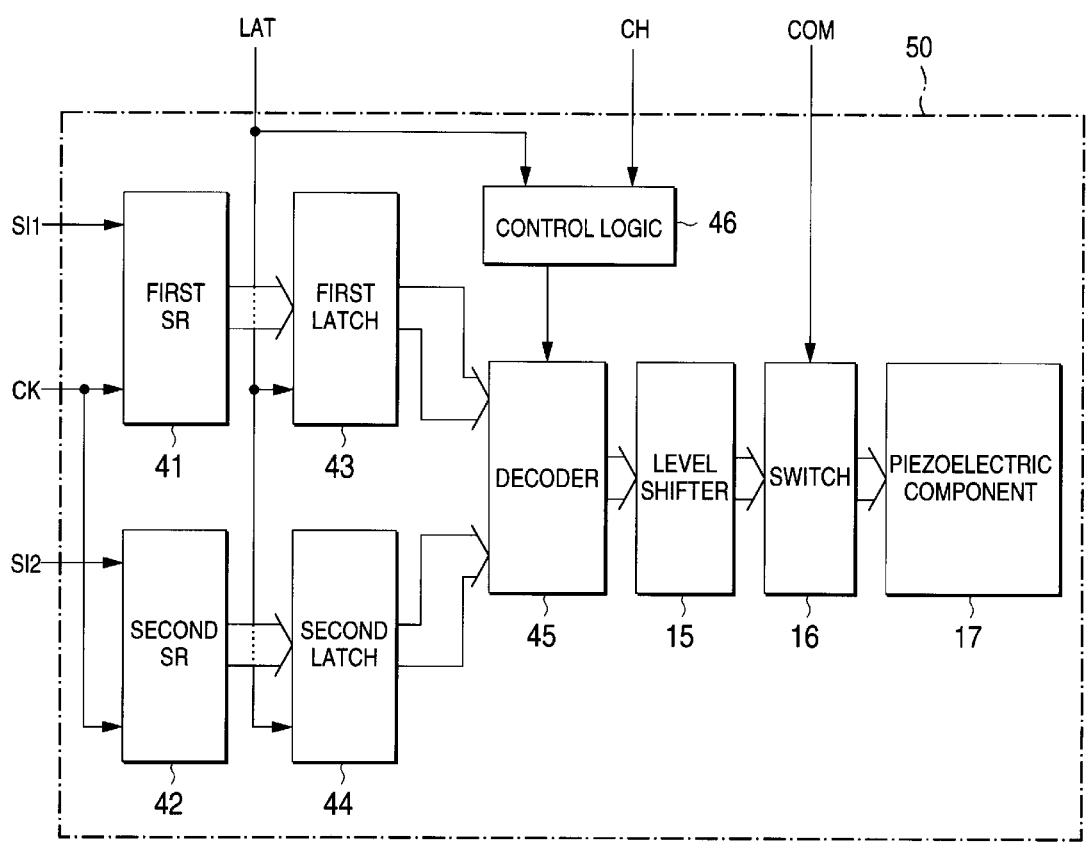
FIG. 36 is a block diagram showing an ink jet printer according to a 12th embodiment of the present invention.

FIG. 36 is a block diagram of a print head which constitutes a 12th embodiment of the present invention.

In the print head 50, gray tone data is separated into the least significant bit data SI1 and the most significant bit data SI2, which are transferred to the first and second shift registers 41 and 42, respectively.

Thus, the LSB data is directly input to the first shift register 41, and the MSB data is directly input to the second shift register 42. Therefore, data transfer rate is higher than in the 11th embodiment when compared at the same clock signal frequency.

<13th Embodiment>

Figure 37:
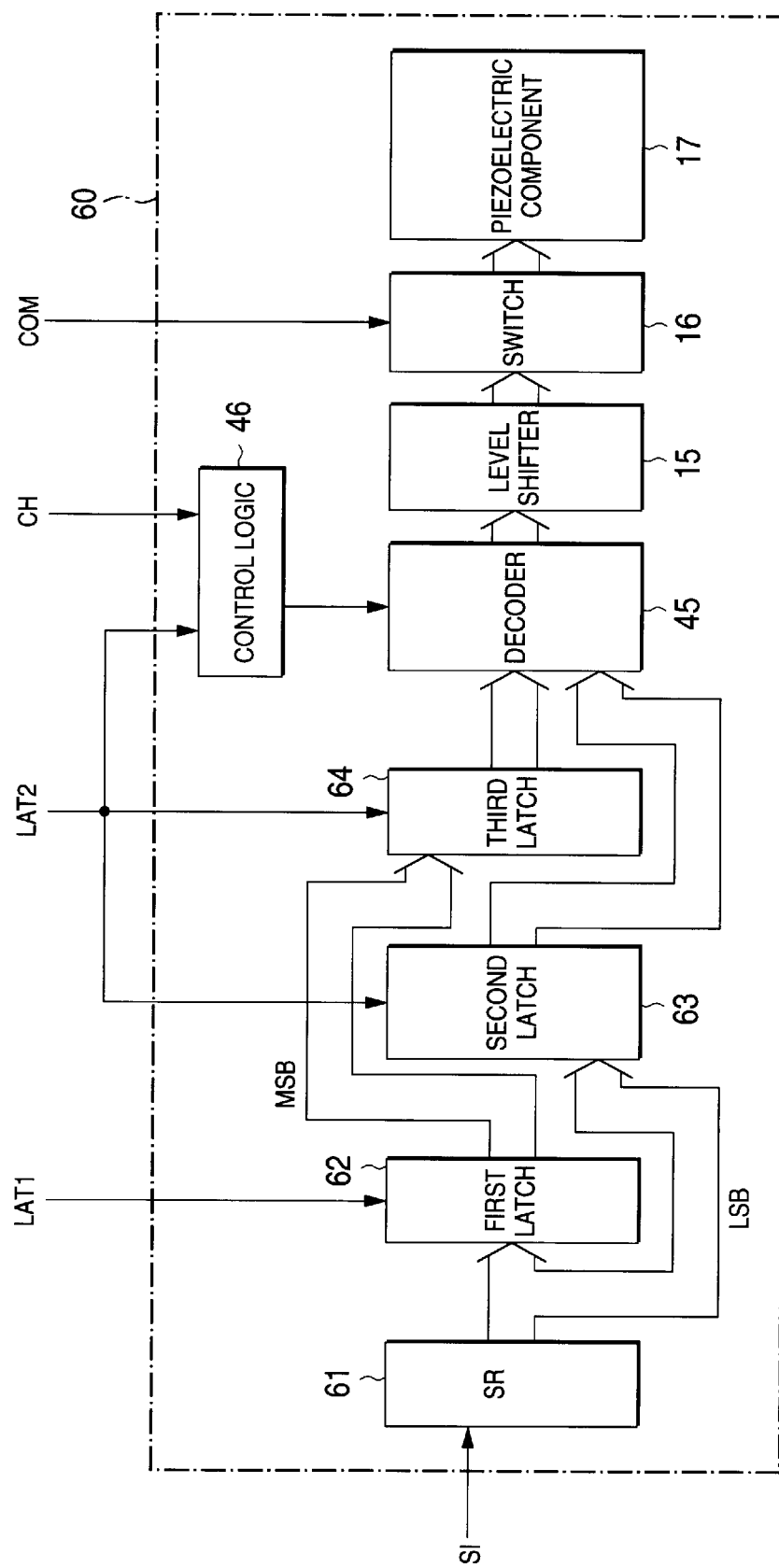
FIG. 37 is a block diagram showing an ink jet printer according to a 13th embodiment of the present invention.

FIG. 37 is a block diagram of a print head which constitutes a 13th embodiment of the present invention.

In a print head 60 of this embodiment, one of the two shift registers in the 12th embodiment is replaced with a latch circuit.

In the embodiment, a single shift register 61 and three latch circuits, first to third latch circuits 62 to 64, constitute "memory means".

Figure 38:
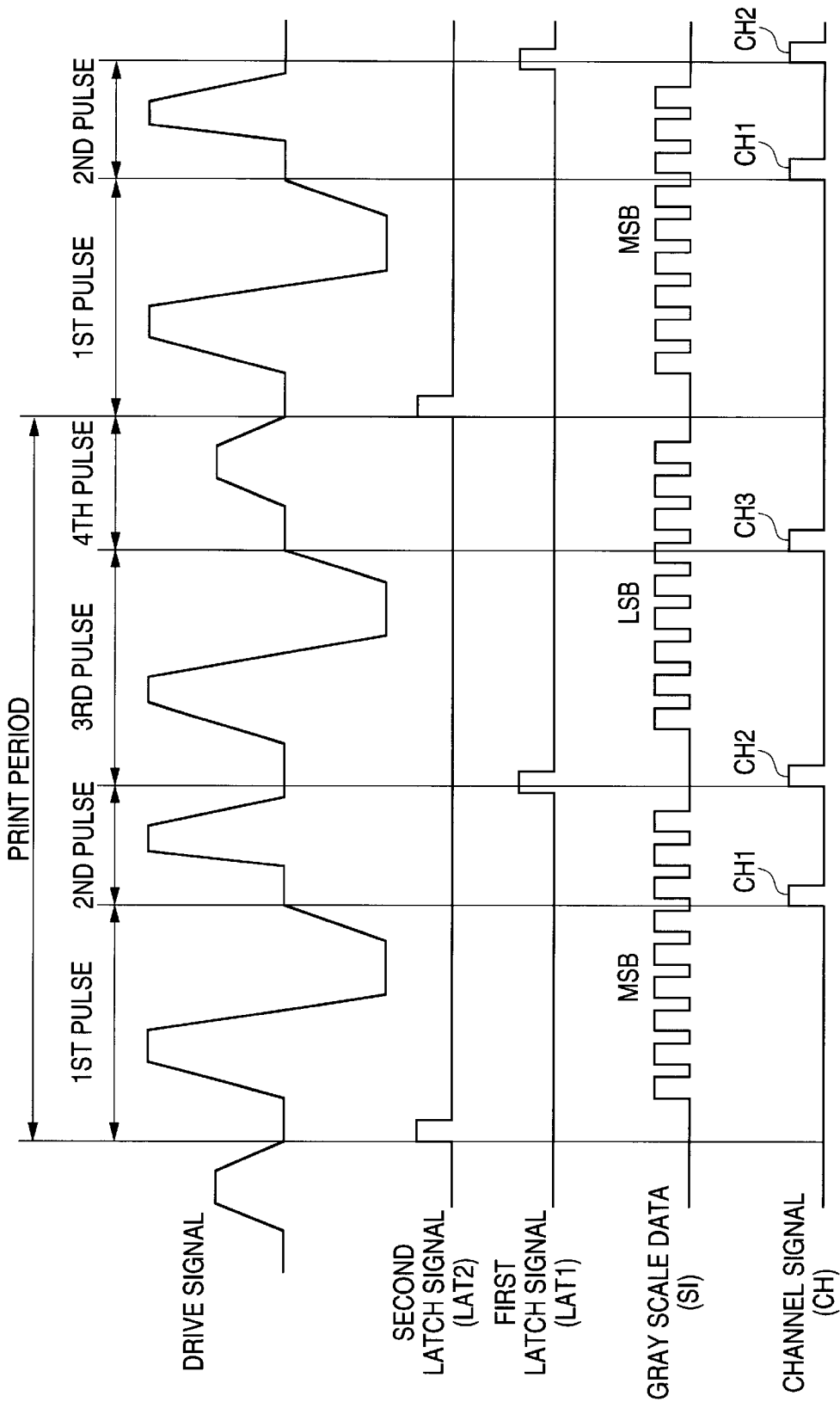

As shown also in FIG. 38, the MSB of the tone data is transferred to the shift register 61. When the 1st latch signal LAT1 is input to the first latch circuit 62, the LSB data is transferred from the shift register 61 to the first latch circuit 62 and latched therein. In response to this, the LSB data is input to the shift register 61.

When the second latch signal LAT2 is input to the second latch circuit 63 and the third latch circuit 64, the second latch circuit 63 receives the data from the shift register 61 and latches it therein, and the third latch circuit 64 receives the data from the first latch circuit 62 and latches it therein. Accordingly, the MSB data of the tone data, which is stored in the first latch circuit 62, is transferred to the third latch circuit 64, and the LSB data, which is stored in the shift register 61, is transferred to the second latch circuit 63. The MSB and LSB data are input to the decoder 45 where those are converted into 4-bit data.

Some examples of a logic circuit including the decoder and the like will be described.

EXAMPLE 1

Figure 39:
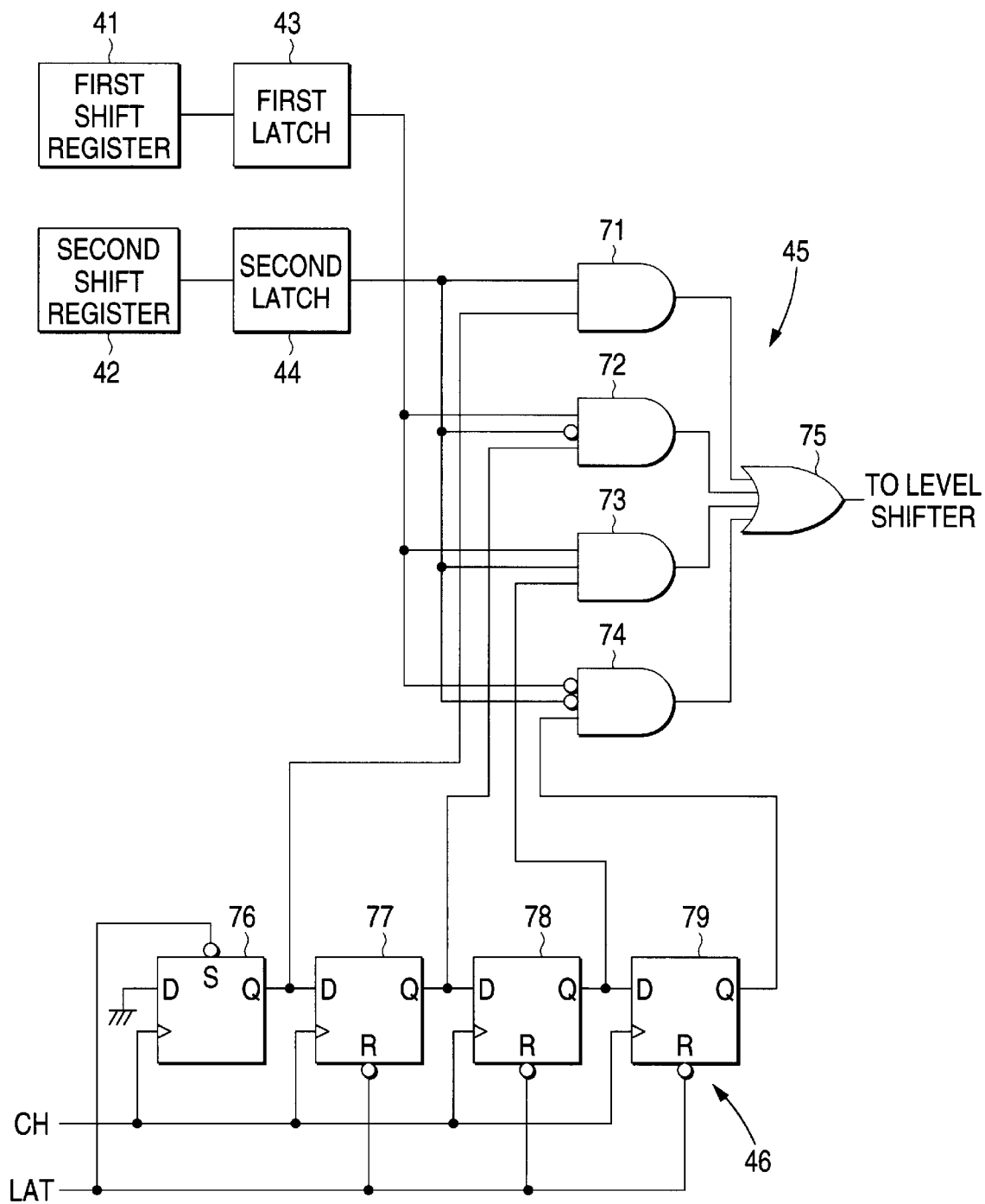
FIG. 39 is a circuit diagram showing a first specific logic circuit including a decoder and a control logic.

As shown in FIG. 39, in an example 1, the decoder 45, provided for each nozzle, comprises a logic circuit which is made up of four AND gates 71 to 74 and an OR gate 75 coupled for reception with the AND gates 71 to 74. Accordingly, for a case where 64 nozzles are used, 64 logic circuits each made up of the AND gates 71 to 74 and the OR gate 75. The AND gates 71 to 74 receive signals from the first latch circuit 43 and the second latch circuit 44.

The control logic 46 is made up of four D flip-flops 76 to 79 connected in a cascade fashion. An input D of the first flip-flop 76 is earthed and set at an L level ("0"). An output Q of the first flip-flop 76 is connected to the first AND gate 71. An output Q of the second flip-flop 77 is connected for transmission to the second AND gate 72. An output Q of the third flip-flop 78 is connected for transmission to the third AND gate 73. An output Q of the fourth flip-flop 79 is connected for transmission to the fourth AND gate 74.

A latch signal LAT is connected to the set input terminal of the first flip-flop 76, and the reset input terminals of the remaining flip-flops 77 to 79. A channel signal CH as a clock signal is applied to those flip-flops 76 to 79.

If the gray tone data applied to a nozzle is "01", for example, an output signal of the OR gate 75 is "0" during the period of the 1st pulse generation, "1" during the period of the 2nd pulse generation, "0" during the period of the 3rd pulse generation, and "0" during the period the 4th pulse generation. Therefore, the 2-bit tone data "01" can be converted into 4-bit print data "0100".

EXAMPLE 2

Figure 40:
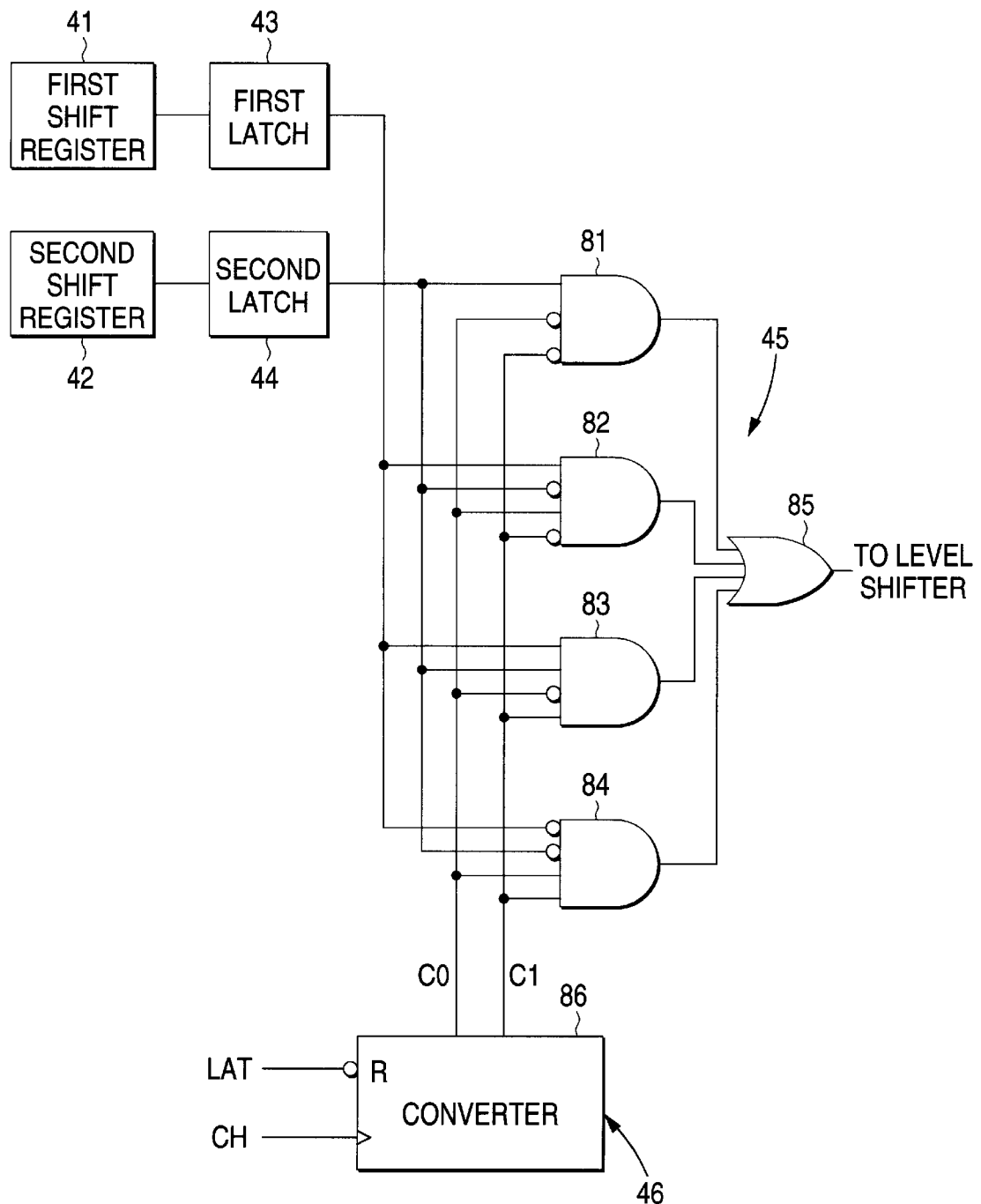
FIG. 40 is a circuit diagram showing a second specific logic circuit including a decoder and a control logic.

In an example 2, the decoder 45 for each nozzle, as shown in FIG. 40, is made up of four AND gates 81 to 84, and an OR gate 85 coupled for reception with the AND gates 81 to 84. The AND gates 81 to 84 receive signals from the first latch circuit 43 and the second latch circuit 44.

The control logic 46 comprises a single quad counter 86. The counter 86 receives a latch signal LAT at the reset terminal, and a channel signal CH at the data input terminal. The high-order bit output C1 and the low-order bit output C0 of the counter 86 are input to the AND gates 81 to 84.

The counter 86 is cleared when it receives a latch signal serving also as a 1st pulse generation timing detect signal. As a result, the high- and low-order bit outputs C1 and C0 are both "0". When the counter 86 receives a channel signal CH1 as a 2nd pulse generation timing detect signal, the counter 86 counts up, so that the high-order bit output C1 is "0" and the low-order bit output C0 is "1". By use of the output (C1, C0) of the counter 86 which counts up in synchronism with the generation of each drive pulse, it is possible to select any one of the AND gates 81 to 84.

EXAMPLE 3

Figure 41:
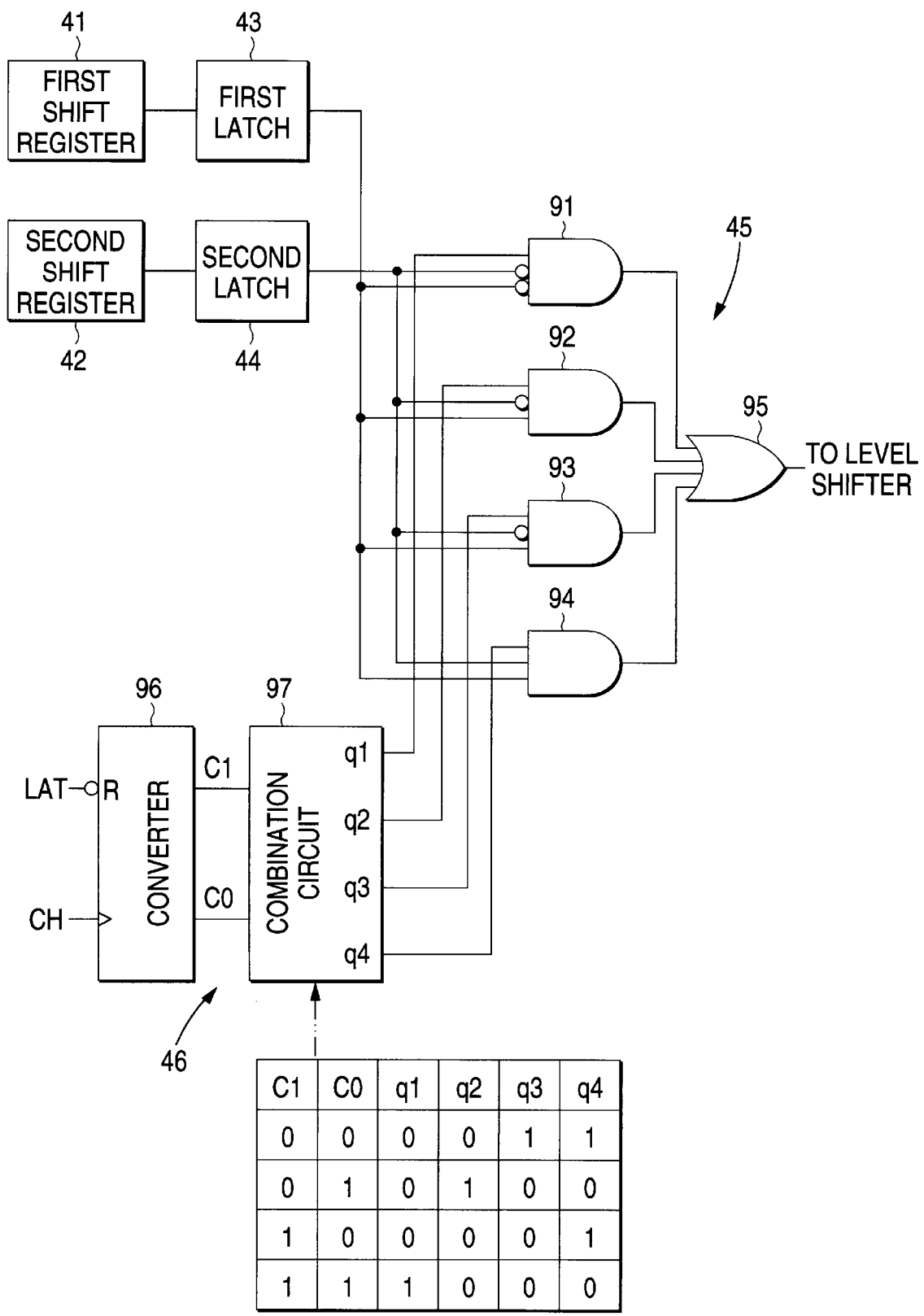
FIG. 41 is a circuit diagram showing a third specific logic circuit including a decoder and a control logic.

In an example 3, the decoder 45 for each nozzle, as shown in FIG. 41, is made up of four AND gates 91 to 94, and an OR gate 95 coupled for reception with the AND gates 91 to 94. The AND gates 91 to 94 receive signals from the first latch circuit 43 and the second latch circuit 44.

The control logic 46 is made up of a quad counter 96 and a combinational logic circuit 97 for changing logic outputs in accordance with an output of the quad counter 96. The quad counter 96 operates like the counter 86 shown in FIG. 40. The counter output is "00" during the 1st pulse generation period, and "01" during the 2nd pulse generation period, "10" during the 3rd pulse generation period, and "11" during the 4th pulse generation period.

The combinational logic circuit 97 changes the outputs q1 to q4 in accordance with the value of the output (C1, C0) of the quad counter 96. Therefore, if input states (inverting input or non-inverting input) applied from the combinational logic circuit 97 to the AND gates 91 to 94 are properly set, the tone data is translated into the print data, whereby a desired drive pulse is applied to the piezoelectric element 17. The combinational logic circuit 97 may be replaced with a ROM which contains data of q1 to q4 and uses address signals C1 and C0.

EXAMPLE 4

Figure 42:
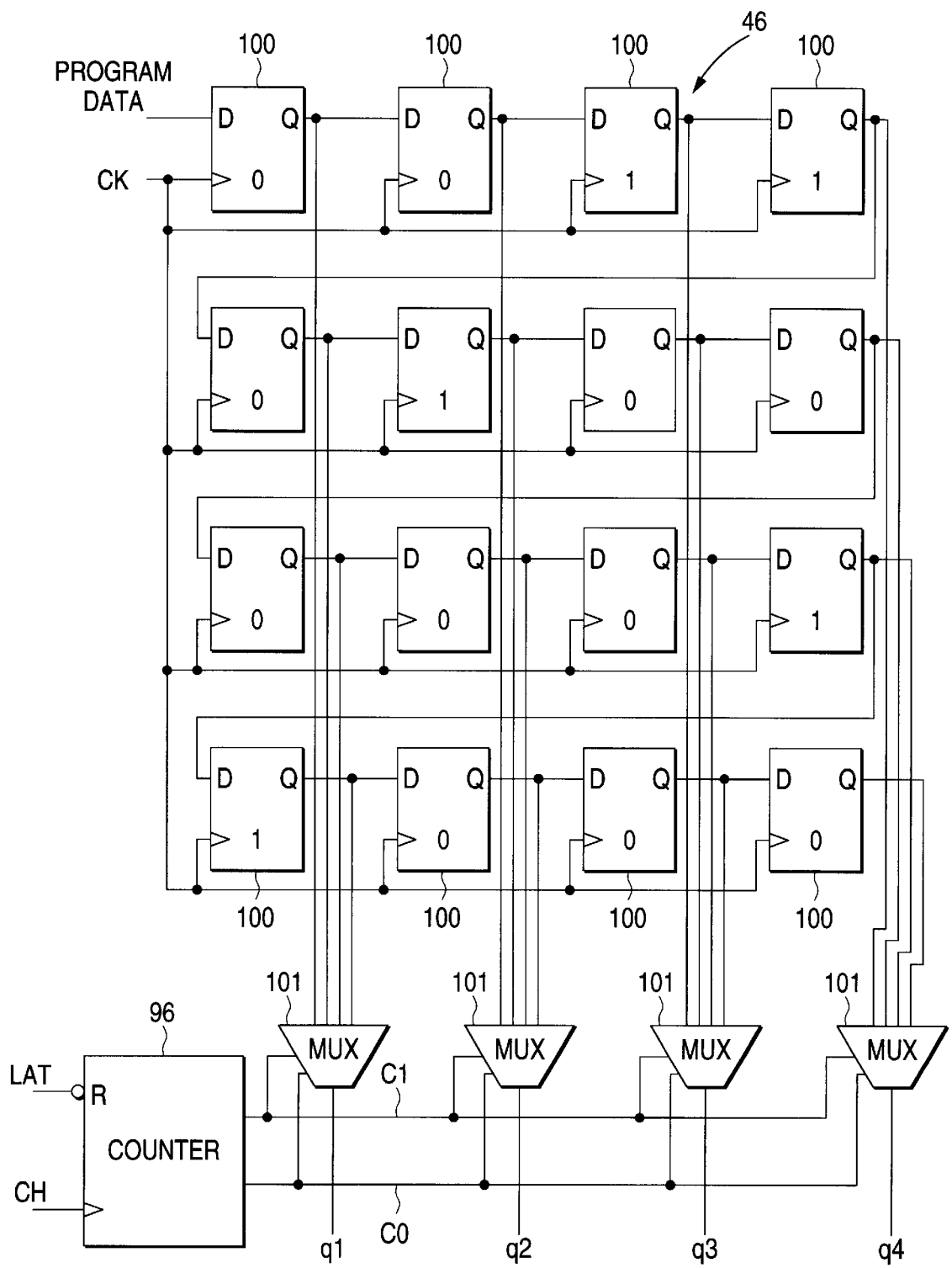
FIG. 42 is a circuit diagram showing a specific control logic.

A logic circuit shown in FIG. 42 is a modification of the logic circuit of FIG. 41 in which a combination of a plural number of flip-flops 100 and multiplexers 101 is substituted for the combinational logic circuit 97. The flip-flops 100 are arrayed in a matrix of 4×4. The outputs Q of the first row of flip-flops 100 are input to the four multiplexers 101. The outputs (C1, C0) of the quad counter 96 are input to the multiplexers 101. Each multiplexer 101 selects one of the four outputs Q received from the flip-flops 100 in accordance with the outputs of the quad counter 96, and outputs the selected one.

Program data is input to each row of the flip-flops 100 so that the outputs q1 to q4 of each multiplexer 10 correspond to the outputs q1 to q4 of the combinational logic circuit 97. Data streams as defined in the truth table in FIG. 41 successively enters the upper row of the flip-flops 100, and the subsequent ones in accordance with a data transfer clock signal CK. The data streams are stored in those flip-flops 100. The data stored in the flip-flops 100 are illustrated in the blocks of the flip-flops 100. It is preferable that the program data is entered once after the power on of the printer but before the printing operation.

<14th Embodiment>

Figure 43:
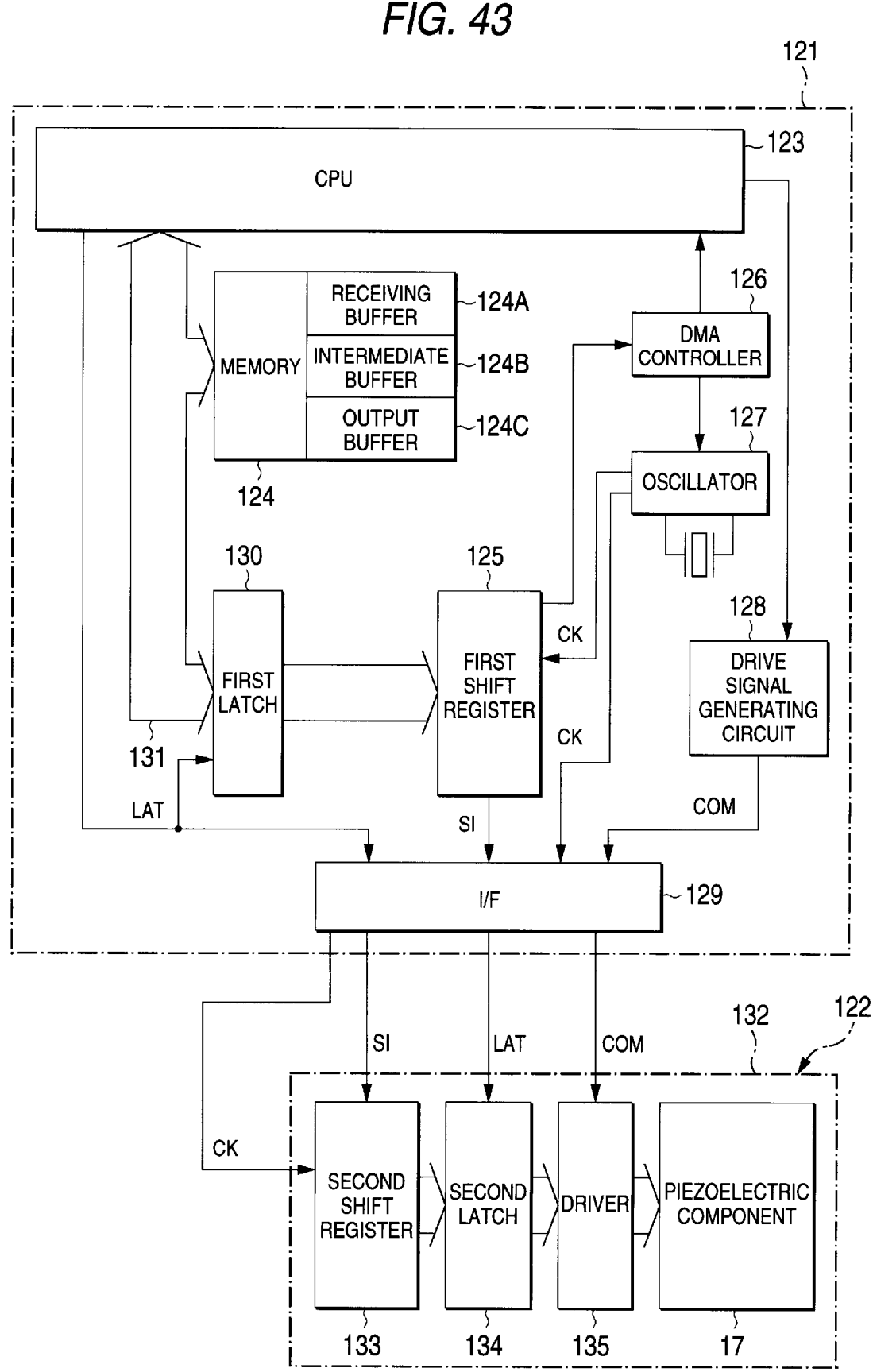
FIG. 43 is a block diagram showing an ink jet printer according to a 14th embodiment of the present invention.

A 14th embodiment of the present invention will be described with reference to FIGS. 43 and 44.

An ink jet printer of the present embodiment is also composed of a print controller 121 and a print engine 122.

A CPU 123 carries out the processing of various data and various controls. "Print data storing means", e.g., a memory 124, comprises a RAM, for example. "Head transfer means", e.g., a shift register 125, converts input print data into serial print data and transfers it to a print head 132. "DMA transfer means", e.g., a DMA controller 126, controls a DMA control to be described later. "Sync signal generating means", e.g., an oscillator circuit 127, generates a sync signal CK in accordance with a maximum data transfer rate in the print head 132. "Drive signal generating means", e.g., a drive signal generating circuit 128, generates a drive signal COM including a plural number of drive pulses during one period. An I/F 129 is used for transferring print data of dot pattern data, the drive signal, and the like to the print engine 122. Various memory areas, such as a receive buffer 124A, intermediate buffer 124B, output buffer 124C, and a work area (not shown), are set up in the memory 124.

It is noted that a first latch circuit 130 is provided between the memory 124 and the shift register 125. "Data holding means", e.g., a first latch circuit 130, temporarily stores print data received from the memory 124. The first latch circuit 130 and the memory 124 are interconnected by a data bus 131.

The print engine 122 includes the print head 132, a printing medium feeding mechanism for feeding a printing medium, e.g., a sheet of paper, (in the sub-scanning direction), and a carriage mechanism for moving the print head 132 in the main san direction, both the mechanisms being not shown.

The print data that is developed into the dot pattern data is serially transferred from the I/F 129 to a shift register 133 in synchronism with the sync signal. This print data SI is temporarily latched by a second latch circuit 134. The latched print data is input to a driver 135.

The driver 135 includes a level shifter (voltage amplifier), a switch circuit (analog switches), and the like, and on/off controls a drive signal to be applied to the piezoelectric element 17 in accordance with on and off states of the bits of the print data. During a period that the print data input to the driver 135 is "1", a drive signal is input to the piezoelectric element 17, and the piezoelectric element 17 expands and contracts in accordance with the drive signal. During a period that the print data input to the driver 135 is "0", the supply of the drive signal to the piezoelectric element 17 is interrupted.

Figure 44:
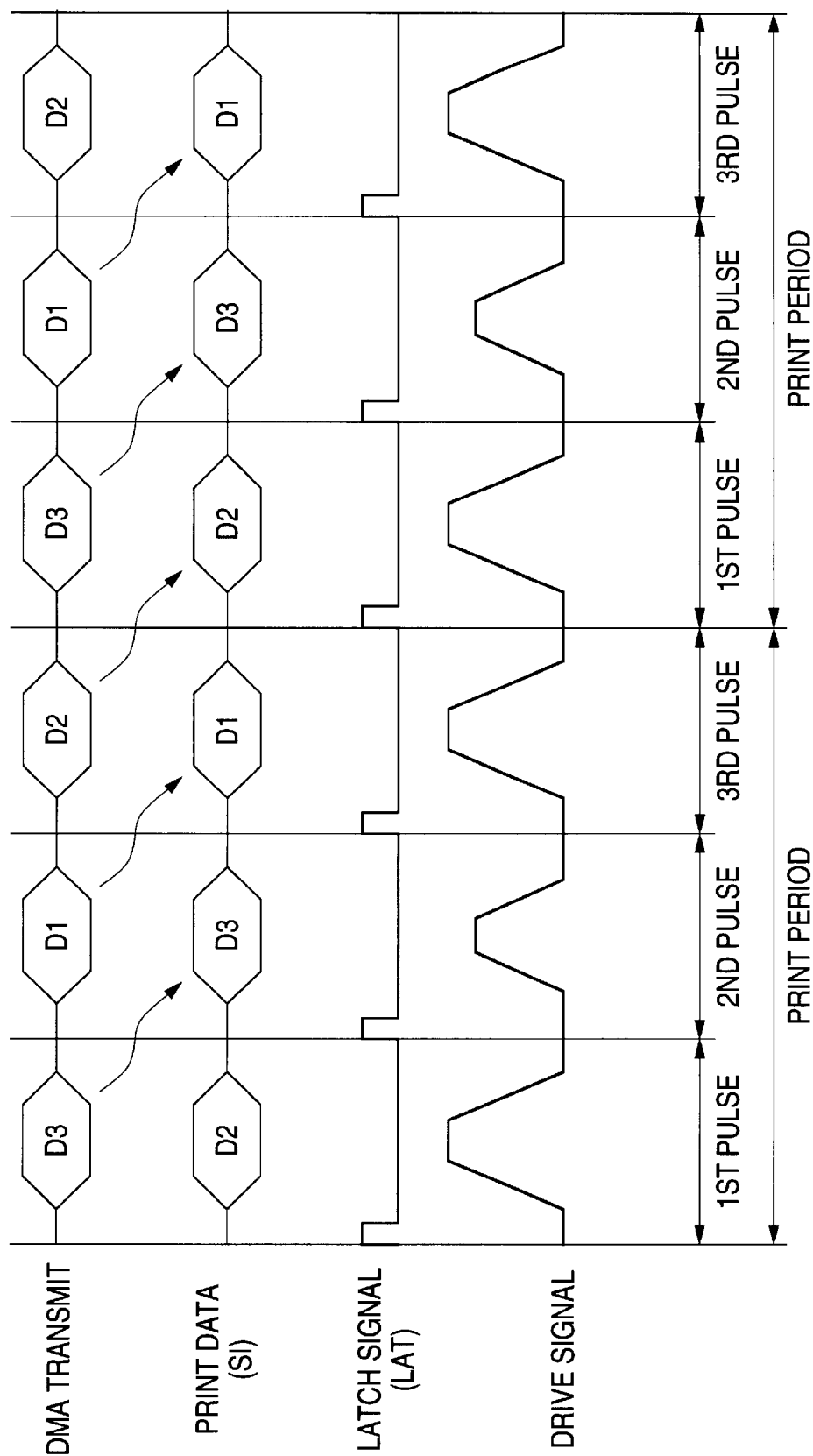
FIG. 44 is a timing diagram showing the transferring timings of print data.

In FIG. 44, there is diagrammatically illustrated a print data transfer method uniquely employed in the present embodiment. In the description to follow, a case where the print data comprises 3 bits will be used.

For each of the nozzles, data (D11, D12, D13, . . . , D1n) of the 1st pulse select signal D1, data (D21, D22, D23, . . . , D2n) of the 2nd pulse select signal D2, and data (D31, D32, D33, . . . , D3n) of the 3rd pulse select signal D3 are serially transferred to the shift register 133 during one print period.

When the print data is transferred from the print controller 121 to the print head 132, the DMA controller 126 sends a DMA transfer request signal to the CPU 123. When receiving the DMA transfer request signal, the CPU 123 transfers the right of using the data bus 131 to the DMA controller 126. As result, the DMA controller 126 serves as a bus master, and the data bus 131 is under control of the DMA controller 126.

The DMA controller 126 lets print data (D1, D2, D3) of one scan go from the output buffer 124C of the memory 124 to the first latch circuit 130 by way of the data bus 131. At this time, the print data is input to the first latch circuit 130 in a parallel fashion in the order of D1→D2→D3. In response to a latch signal, the first latch circuit 130 latches the received print data therein, and the DMA transfer of the print data ends.

The print data is transferred from the first latch circuit 130 to the shift register 125 in a parallel fashion. The shift register 125 converts the parallel print data into serial print data. The serial print data is input to the shift register 133 of the print head 132 in synchronism with a sync signal from the oscillator circuit 127.

After the completion of transferring the print data from the first latch circuit 130 to the shift register 125, a situation allows the next print data to go to the first latch circuit 130 is set up. Then, the DMA controller 126 lets the next print data go to the first latch circuit 130, from the output buffer 124C. In this way, the DMA transfer between the memory 124 and the first latch circuit 130 and the serial transfer between the shift register 125 and the shift register 133 progress concurrently. The result is a great reduction of the print period.

Thus, in the present embodiment, the serial print data is transferred from the shift register 125 to the print engine while at the same time the next data is transferred from the memory 124 to the first latch circuit 130. In other words, two data transferring operations are performed concurrently. This feature realizes a great reduction of the print period. As seen from the foregoing description, the present embodiment systematically combines an arrangement for composing a single drive signal from a plural number of drive pulses and an arrangement for the parallel data transfer. Therefore, the ink jet printer incorporating such a feature can print high quality image and test in multi-level of the gray tone.

<15th Embodiment>

A 15th embodiment of the present invention will be described with reference to FIGS. 45 through 47.

As shown, "translating means", e.g., a decoder 140, is provided between the shift register 125 and the first latch circuit 130. Print data (b1, b0) compressed to 2-bit data every dot is stored in the output buffer 124C of the memory 124. The 2-bit print data, which is compressed and stored in the output buffer 124C, is DMA transferred to the decoder 140. In the decoder, the 2-bit data is translated into 3-bit print data (D1, D2, D3).

Figure 46:
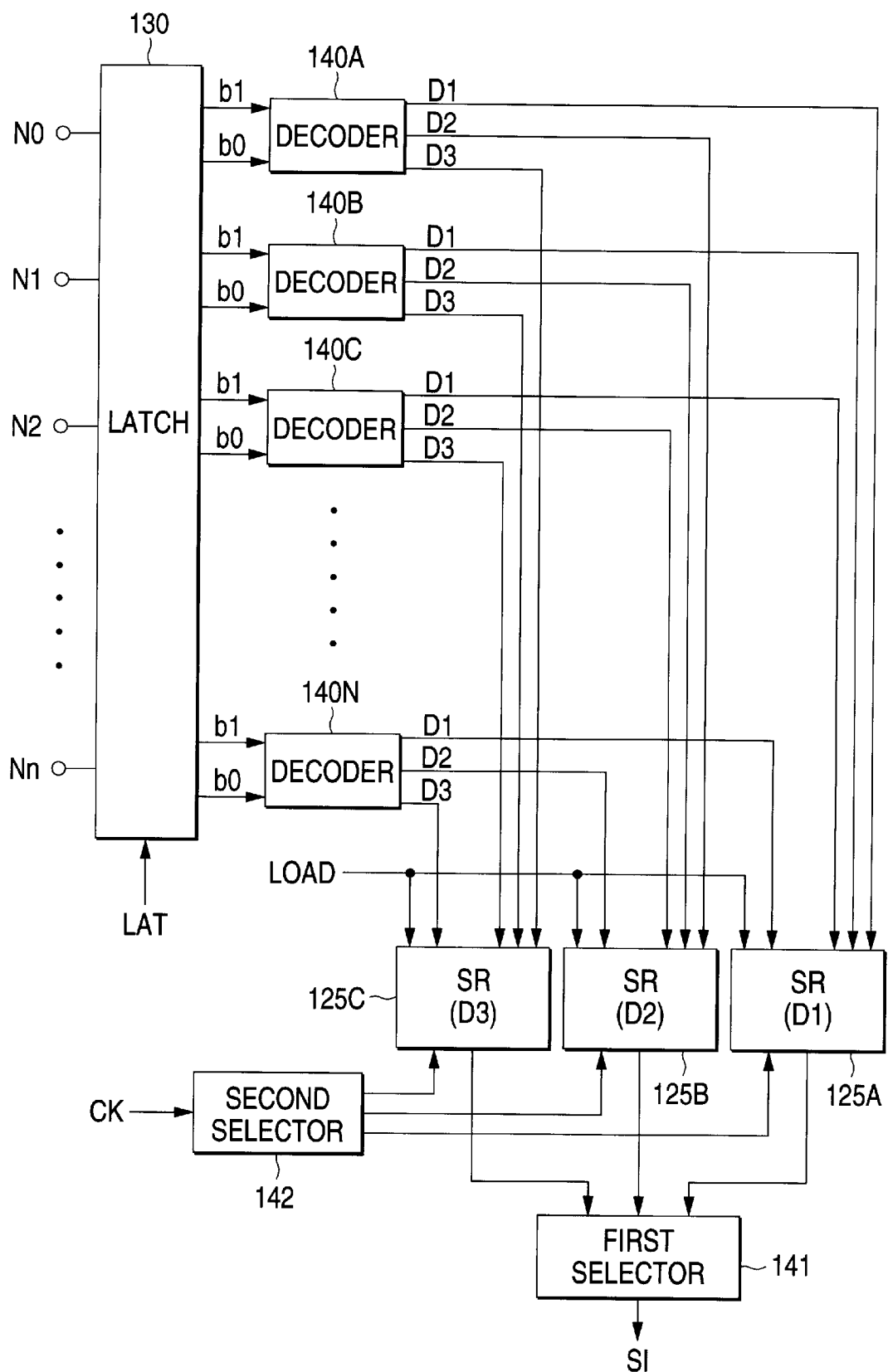
FIG. 46 is a block diagram showing a specific logic circuit including a decoder shown in FIG. 45.

A specific arrangement of a logic circuit including the first latch circuit 130, decoder 140 and shift register 125 is shown in FIG. 46.

Print data (b1, b0), compressed to 2-bit data of each dot, is transferred from the memory 124 to the first latch circuit 130 in a DMA mode. The print data for all the nozzles are latched in the first latch circuit 130 by a latch signal, and then input to decoders 140A to 140N which are provided corresponding to the nozzles N0 to Nn. The decoders 140A to 140N convert the received 2-bit print data into 3-bit print data (D1, D2, D3).

The converted 3-bit print data is input to shift registers 125A, 125B and 125C, provided corresponding to the drive pulses.

A first selector 141 selects the shift registers 125A to 125C in this order. A second selector 142 applies a sync signal CK, generated by the oscillator circuit 127, to the shift register selected by the first selector 141. The serial print data are transferred every dot from the shift register 125 to the shift register 133 of the print head 132 in synchronism with the sync signal CK.

Figure 47:
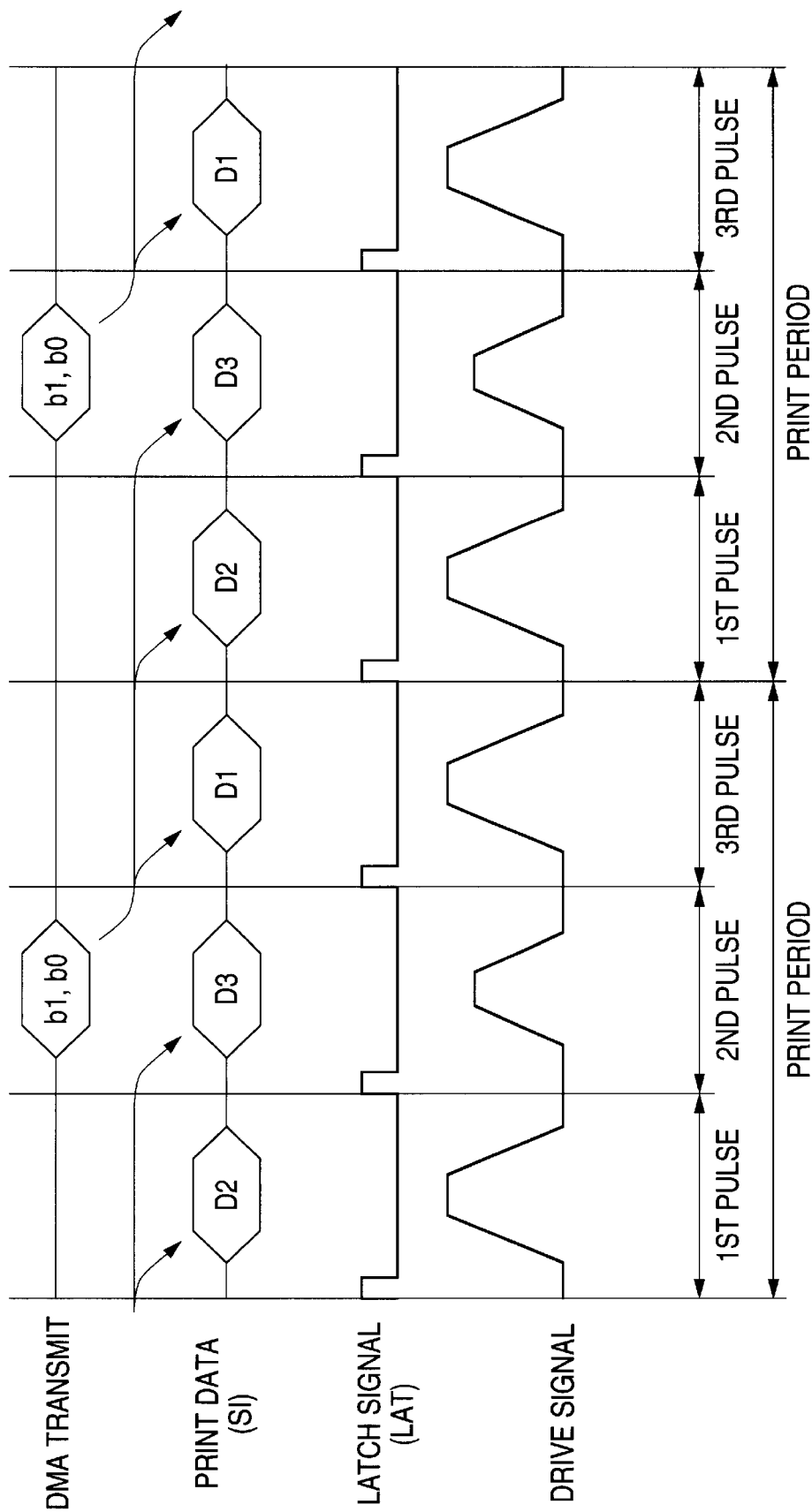
FIG. 47 is a timing diagram showing the transferring timings of print data.

As shown in FIG. 47, the print data that is compressed for the printing during a print period is DMA transferred to the first latch circuit 130 in the print period preceding to the former, and transferred to the decoder 140 where the print data is converted into 3-bit print data. The 3-bit print data is transferred to the shift register 133 of the print head 132 before an intended drive pulse is generated.

<16th Embodiment>

Figure 48:
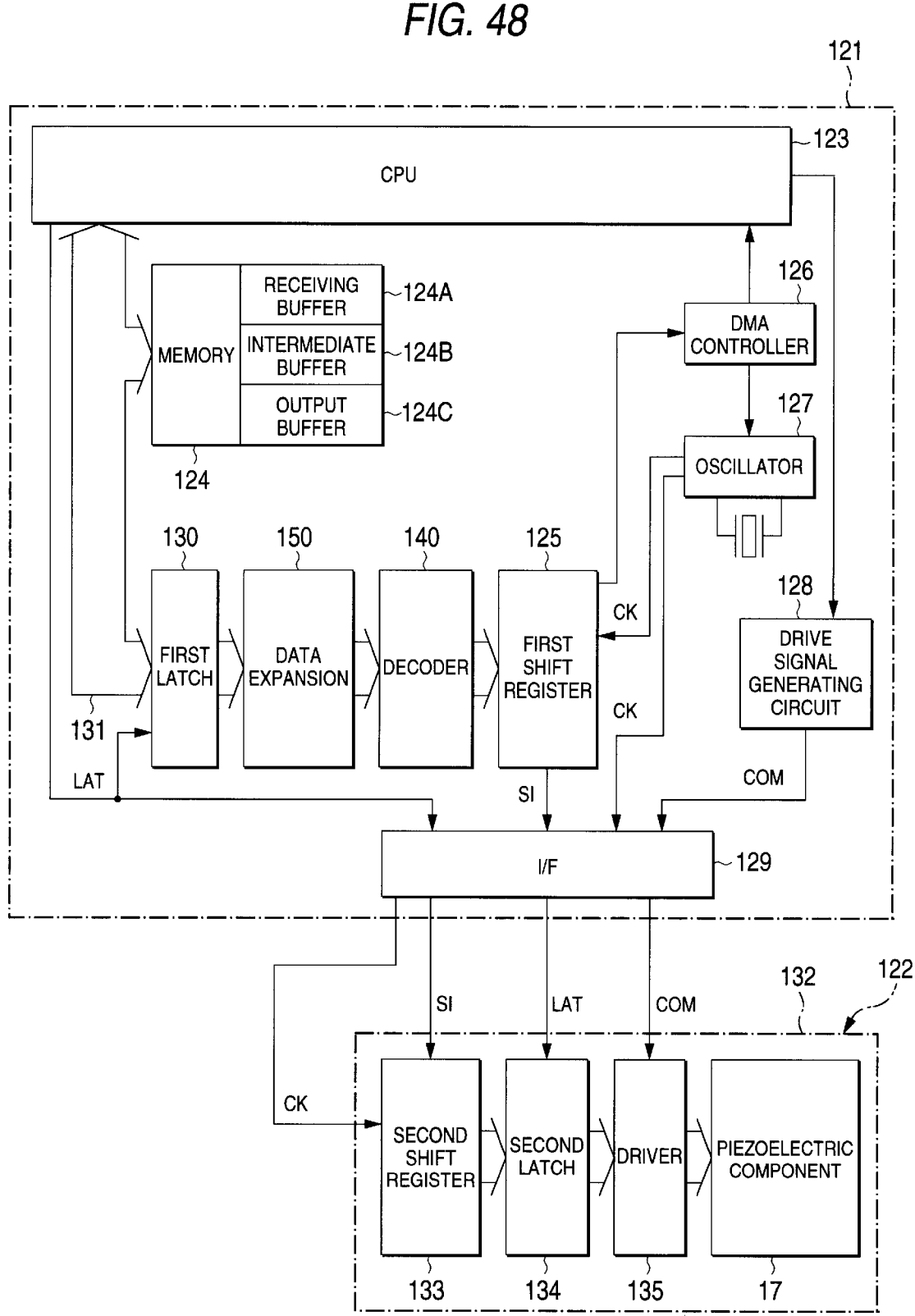
FIG. 48 is a block diagram showing an ink jet printer according to a 16th embodiment of the present invention.

A 16th embodiment of the present invention will be described with reference to FIG. 48. In this embodiment, the print data itself is compressed, and the whole data that is DMA transferred from the memory 124 to the first latch circuit 130 is further compressed.

As shown, a data expansion circuit 150 is provided between the first latch circuit 130 and the decoder 140. The print data compressed to 2-bit data of each dot, already stated in the 15th embodiment, is stored in the output buffer 124C of the memory 124 in a state that it is further compressed for data transmission.

To be more specific, the 2-bit print data (b1, b0) of one main scan are DMA transferred together to the first latch circuit 130. In a case where the number of nozzles used is 64, the amount of the 2-bit data corresponding to 64 nozzles is transferred to the first latch circuit 130 by one DMA transfer. The data of one main scan comprises a bit stream of 1's and 0's. Therefore, the whole transferred data of one main scan can be further compressed by use of a well known data compressing technique. Examples of the data compressing technique are run-length coding and Huffman coding.

In the present embodiment, the print data of one dot is first compressed to 2-bit data (primary compressing), and the whole print data of one main scan is further compressed (secondary compressing).

The print data thus compressed two times is latched in the first latch circuit 130, and the secondary compression of the print data is then decompressed. The compressed 2-bit data is gained. As in the 15th embodiment, the decoder 140 converts the 2-bit print data into 3-bit print data (D1, D2, D3).

While the invention has been described in its preferred embodiments, modifications and variations are obviously possible in light of the above teachings. It is therefore to be understood that the invention may be practiced otherwise than as specifically described within the true spirits and scope of the appended claims.

All the selectable pulse patterns used in the embodiments are not always necessary. For example, in the sixth embodiment, five pulse patterns DP1, DP2, DP12, DP23, and DP13 can provide a satisfactory gray tone expression. Particularly, by frequently using the composite drive pulses, the number of drive pulses to be applied to the piezoelectric element is reduced to a single drive pulse. The number of charging operations (except the charging for the pulse to resume the medium potential) is reduced to one charging operation. The same thing is true for the discharging operation. The result is a less power consumption and a less heat radiation from the elements.

The common maximum potential used in the fourth to tenth embodiments is not always the maximum potential. Some characteristics of the piezoelectric element, the minimum potentials may be used for the waveform element coupling for composing new drive pulses.

Figure 45:
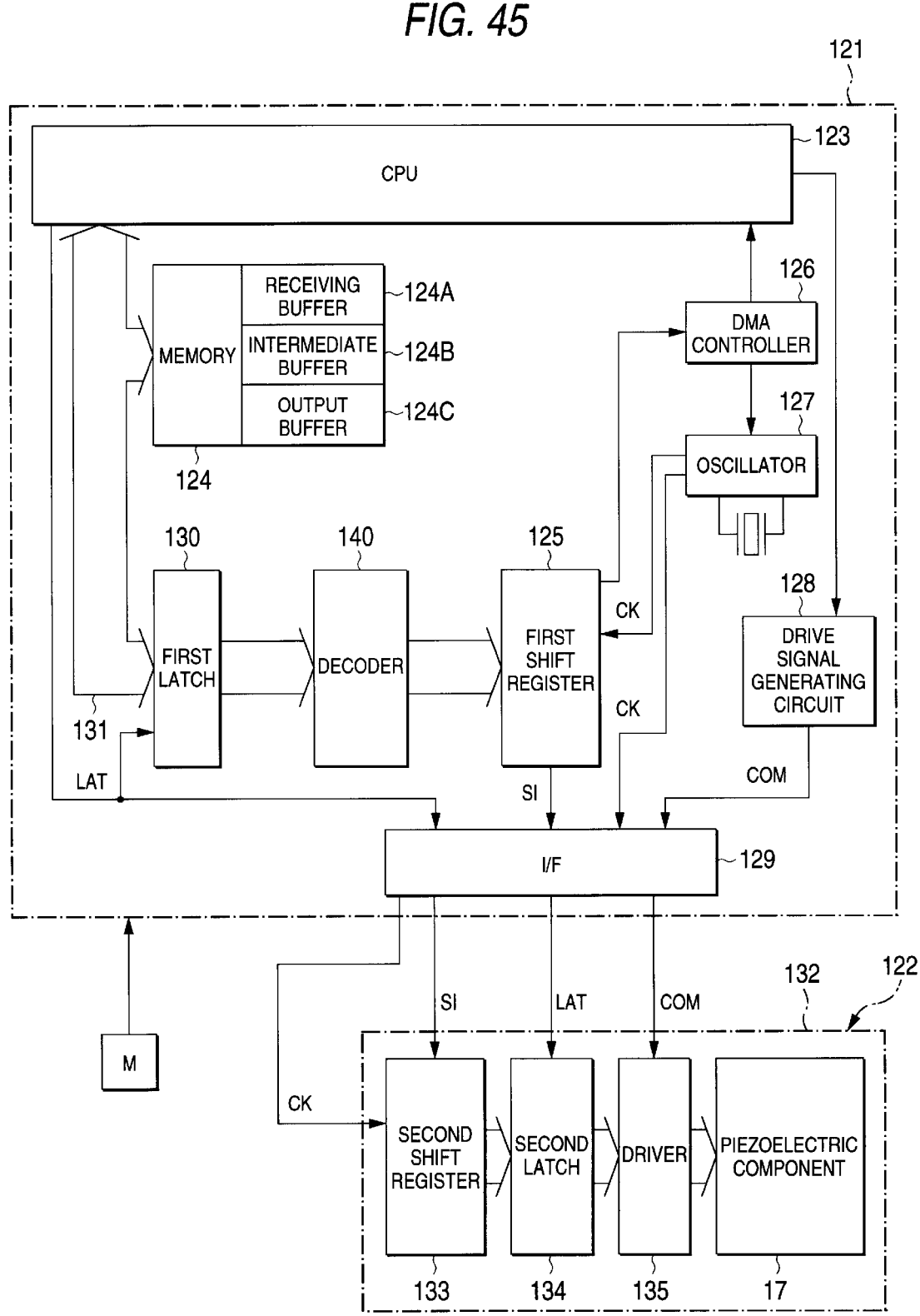
FIG. 45 is a block diagram showing an ink jet printer according to a 15th embodiment of the present invention.

As shown in FIG. 45, the invention may also be put into practice in a manner that a part or the whole of the program or data constructed according to the present invention is stored in a storing medium M, and the program or data is loaded from the storing medium into the print controller. The storing medium may be a physical storing medium, such as RAM, ROM, FED, or CD-ROM. In this case, the printer may receive the program or data stored in a storing medium located at a remote place by way of communication line.

What is claimed is:

1. An ink jet printer comprising:
 a print head having a plural number of nozzles associated with pressure generating elements;
 a print controller for driving the print head and controlling the ink ejecting operation of the print head;
 drive signal generating means for generating a drive signal including, during one period, a plural number of drive pulses for driving the print head to eject ink droplets from each nozzle;
 print data generating means for generating print data to input one or a plural number of the drive pulses to each pressure generating element during one print period and calculating a decode value which represents waveform elements of said print data, wherein said decode value is calculated from an input gray scale level; and
 switching means for inputting the drive signal to each pressure generating element in accordance with the print data, wherein the plural number of drive pulses generated by the drive signal generating means include a first drive pulse for generating a first ink droplet and a second drive pulse for generating a second ink droplet whose weight is different than that of the first ink droplet, and said first ink droplet and said second ink droplet are combined to form a printing dot in at least four levels of gray tone.

2. The ink jet printer according to claim 1, wherein the drive signal includes a plural number of drive pulses of different amplitudes during one period.

3. The ink jet printer according to claim 1 wherein the drive signal includes a plural number of drive pulses of different ascending and descending inclinations during one period.

4. The ink jet printer according to claim 1, wherein the drive signal includes a first drive pulse for generating a first ink droplet, a second drive pulse for generating a second ink droplet, and a third drive pulse for generating a third ink droplet, and when the first to third drive pulses are combined, a printing dot is expressed in at least four levels of gray tone.

5. The ink jet printer according to claim 4, in which the descending inclination of the first drive pulse is larger than the ascending inclination of the first drive pulse.

6. The ink jet printer according to any of claims 1, to 4, wherein the print data generating means is provided in the print head and converts gray tone data received from the print controller into the print data.

7. The ink jet printer according to claim 6, wherein the print data generating means for converting the gray tone data into the print data by use of a timing detecting signal for detecting the timings of generating the drive pulses.

8. The ink jet printer according to claim 7, further comprising tone data storing means for storing the gray tone data, the tone data storing means including memory circuits dependent on the number of digits of the gray tone data, wherein digit data of the gray tone data are stored in the memory circuits, respectively.

9. The ink jet printer according to claim 8, in which the digit data of the gray tone data are separately input to the memory circuits.

10. The ink jet printer according to claim 9, in which each the memory circuit includes serial/parallel converting means for converting serially input digit data of the gray tone data into parallel data signals, and latch means for latching the parallel data signals by a latch signal applied thereto.

11. The ink jet printer according to any of claims 1, to 4, further comprising:

print data storing means for storing print data;

data holding means for temporarily storing the print data received from the print data storing means;

first data transferring means for transferring the print data of the data holding means to the print head; and second transferring means for transferring the next print data from the print data storing means to the data holding means when the transferring of the print data to the print head by the first data transferring means is in progress.

12. The ink jet printer according to claim 11, in which the second data transferring means includes a DMA transferring means.

13. The ink jet printer according to claim 11, further comprising a sync signal generating means for generating a sync signal in accordance with a data transfer rate in the print head, and the sync signal is used for transferring the print data from the first data transferring means to the print head.

14. The ink jet printer according to claim 11, wherein the print data storing means stores data in a compressed state, and a translating means is provided between the data holding means and the second data transferring means, the translates means translating the compressed data into the print data.

15. The ink jet printer according to claim 11, in which the print data is transferred, in a compressed form, from the print data storing means to the data holding means, and after being held by the data holding means, the compressed print data is decompressed.

16. The ink jet printer according to claims 1 to 4, wherein the drive signal includes a drive pulse capable of driving the pressure generating element to such an extent as to not eject an ink droplets.

17. The ink jet printer according to any of claims 1 to 4, wherein a time period between the drive pulses of the drive signal to be successively input to the pressure generating element is equal to a maximum drive period of the print head.

18. The ink jet printer according to any of claims 1 to 4, wherein the pressure generating element is a piezoelectric element.

19. The ink jet printer according to claim 1, in which the drive signal includes a first drive pulse for generating a first ink droplet, a second drive pulse for generating a second ink droplet whose volume is smaller than that of the first ink droplet, and a third drive pulse for generating a third ink droplet whose volume is substantially equal to that of the first ink droplet, and the print date realizes a first gray tone value in which no ink droplet is ejected a second gray tone value in which the second drive pulse is selected and the second ink droplet is ejected, a third gray tone value in which one of the first drive pulse and the third drive pulse is selected and said one of the first and third ink droplet is ejected, and a fourth gray tone value in which the first drive pulse and the third drive pulse are selected and the first and third ink droplets are ejected.

20. The ink jet printer according to claim 19, in which a waveform of each of the first and third drive pulses comprises a first ascending segment where the pulse voltage rises from a medium potential to a first maximum potential, a first maximum potential segment where the first maximum potential continues, a first descending segment where the pulse voltage falls from the first maximum potential to a minimum potential, a minimum potential segment where the minimum potential continues, and a return-to-medium-potential segment where the pulse voltage returns from the minimum potential to the medium potential, and a waveform of the second drive pulse comprises a second ascending segment where the pulse voltage rises from the medium potential to a second minimum potential lower than the first minimum potential, a second maximum potential segment where the second maximum potential continues, and a second descending segment where the pulse voltage falls from the second maximum potential to the medium potential.

21. The ink jet printer according to claim 20, in which a voltage descending time in the first descending segment is substantially equal to a period of a natural frequency of the pressure generating element, and a time from the start of the first descending segment to the start of the return-to-medium-potential segment is substantially equal to the Helmholtz period.

22. The ink jet printer according to claim 1, wherein the print data generating means generates print data including pulse select signals assigned to the waveform elements of the drive pulses, the print data inputting one or a plural number of the drive pulses and composite drive pulses each formed by coupling waveform elements of the drive pulses to each of the pressure generating element during one print period.

23. The ink jet printer according to claim 22, wherein the waveform elements are formed by dividing each of drive pulses in the pulse width, and each of the composite drive pulses is formed by selectively coupling the waveform elements.

24. The ink jet printer according to claim 23, wherein the voltage values of the waveform elements coupled for forming a composite drive pulse are equal to each other.

25. The ink jet printer according to any of claims 22 to 24, wherein one of the drive pulses or the composite pulses contained in the drive signal includes a drive pulse capable of driving the pressure generating element to such an extent as to not eject an ink droplet.

26. The ink jet printer as claimed in claim 1, wherein the waveform elements represent said drive pulses.

27. The ink jet printer as claimed in claim 1, wherein the waveform elements represent individual waveform elements of said drive pulses.

28. An ink jet printing method in which pressure generating elements corresponding to respective nozzles are actuated in order to eject ink droplets from the nozzles, the ink jet printing method comprising the steps of:

generating a drive signal including, during one period, a plural number of drive pulses for ejecting the ink droplets from respective nozzles;

generating print data to input one or a plural number of the drive pulses to each pressure generating element during one print period and calculating a decode value which represents waveform elements of said print data, wherein said decode value is calculated from an input gray scale level; and inputting the drive signal to each pressure generating element in accordance with the print data, wherein the plural number of drive pulses generated by the drive signal generating means include a first drive pulse for generating a first ink droplet and a second drive pulse for generating a second ink droplet whose weight is different than that of the first ink droplet, and said first ink droplet and second ink droplet are combined to form a printing dot in at least four levels of gray tone.

29. The ink jet printing method according to claim 28, wherein the second step generates print data to input one or a plural number of the drive pulses and composite drive pulses each formed by coupling waveform elements of the drive pulses to each the pressure generating element during one print period.

30. The ink jet printing method as claimed in claim 28, wherein the waveform elements represent said drive pulses.

31. The ink jet printing method as claimed in claim 28, wherein the waveform elements represent individual waveform elements of said drive pulses.

32. A computer readable medium having a program stored thereon for controlling a drive of a print head having a plural number of nozzles associated with pressure generating elements, wherein the program causes a computer to exercise a print data generating function to generate print data to input a plural number of drive pulses to each of the pressure generating elements during one print period and calculate a decode value which represents waveform elements of said print data, wherein said decode value is calculated from an input gray scale level, wherein the plural number of drive pulses generated by the drive signal generating means include a first drive pulse for generating a first ink droplet and a second drive pulse for generating a second ink droplet whose weight is different than that of the first ink droplet, and said first ink droplet and said second ink droplet are combined to form a printing dot in at least four levels of gray tone.

33. The computer readable medium as claimed in claim 32, wherein the waveform elements represent said drive pulses.

34. The computer readable medium as claimed in claim 32, wherein the waveform elements represent individual waveform elements of said drive pulses.

35. An ink jet printer comprising:

a print head having a plural number of nozzles associated with pressure generating elements;

a print controller for driving the print head and controlling the ink ejecting operation of the printing head;

drive signal generator which generates a drive signal including, during one period, a plural number of drive pulses for driving the print head to eject ink droplets from each nozzle and calculates a decode value which represents waveform elements of said print data, wherein said decode value is calculated from an input gray scale level, wherein the plural number of drive pulses generated by the drive signal generating means include a first drive pulse for generating a first ink droplet and a second drive pulse for generating a second ink droplet whose weight is different than that of the first ink droplet, and said first ink droplet and said second ink droplet are combined to form a printing dot in at least four levels of gray tone.

36. The ink jet printer as claimed in claim 35, wherein the waveform elements represent said drive pulses.

37. The ink jet printer as claimed in claim 35, wherein the waveform elements represent individual waveform elements of said drive pulses.

* * * * *